(12) United States Patent
Spinella et al.

(10) Patent No.: US 12,347,988 B2
(45) Date of Patent: Jul. 1, 2025

(54) RESISTANCE WELDING FASTENER, APPARATUS AND METHODS

(71) Applicant: HOWMET AEROSPACE INC., Pittsburgh, PA (US)

(72) Inventors: Donald J. Spinella, Greensburg, PA (US); Daniel Bergstrom, Sarver, PA (US)

(73) Assignee: HOWMET AEROSPACE INC., Pittsburgh, PA (US)

( * ) Notice: Subject to any disclaimer, the term of this patent is extended or adjusted under 35 U.S.C. 154(b) by 0 days.

(21) Appl. No.: 18/658,151

(22) Filed: May 8, 2024

(65) Prior Publication Data

US 2024/0291174 A1    Aug. 29, 2024

Related U.S. Application Data

(60) Division of application No. 17/519,905, filed on Nov. 5, 2021, now Pat. No. 11,984,691, which is a division of application No. 16/210,599, filed on Dec. 5, 2018, now Pat. No. 11,196,185, which is a continuation of
(Continued)

(51) Int. Cl.
| | |
|---|---|
| *H01R 4/02* | (2006.01) |
| *B23K 11/11* | (2006.01) |
| *B23K 11/20* | (2006.01) |
| *B23K 35/02* | (2006.01) |
| *B23K 103/20* | (2006.01) |
| *F16B 5/08* | (2006.01) |
| *F16B 37/06* | (2006.01) |

(Continued)

(52) U.S. Cl.
CPC .............. *H01R 4/027* (2013.01); *B23K 11/11* (2013.01); *B23K 11/20* (2013.01); *B23K 35/0288* (2013.01); *F16B 37/061* (2013.01); *H01R 43/0214* (2013.01); *B23K 2103/20* (2018.08); *F16B 5/08* (2013.01); *H01R 4/625* (2013.01); *Y10T 403/472* (2015.01)

(58) Field of Classification Search
CPC ......... B23K 11/30; B23K 11/20; B23K 11/11; B23K 2103/20; B23K 35/402; B23K 35/0205; B23K 11/3018; H01R 4/625; H01R 4/027; H01R 43/0214; F16B 5/08
See application file for complete search history.

(56) References Cited

U.S. PATENT DOCUMENTS

| | | | |
|---|---|---|---|
| 2,563,107 A | 8/1951 | Fanger | |
| 5,015,816 A * | 5/1991 | Bush ................. | B23K 11/3018 |
| | | | 219/119 |

(Continued)

FOREIGN PATENT DOCUMENTS

| | | |
|---|---|---|
| DE | 102007036416 A1 | 2/2009 |
| JP | 2010207898 A | 9/2010 |

*Primary Examiner* — Brian W Jennison
(74) *Attorney, Agent, or Firm* — Greenberg Traurig, LLP

(57) ABSTRACT

An apparatus and method for fastening dissimilar materials like steel, plastic and aluminum. A resistance welding fastener having multiple layers may be used with or without a sealant. The fastener may be used to form an aluminum covered steel laminate via a hemming pattern of attachment. The fastener may have a solid shaft or have an extended reach and have features for interacting with the welding electrode. A variety of electrode tips may be employed to cooperate with the fastener.

20 Claims, 31 Drawing Sheets

Related U.S. Application Data application No. 14/611,555, filed on Feb. 2, 2015, now Pat. No. 10,903,587.

(60) Provisional application No. 61/934,951, filed on Feb. 3, 2014.

(51) Int. Cl.
*H01R 4/62* (2006.01)
*H01R 43/02* (2006.01)

(56) References Cited

U.S. PATENT DOCUMENTS

| | | |
|---|---|---|
| 5,739,498 A | 4/1998 | Sunamoto et al. |
| 2010/0243613 A1* | 9/2010 | Fleckenstein ............ C22F 1/08 29/874 |

* cited by examiner

Aluminum
Magnesium
Steel

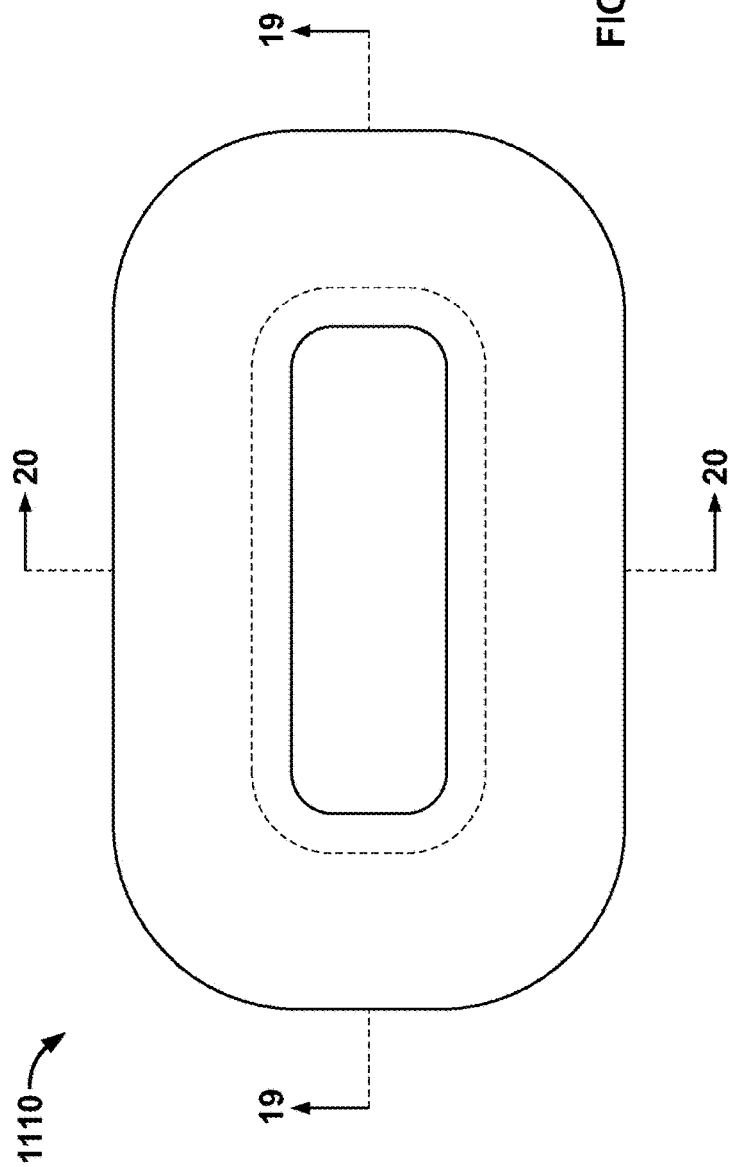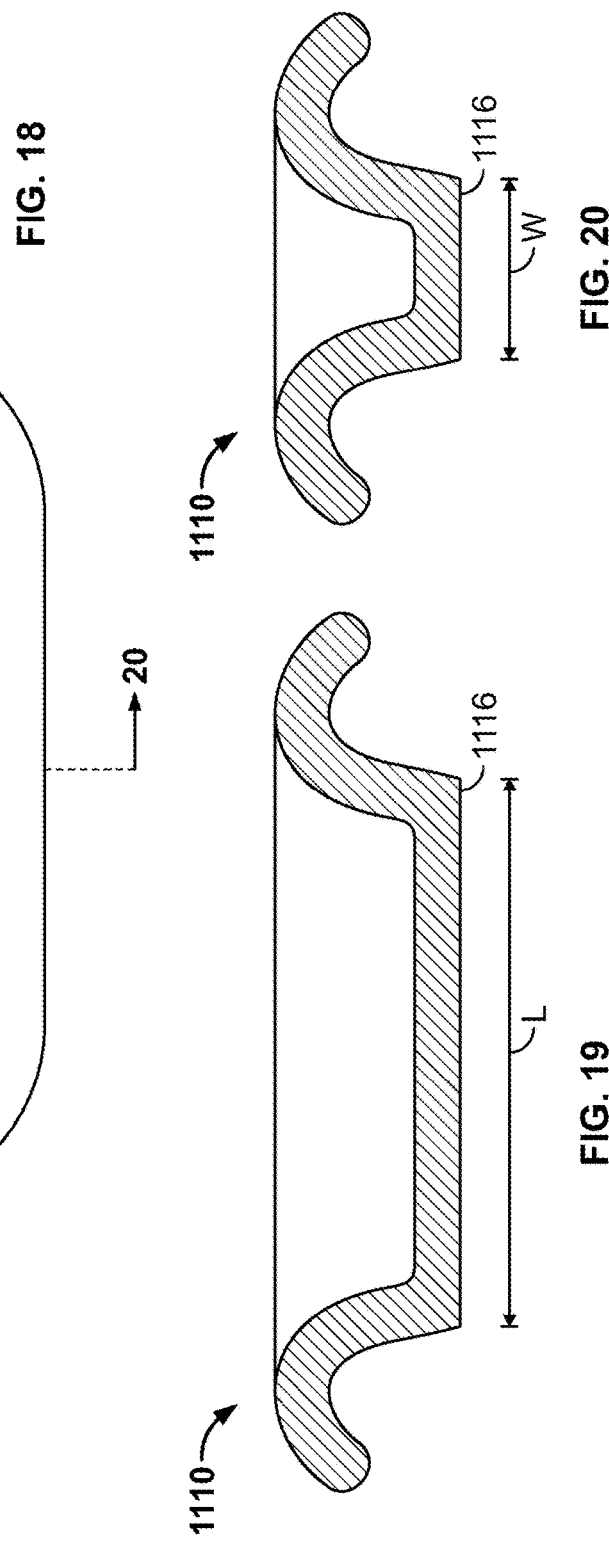

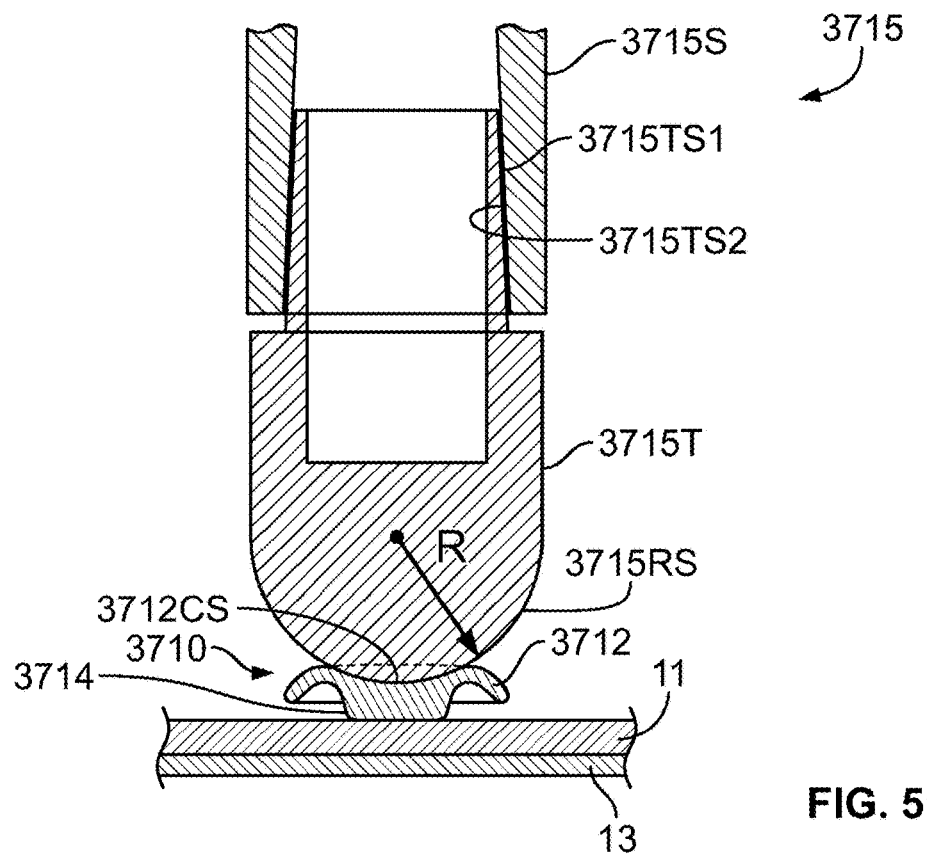
FIG. 51
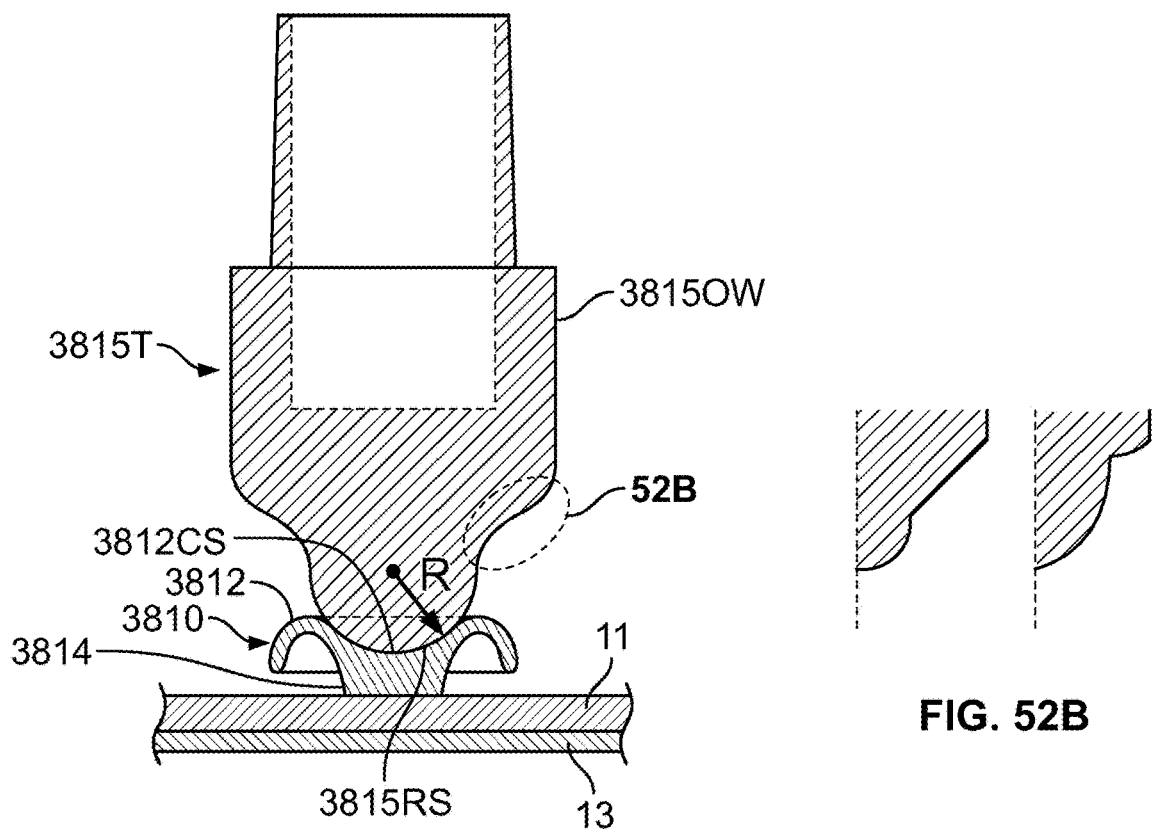
FIG. 52A
FIG. 52B

RESISTANCE WELDING FASTENER, APPARATUS AND METHODS

CROSS-REFERENCE TO RELATED APPLICATIONS

This application is a divisional of U.S. application Ser. No. 17/519,905, filed Nov. 5, 2021, which is a divisional of U.S. application Ser. No. 16/210,599, filed Dec. 5, 2018, now U.S. Pat. No. 11,196,185 issued on Nov. 21, 2021, which is a continuation of U.S. application Ser. No. 14/611,555, filed Feb. 2, 2015, now U.S. Pat. No. 10,903,587 issued on Jan. 26, 2021, which claims the benefit of U.S. Provisional Application No. 61/934,951, filed Feb. 3, 2014, all entitled "Resistance Welding Fastener, Apparatus and Methods," and each of which is incorporated by reference here in its entirety.

FIELD

The present invention relates to fasteners, fastening apparatus and methods for fastening parts and more particularly, for fastening metals, including dissimilar metals.

BACKGROUND

Various fasteners, apparatus and methods for joining and assembling parts or subunits are known, such as welding, riveting, threaded fasteners, etc. In some instances, there is a need to cost effectively join aluminum parts, subunits, layers, etc., to other parts, subunits, layers, etc. made from other materials, such as steel (bare, coated, low carbon, high strength, ultra high strength, stainless), titanium alloys, copper alloys, magnesium, plastics, etc. Solutions for these fastening problems include mechanical fastener/rivets in combination with an adhesive and/or a barrier layer to maintain adequate joint strength while minimizing corrosion, e.g., due to the galvanic effect present at a junction of dissimilar metals. Direct welding between aluminum and other materials is not commonly employed due to intermetallics generated by the aluminum and the other materials, which negatively affect mechanical strength and corrosion resistance. In cases where direct welding is employed, it is typically some type of solid-state welding (friction, upset, ultrasonic, etc.) or brazing/soldering technology in order to minimize the intermetallics, but the mechanical performance of such joints is sometimes poor or only applicable to unique joint geometries.

In the automotive industry, the incumbent technology for joining steel to steel is resistance spot welding (RSW), due to cost and cycle time considerations (less than 3 seconds per individual joint and which may be performed robotically). Known methods for joining aluminum to steel, include: use of conventional through-hole riveting/fasteners, self-pierce riveting (SPR), use of flow drill screws (FDS or by trade name of EJOTS), friction stir spot welding/joining (FSJ), friction bit joining (FBJ), and use of adhesives. Each of these processes is more challenging than steel-to-steel resistance spot welding (RSW). For example, when high strength aluminum (above 240 MPa) is coupled to steel using SPR, the aluminum can crack during the riveting process. Further, high strength steels (>590 MPa) are difficult to pierce, requiring the application of high magnitude forces by large, heavy riveting guns. FSJ is not widely employed in the automotive industry since joint properties (primarily peel and cross tension) are low compared to SPR. In addition, FSJ requires very precise alignment and fitup. As the thickness of the joint increases, the cycle times for the process can increase dramatically where a 5 mm to 6 mm joint stack-up may require 7 to 9 seconds of total processing time, which is well above the 2 to 3 second cycle time of RSW when fabricating steel structures. FBJ employs a bit which is rotated through the aluminum and is then welded to the steel. This process requires very precise alignment and fit-up similar to FSJ and high forging forces are required for welding to steel. FDS involves rotating a screw into the work pieces, plasticizing one of the sheets, which then becomes interlocked with the screw's thread. FDS is typically applied from a single side and requires alignment with a pilot hole in the steel sheet, complicating assembly and adding cost. Alternative fasteners, apparatus and methods for joining and assembling parts or subunits therefore remain desirable.

SUMMARY

In some embodiments, a tip for a welding electrode includes a first end; a second end opposite the first end; a first portion extending from the first end to a first location between the first end and the second end, wherein the first portion includes a first diameter; and a second portion extending from the second end to a second location between the first end and the second end, wherein the second portion includes a second diameter, wherein the first diameter is larger than the second portion, and wherein the second end is a radiused end.

In some embodiments, the tip includes a bottle nose shape. In some embodiments, the tip is configured to apply a resistance welding fastener to a structure. In some embodiments, the second end is configured to contact the resistance welding fastener. In some embodiments, the tip includes a transition portion from the first location to the second location. In some embodiments, the transition portion includes a conical wall, wherein the first portion includes an outer wall, and wherein the conical wall is disposed at an angle relative to the outer wall. In some embodiments, the conical wall is 45 degrees relative to the outer wall.

In some embodiments, the transition portion includes a double curved wall portion. In some embodiments, the double curved wall portion includes a first curved wall portion extending from the first location to a third location between the first location and the second location, and second curved portion extending from the second location to the third location. In some embodiments, the first curved wall portion is convex, and wherein the second curved portion is concave. In some embodiments, the first curved wall portion is concave, and wherein the second curved portion is convex. In some embodiments, the transition portion includes an outer surface having a radius. In some embodiments, the radius of the outer surface is at least two times of a radius of the radiused end. In some embodiments, the radiused end has a radius of 2 mm to 8 mm. In some embodiments, the radiused end has a radius of 3 mm to 6 mm. In some embodiments, the radiused end has a radius of 50 mm to 150 mm.

In some embodiments, the tip is configured to weld the resistance welding fastener when the tip is at an angular offset relative to the structure. In some embodiments, the angular offset is up to and including 30 degrees. In some embodiments, the tip is configured to be removably attached to the welding electrode.

In some embodiments, a system, comprising a welding electrode; and a tip attached to the welding electrode, wherein the tip includes a first end, a second end opposite the first end, a first portion extending from the first end to a first location between the first end and the second end, wherein the first portion includes a first diameter; and a second portion extending from the second end to a second location between the first end and the second end, wherein the second portion includes a second diameter, wherein the first diameter is larger than the second diameter portion, wherein the second end is a radiused end, and wherein the tip is attached to the welding electrode at the first end.

BRIEF DESCRIPTION OF THE DRAWINGS

For a more complete understanding of the present disclosure, reference is made to the following detailed description of exemplary embodiments considered in conjunction with the accompanying drawings.

FIGS. 18-20 are plan, and cross-sectional views, respectively, of a fastener in accordance with an alternative embodiment of the present disclosure.

FIG. 51 is a diagrammatic, cross-sectional view of a welding electrode and a fastener in accordance with an alternative embodiment of the present disclosure, positioned on a pair of layers.

FIG. 52 is a diagrammatic, cross-sectional view of a welding electrode tip and a fastener in accordance with an alternative embodiment of the present disclosure, positioned on a pair of layers.

DETAILED DESCRIPTION

Figure 2:
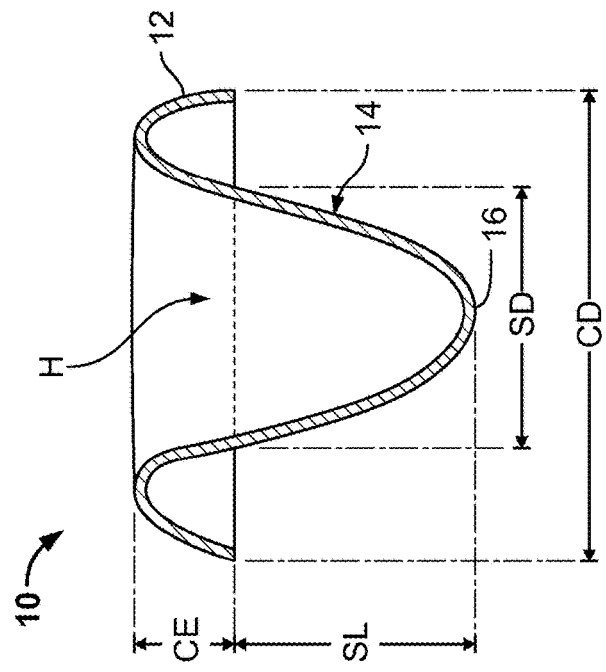
FIG. 2 is a cross-sectional view of the fastener of FIG. 1 taken along section line 2-2 and looking in the direction of the arrows.
Figure 3:
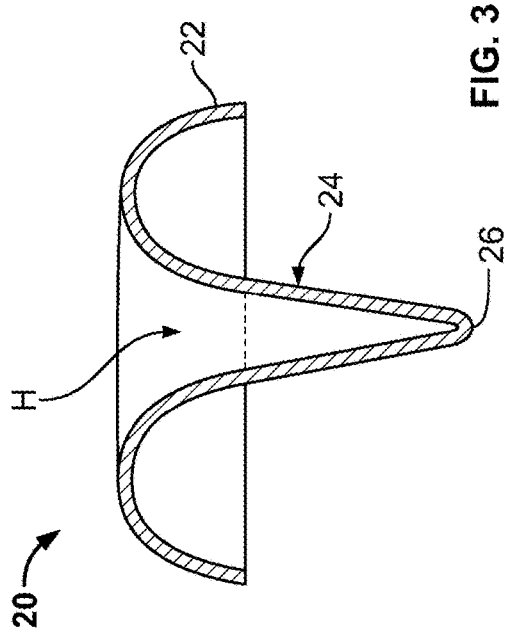
FIG. 3 is a cross sectional view of a fastener like that shown in FIG. 2, but having different dimensions.
Figure 1:
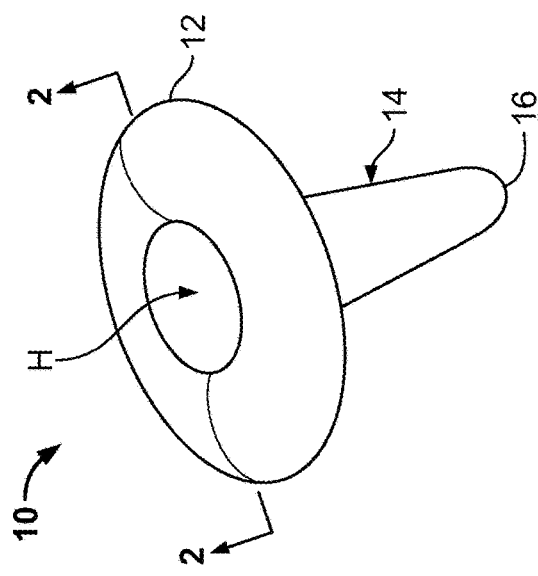
FIG. 1 is a perspective view of a fastener in accordance with an embodiment of the present disclosure.

FIGS. 1 and 2 show a fastener 10 having a peripheral cap 12 and a tapered shaft 14 that has a bluntly pointed end 16 opposite to the cap 12. An internal hollow H extends through the cap 12 and into the shaft 14. The fastener 10 may be made from a conductive metal, e.g., steel or titanium, that is capable of supporting a resistance spot welding process. The cap 12 has an edge-to-top dimension CE, and diameter CD. The stem has diameter SD and length from cap 12 to end 16 of SL. As described below, these dimensions may be varied depending upon the use to which the fastener 10 is put, e.g., the thickness and type of parts that the fastener 10 is used to join. In one example, the diameter CD may be in the range of about 4 mm to 16 mm, the length SL in the range of about 3 mm to 10 mm, CE in the range of about 0.5 to 3.0 mm and SD in the range of about 2 to 12 mm. FIG. 3 shows a fastener 20, like that of FIG. 1, but having different dimensions, i.e., having a thinner shaft 24 with a more severely pointed end 26.

Figure 4:
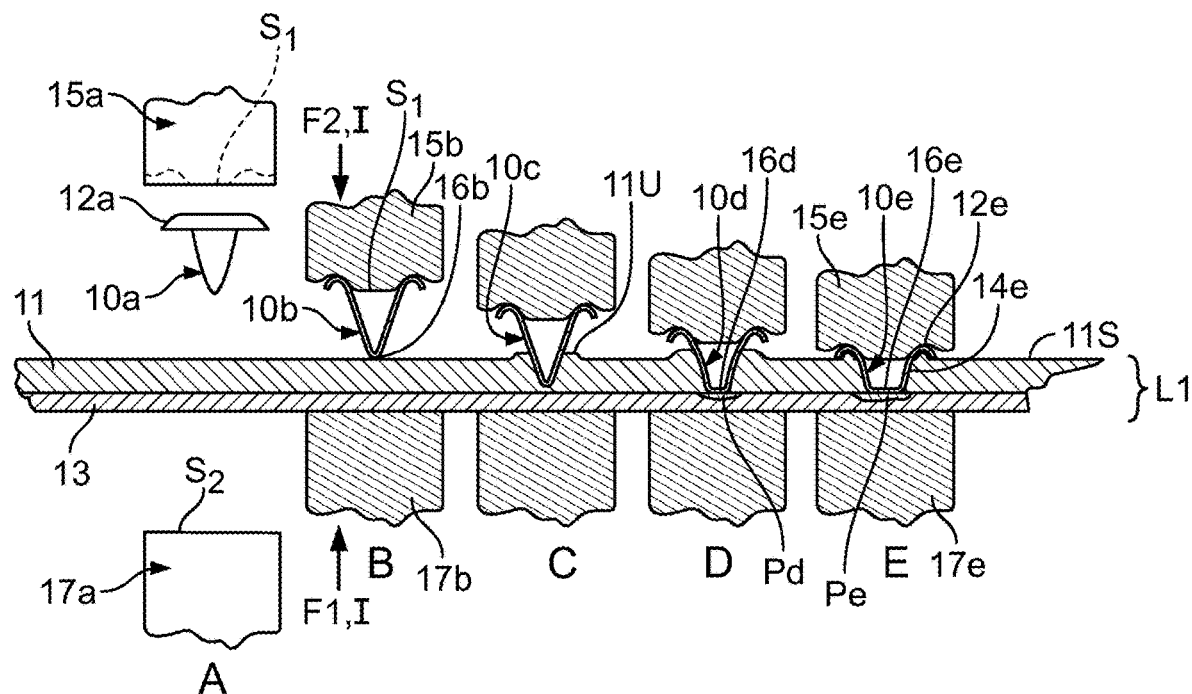
FIG. 4 is a diagrammatic view sequentially showing the insertion of a fastener in accordance with an embodiment of the present disclosure through a first layer and being welded to a second layer.

FIG. 4 shows the insertion of a fastener 10a in accordance with an embodiment of the present disclosure through a first layer of metal 11, e.g., an aluminum alloy, and being welded to a second layer of metal 13, e.g., a steel alloy, to form a laminate structure L1. This is shown in sequential stages labeled A-E. As shown at stage A, this process may be conducted at a conventional spot welding station having opposing electrodes, the tips 15a and 17a of which are shown spaced apart from the metal sheets/layers 11, 13, allowing the fastener 10a to be inserted between the tip 15a and the layer 11. The tip 15a may have a surface S1 with a shape that accommodates, supports, shapes and/or retains the fastener 10a through the welding process. At stage B, opposing forces F1, F2 exerted by the conventional welding machine (not shown) to move the tips 15b, 17b towards one another, capture the fastener 10b and the layers 11, 13 there between and an electric current I is applied through the conjunction of these elements. The forces F1, F2 and current I are applied throughout the stages B-E and the magnitude and duration of each may be varied depending upon the requirements at each stage. For example, the current I required to heat/plasticize the aluminum in stage B may be less than that required to weld steel to steel as occurs in stages D and E. Similarly, the forces F1 and F2 may be varied to accommodate changing processing requirements.

The current I heats each of the fastener 10b, and the layers 11, 13 to a temperature at which the aluminum layer 11 plasticizes and can be displaced/pierced by the fastener 10*b*. The aluminum layer 11 is heated resistively by current I and also through conduction from both the fastener 10*b* and the layer 13. The fastener 10*b* and the layer 13 have lower heat and electrical conductivity than the aluminum layer 11, such that a low current typically achieved with a resistance spot welder suitable for making resistance spot welds in steel can be used to generate the heat required to plasticize the aluminum layer, as well as make the weld to layer 13, as described below. Since aluminum has a lower melting point than the steel layer 13 or the fastener 10*b*, which in this example is also steel, the aluminum layer 11 reaches a plastic state permitting displacement by the fastener 10*b* and allowing the end 16*b* of the fastener 10*b* to penetrate the aluminum layer 11. As shown at stage C, the insertion of the fastener 10*c* into the aluminum layer 11 causes an upwelling 11U of displaced plasticized aluminum rising above the original upper surface 11S of the layer 11. As shown at stage D, the fastener 10*d* penetrates the layer 11 completely and comes into contact with the steel layer 13 whereupon the end 16*d* of the fastener 10*d* begins to melt and flatten and a zone Pd of molten metal begins to form at the interface of the layer 13 and the end 16*d* of the fastener. The zone Pd is the weld material or "nugget" where the metal of the fastener 10*d* and the layer 13 liquify and commingle. As shown at stage E, the continued application of converging forces F1, F2 and current I result in a further blunting and melting of the end 16*e* and a portion of the length of the stem 14*e*, along with the enlargement of the molten zone Pe. Stage E also shows the cap 12*e* has descended down to the level of the upper surface 11S, covering and sealing the upwelling 11U attributable to the insertion of the fastener 10*e* fully into the layer 11 of aluminum.

After having accomplished stage E, the forces F1, F2 and current I can be removed and the tips 15*e* and 17*e*, withdrawn. The foregoing process can be conducted with barrier layers, e.g., an adhesive layer of surface pre-treatment or paint/primer (not shown) applied to the surface 11S and/or between the layers 11, 13, so long as the barrier layer does not prevent the current I from flowing to create electrical resistance heating. In this manner, the contact between dissimilar metals of layers 11,13 can be reduced, along with unwanted galvanic interaction and corrosion. The partial melting of the fastener 10 during the penetration and welding phases of the process allows the fastener 10*a* to accommodate a range of thicknesses of layer 11.

The cap 12*a* of the fastener 10*a* defines an annular recess that can receive, capture and seal off aluminum and intermetallics generated from the penetration (stages B and C) and welding (stages D and E) as the cap 12*a* "bottoms out" on the surface 11S of the aluminum layer 11. This containment of the aluminum and intermetallics may significantly improve the corrosion performance and joint strength attributable to the fastener 10*a*. The cap 12*a* can be formed in the fastener 10*a* prior to the welding process or can be formed in-situ during welding. As described more fully below in reference to FIG. 8, the geometry of the fastener 10*a* and its interaction with/retention by tip 15*a* and surface S1 enables single-sided welding (welding from one side without an electrode contacting member 13 directly in opposition to the electrode tip 15*a* to provide a counter force). The tip 15*a*, may be shaped to be grasped by the fastener 10*a* via a resilience or spring loading of the fastener 10*a* which retains the fastener 10*a* on the tip 15*a* during welding, but detach once the weld has been completed. For example, the tip 15 may have a peripheral ledge or concavity that an upper edge of the fastener 10*a* resiliently and removable grasps.

The fastener 10 may be formed from thin sheet steel, e.g., about 1 mm to 4 mm in thickness, but can be made in any given thickness as determined by the thickness of the layers 11, 13, with greater thickness in the layers requiring greater thickness of the fastener. Alternatively, the shaft 14 of the fastener 10 may be solid or semi-solid. Regardless of the thickness/hollowness of the fastener (density for a given surface area) the shaft 14 may be proportioned to collapse when the end 16 is welded to the sheet 13, such that the cap contacts the upper surface 11S of sheet 11 and/or seals off any intermetallics and upwelled areas 11U when welding is completed (stage E).

The final dimensions of the weld zone Pe will depend upon the starting and final dimensions of the fastener shaft 14*e*, i.e., diameter, length and the thickness of the shaft walls. The greater the dimensions of the fastener shaft 14*e*, the greater the dimensions of the weld zone Pe. In one example, attaching sheet 11 composed of aluminum of thickness 0.5 mm to 4.0 mm to sheet 13 composed of steel of 0.5 mm to 3.0 mm thickness, a weld diameter in the range from 2 mm to 8 mm would exhibit beneficial shear and peel strength properties.

Figure 5:
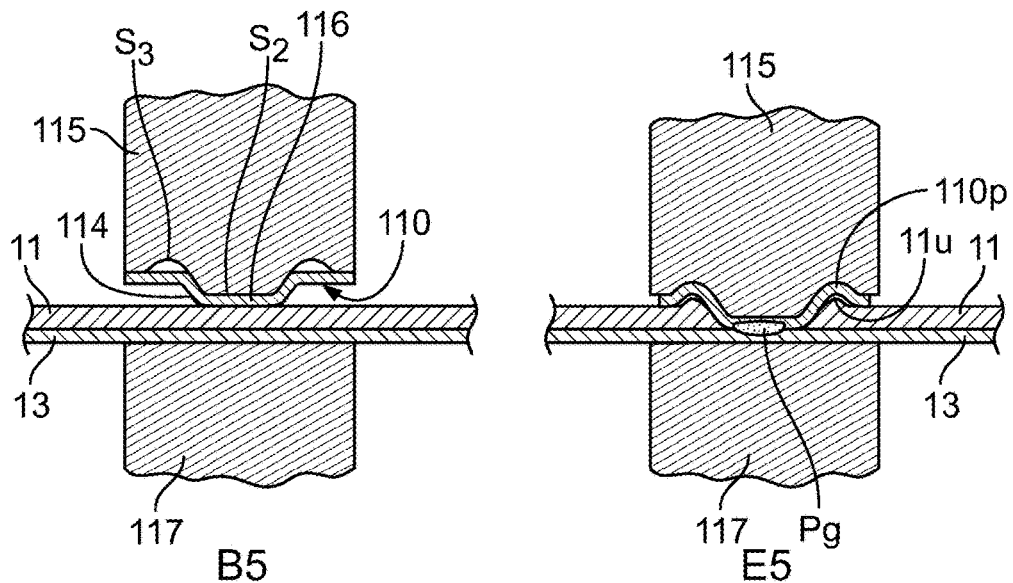
FIG. 5 is a diagrammatic view sequentially showing the insertion of a fastener in accordance with another embodiment of the present disclosure through a first layer and being welded to a second layer.

In order to minimize weight in a finished welded product made with the fasteners 10 of the present disclosure, the gauge of the sheet employed for making the fastener 10 may be reduced. As a result, the reduced sidewall strength of the fastener shaft 14 may cause it to prematurely collapse during the welding process. In order to support the shaft 14, the electrode 15*a* can be formed to extend into the hollow H to partially or fully engage the inner surface of the shaft 14 within the hollow H. FIG. 5 shows an alternative fastener 110 in two phases in the welding process, viz., phase B5 prior to extruding through the layer 11 and phase E5—after welding. An electrode tip 115 having a surface S2 that supports the end 116 of the fastener 110, allows the end 116 to be pushed through the layer 11 without the end 116 or shaft (sidewall) 114 deforming. The tip 115 has a concave annular surface S3 that can receive and form/shape a corresponding area of the fastener periphery 110*p* in response to the fastener 110 being pressed against the upwelling 11U when the fastener is pressed fully through layer 11 to form the weld zone Pg as shown in phase E5.

Figure 6:
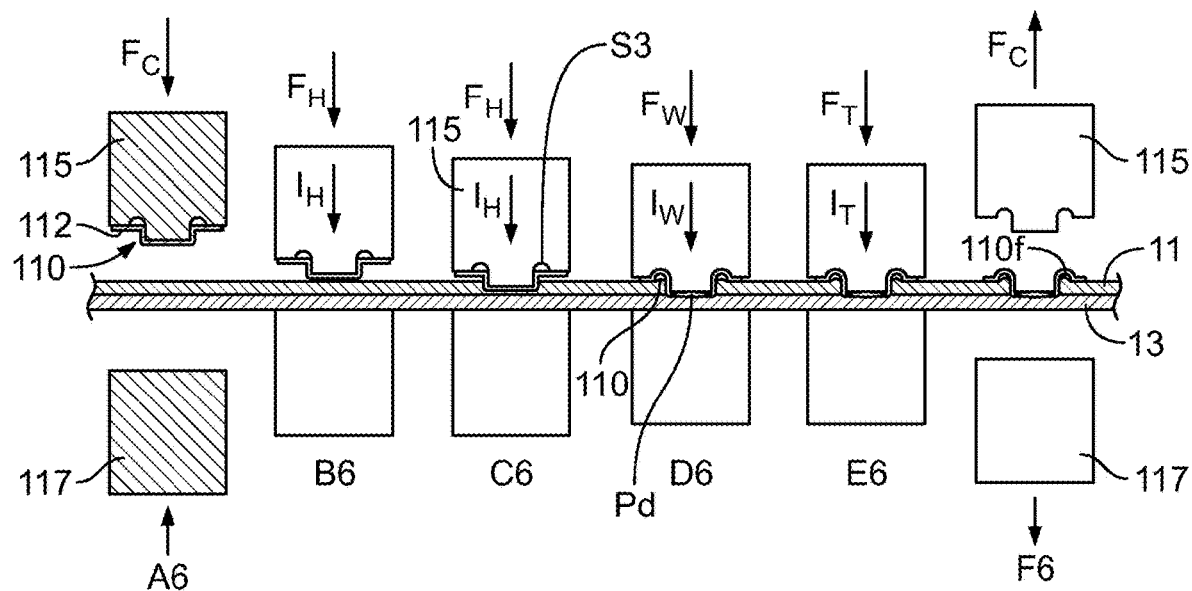
FIG. 6 is a diagrammatic view sequentially showing the insertion of a fastener in accordance with another embodiment of the present disclosure through a first layer and being welded to a second layer.

FIG. 6 shows a more comprehensive sequence of steps A6-F6 in use of the fastener 110 to perform spot welding through an upper layer 11, e.g., an aluminum sheet, to fasten the upper layer 11 to a lower layer 13, e.g., a steel sheet. As can be appreciated, this process could also be called "resistance spot fastening" or "resistance spot riveting," in that the fastener 110 could be described as a rivet that is plunged through the layer 11, making a hole in the layer 11 and joining to the layer 13 by welding, the cap 112 of the fastener clamping the layer 11 against the layer 13. As the fastener 110 penetrates the top layer 11 and engages the bottom layer 13, the concave annular surface S3 in the electrode tip 115 encapsulates and seals against the layer 11, in particular, the upwelling 11U. In one example, stage B6 and C6 may have an associated force $F_H$ of a magnitude of, e.g., from 600 to 2000 pounds and a current level $I_H$ of a magnitude of, e.g., from 4,000 to 24,000 amperes, that is appropriate for plasticizing the first layer 11 of aluminum having a thickness of 2 mm and welding to a second layer 13 of 780 MPa galvanized coated steel with a thickness of 1.0 mm, by a fastener of low-carbon steel with a 16 mm overall diameter, a total height of 3 mm and average wall thickness of 1.0 mm. These magnitudes of force and current are just exemplary and are dependent upon the dimensions and compositions of the fastener 110 and the layers 11 and 13. The duration of time to transition from stage B6 to C6 may be in the order of 0.2 to 2.0 secs. Pursuing this example further and using the same dimensions and properties of the fastener 110 and layers 11, 13, stage D6 may utilize an associated force $F_W$ of a magnitude of, e.g., from 500 to 800 pounds and a current level $I_W$ of a magnitude of, e.g., from 6,000 to 18,000 amperes, that is appropriate for initiating the melting of the fastener 110 and the lower level 13 to form a molten weld zone Pd. The magnitude of force $F_W$ may be changed to a force $F_T$ of a magnitude of, e.g., from 600 to 1,000 pounds and a current level $I_T$ of a magnitude of, e.g., from 3,000 to 12,000 amperes at stage E6 to form an expanded weld zone to temper the weld and to render it with an average cross-sectional diameter of 4 mm to 6 mm. The completion of stage D6 may take, e.g., 0.1 to 0.5 secs. At stage F6, the first and second electrode tips 115, 117 may be withdrawn. As can be appreciated, since the upwelling 11U forces the cap 112 to conform to the surface S3, establishing a close relative fit, there may be some resistance to withdrawing the first tip 115 from the fastener 110f at stage F6. In some applications, it may also be preferred to utilize a pre-formed fastener to reduce withdrawal force, cycle time and to reduce the amount of welding force $F_W$ needed to shape the cap 112 to conform to the surface S3 and the upwelling 11U.

Figure 7:
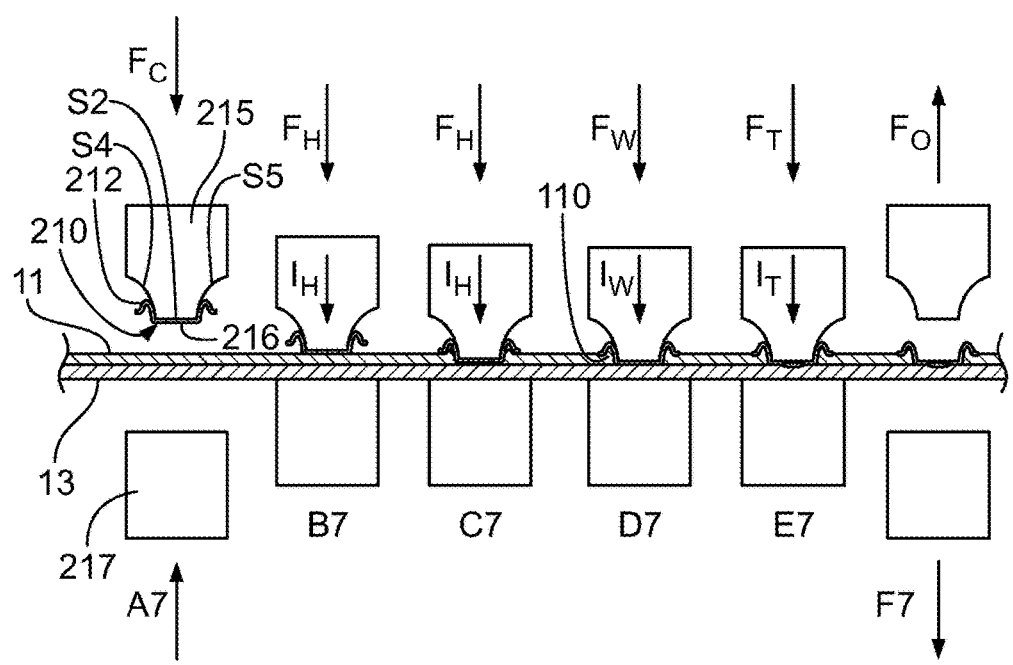
FIG. 7 is a diagrammatic view sequentially showing the insertion of a fastener in accordance with another embodiment of the present disclosure through a first layer and being welded to a second layer.

FIG. 7 shows a sequence of steps A7-F7 in use of a fastener 210 to perform spot welding through an upper layer 11, e.g., an aluminum sheet, to fasten the upper layer 11 to a lower layer 13, e.g., a steel sheet. The fastener 210 is preformed to have a shape similar to the fastener 110 after it has been formed by the welding force shown in stages D6 and E6 of FIG. 6, such that the upper section can encapsulate and seal the top surface without the need to be formed by the electrode during the welding process. Since the fastener 210 is preformed, the electrode tip 215 does not require the concave annular surface S3 to shape the cap 212 to accommodate and seal against upwelling 11U of the first layer 11 proximate where it is penetrated by the fastener 210. As a result, the electrode tip 215 can taper (be radiused at surfaces S4, S5 to the surface S2 supporting the end 216 of the fastener 210. This allows the concentration of heating, welding, and tempering forces $F_H$, $F_W$, $F_T$ as well as the heating, welding, and tempering currents $I_H$, $I_W$, $I_T$ over a smaller area, allowing reduced force and current to accomplish the tasks of penetration, welding and tempering.

Figure 8:
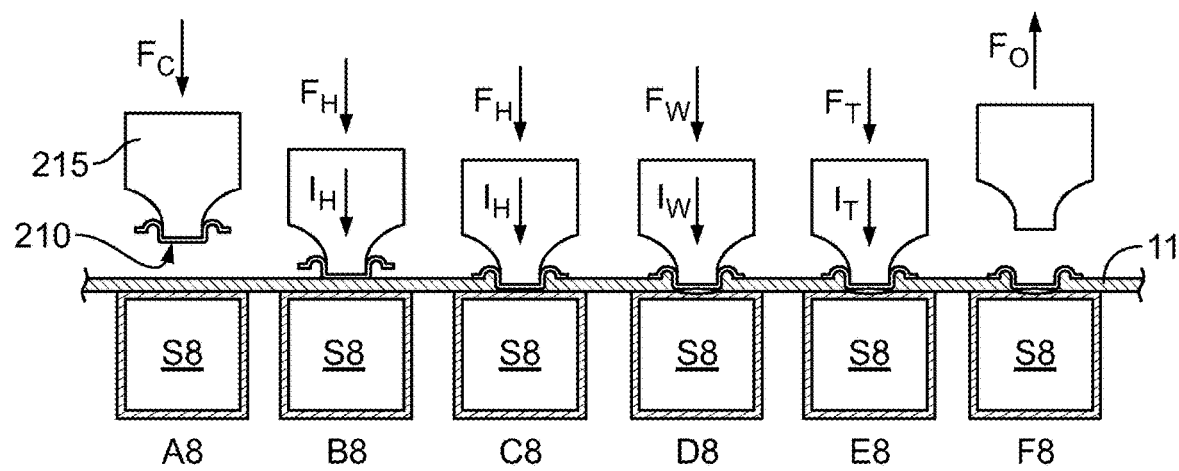
FIG. 8 is a diagrammatic view sequentially showing the insertion of a fastener like that shown in FIG. 7 through a first layer and being welded to a tubular member via single sided access.

FIGS. 4-7 depict direct access welding wherein the resistance welding electrodes, e.g., 15a, 17a, clamp the work pieces/welding stack 10a, 11, 13 from opposing sides. As shown in FIG. 8, spot welding using a fastener 10, 20, 110, 210, in accordance with the present disclosure can be conducted from one side using indirect welding. A structure S8, such as a steel beam or any other type of structure may be connected to one pole of a source of electrical potential for conducting welding. The other pole provides electrical power to welding tip 215 to supply electrical power for heating at stages B8 and C8, welding at D8 and tempering at E8. Indirect welding is commonly done on steel, but is difficult to conduct on aluminum to aluminum joints. Since the present disclosure permits welding with a fastener made from materials other than aluminum, it facilitates the conjunction of an aluminum layer 11, e.g., an aluminum sheet, to a steel structure S8, such as a steel tube.

Figure 9:
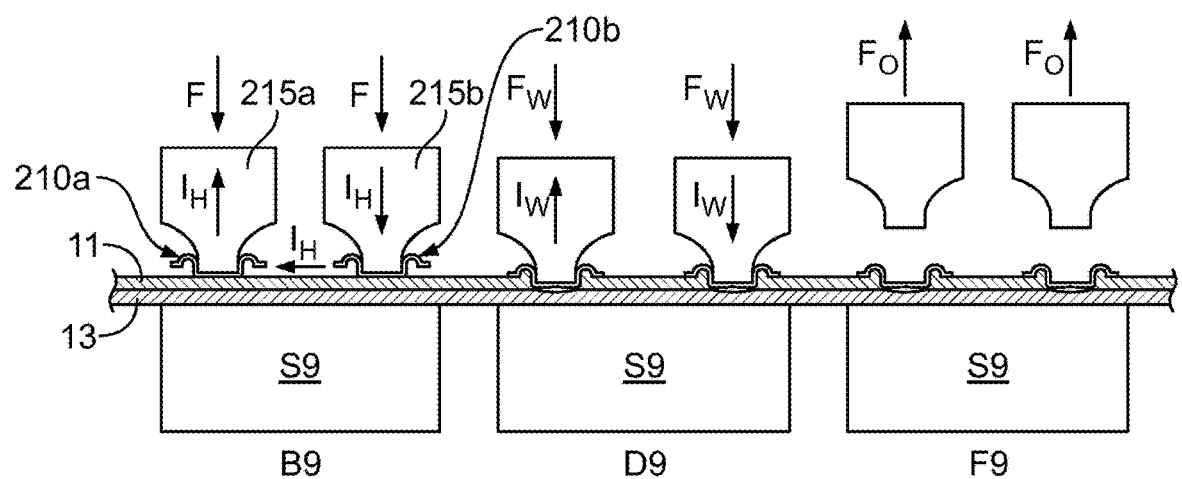
FIG. 9 is a diagrammatic view sequentially showing the insertion of a fastener like that shown in FIG. 7 through a first layer and being welded to a second layer in series weld formation.

In series welding, two or more electrodes approach from a single side. Multiple welds are then produced as the welding current flows between multiple guns in a series fashion. FIG. 9 shows that the welding process and apparatus of the present disclosure can be utilized in conducting series welding fasteners 210a and 210b to join layers/members 11, 13 in a single welding operation. Current $I_H$ passes through electrode 215a, layers 11, 13, through a conductive backer bar S9, then back through layers 11, 13 to electrode 215b. As before, the current $I_H$ heats layer 11 allowing penetration by fasteners 210a, 210b, the fasteners welding on contact with layer 13. The overall process is similar to that explained above, but only stages B9, D9 and F9 are shown. Series welding is not typically conducted on aluminum but is commonly done using steel materials. Since the present disclosure permits welding with a fastener made from materials other than aluminum, it facilitates the conjunction of an aluminum layer 11, e.g., an aluminum sheet, to a steel layer/sheet 13 or structure, such as a steel tube or box structure via series welding.

While the foregoing examples refer to a fastener 10, 20, 110, 210 made from steel, the fastener 10, 20, 110, 210 may be made from any material and the first layer 11 and succeeding (second) layer(s) 13 may also be varied in composition and number. In order to penetrate an intervening layer like layer 11, the fastener 10 . . . 210 should be made of a material with a higher melting point than the intervening layer(s) 11 penetrated during the heating/penetrating phase, e.g., B6, C6 (FIG. 6). In order to conduct the welding phase, e.g., D6, the fastener 110 material must be compatible with the layer to which it is to be resistance welded, e.g., layer 13. For example, if the layer 13 is made from high strength (>590 MPa) galvanized steel, then the fastener 110 may be made, e.g., from standard, low-carbon steels, high strength steels (>590 MPa) or stainless steel grades.

Figure 10:
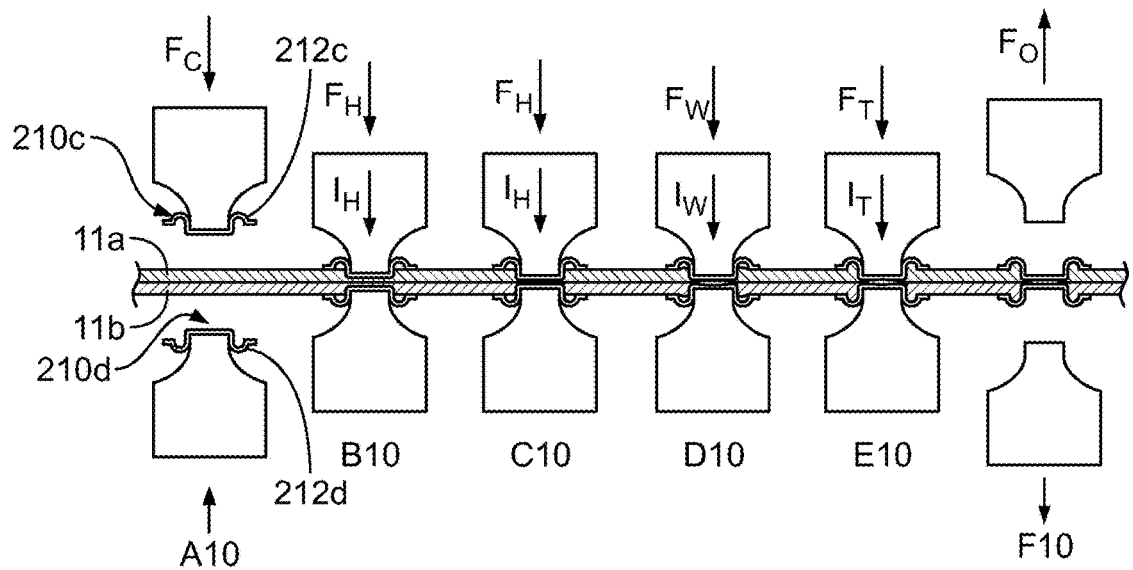
FIG. 10 is a diagrammatic view sequentially showing the insertion of opposed fasteners like those shown in FIG. 7 through first and second layers and being welded to each other.

FIG. 10 shows that a fastener 210c may be used with an opposing fastener 210d to conjoin a pair of layers 11a,11b, e.g., made from aluminum or magnesium, by spot welding to one another, such that the caps 212c, 212d capture the layers 11a, 11b there between. The procedure shown in stages A10 to F10 mimics the above-described procedure, e.g., as described in reference to FIGS. 4-7, in that electrical resistance is used in heating, penetration of the layers and welding, but instead of the fasteners 210c, 210d reaching a layer 13 to which they are welded, they each penetrate the intervening layers 11a, 11b in opposite directions, meet and weld to each other.

Figure 11:
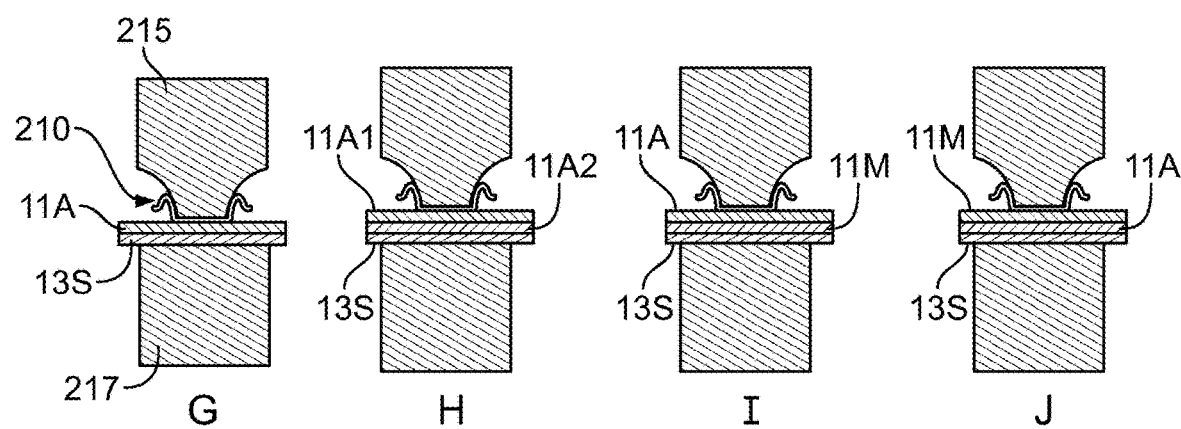
FIG. 11 is a diagrammatic view showing fasteners like those shown in FIG. 7 positioned next to different stacks of material layers to be fastened and prior to insertion or welding.

FIG. 11 shows that various combinations of layers may be joined in accordance with an embodiment of the present disclosure. As shown in combination G, the stack-up of materials may be aluminum 11A and steel 13S like the stack-up shown and described above in relation to FIG. 7 at stage B7. As described above, the fastener 210 can be pushed through the aluminum layer 11A and welded to the steel layer 13S. Combination H shows a stack-up of two layers of aluminum 11A1 and 11A2 with a steel layer 13S. As before, the fastener 210 can be pushed through the aluminum layers 11A1 and 11A2 and then welded to the steel layer 13S. Combination I shows a stack-up of a layer of aluminum 11A and a layer of magnesium 11M with a steel layer 13S. The fastener 210 can be pushed through the aluminum layer 11A and the magnesium layer 11M and then welded to the steel layer 13S. Combination J shows a stack-up of an outer layer of magnesium 11M an intermediate layer of aluminum 11A and a steel layer 13S. The fastener 210 can be pushed through the magnesium layer 11M and the aluminum layer 11A and then welded to the steel layer 13S. In each of the stack-ups shown in G, H, I and J, the fastener 210 may be used to secure the laminate structure shown. Other combinations of material, thicknesses and numbers of layers are possible to be secured by the fastener 210, 110, 20, 10 of the present disclosure.

Figure 12:
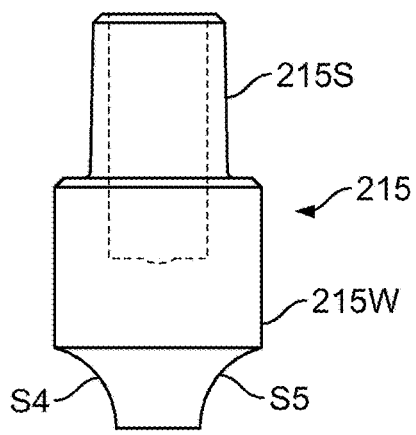
FIG. 12 is a side view of a spot welding cap in accordance with an embodiment of the present disclosure.

FIG. 12 shows a welding electrode tip 215 with a connector sleeve portion 215S and a welding portion 215W with radiused tapered surfaces S4 and S5. A tip like this is available from CMW Contacts Metal Welding www.cmwinc.com and is called a G-cap.

Figure 13A:
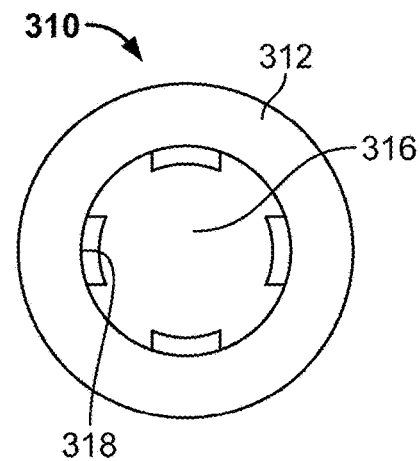
FIGS. 13a and 13b are plan and side views, respectively, of a fastener in accordance with another embodiment of the present disclosure.
Figure 13B:
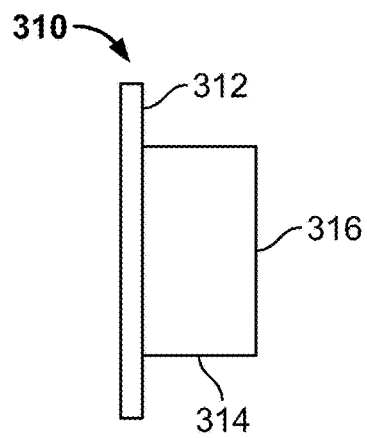

FIGS. 13a and 13b shows a cap nut repurposed to function as a fastener 310 in accordance with the present disclosure. The fastener 310 has a cap 312, a shaft 314 and an end 316. Lugs 318 for interacting with a mating tool 318 may be used to retain the fastener 310 on an electrode tip like tip 115 and may also be used to twist the fastener as it is pushed through an intermediate layer 11 and/or when it is welded to a layer 13.

Figure 14A:
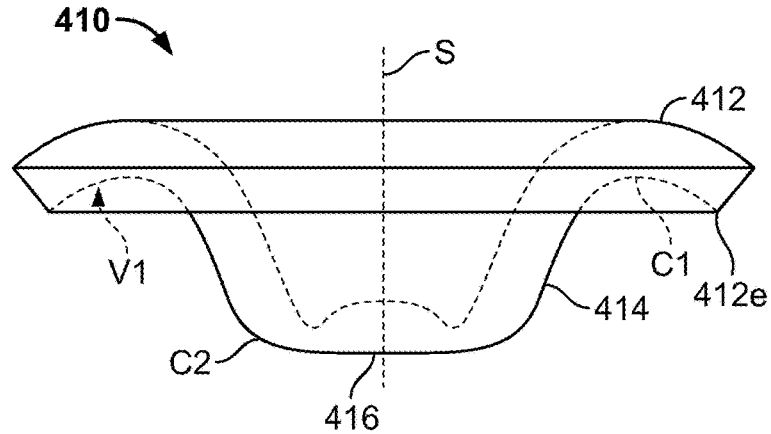
FIGS. 14a and 14b are side and plan views, respectively, of a fastener in accordance with another embodiment of the present disclosure.
Figure 14B:
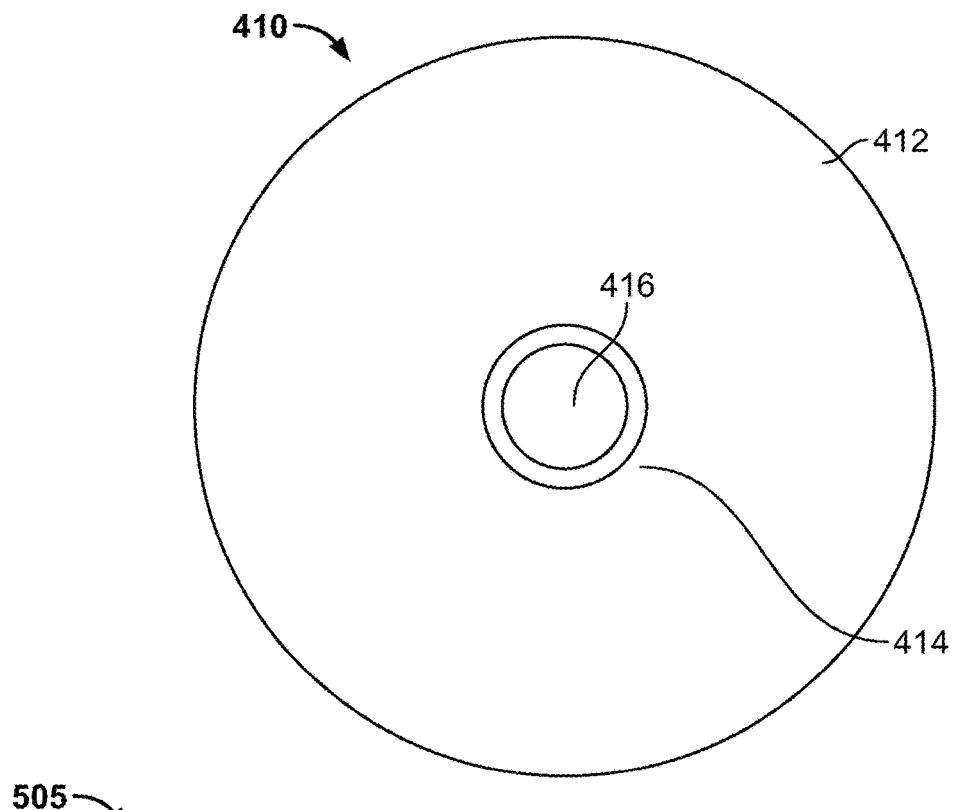
Figure 15:
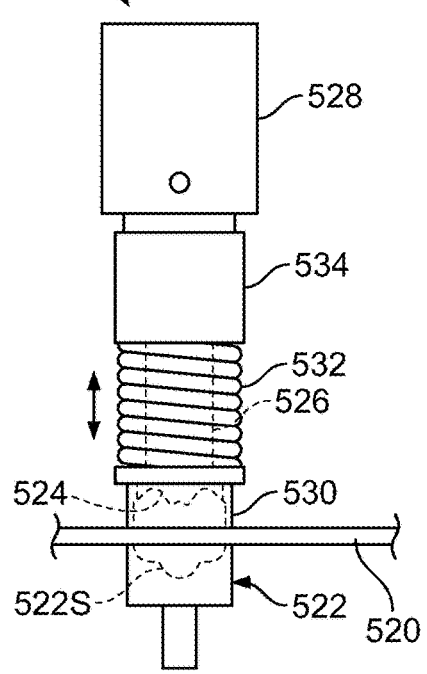
FIG. 15 is a side view of a fastener stamping tool in accordance with an embodiment of the present disclosure.

FIGS. 14a and 14b are side and plan views, respectively, of a fastener 410 in accordance with another embodiment of the present disclosure. The fastener 410 can be made as a stamping using a stamping tool and back-up die as shown in FIG. 15. The cap 412 transitions into the shaft 414 at curve C1 and the shaft 414 transitions into the end 416 at curve C2. The curve C1, when rotated about the axis of symmetry S of the fastener 410 and delimited by edge 412e and its projection on the shaft 414, circumscribes a volume V1 that can contain and seal off upwelling of the penetrated layer, e.g., as shown as 11U in FIG. 5.

FIG. 15 shows a fastener stamping tool 505 in accordance with an embodiment of the present disclosure. The stamping tool may be used to form fasteners like fastener 410 from stock material 520, e.g., a sheet of steel. The fastener stamping tool 505 has an upset die 522 with a forming surface 522S (shown in dotted lines). A shaping tool 524 (in dotted lines) driven by a punch 526 (shaft shown in dotted lines), which acts in conjunction with the upset die 522 to form a fastener 410 (FIG. 14a, b) from the stock 520. In the embodiment shown, the shaping tool 524 both cuts the fastener 410 from the stock 520 and shapes it as it is driven down through the stock 520 by the punch 526. Alternatively, disk-shaped blanks (not shown) having the dimensions required to form a fastener 410 may be cut from the stock by a separate punch and loaded into a blank holder 530 before the punch 526 is driven down against the upset die 522 to shape the blank into the fastener 410. A spring 532 may be inserted between a retainer cap 534 and the blank holder 530 to return the punch 526 to a neutral position after a fastener 410 has been stamped out by the fastener stamping tool 505. The punch 526 may be coupled to a punch holder 528 that is driven mechanically, hydraulically or pneumatically in a conventional manner for actuating punches and presses.

Figure 16:
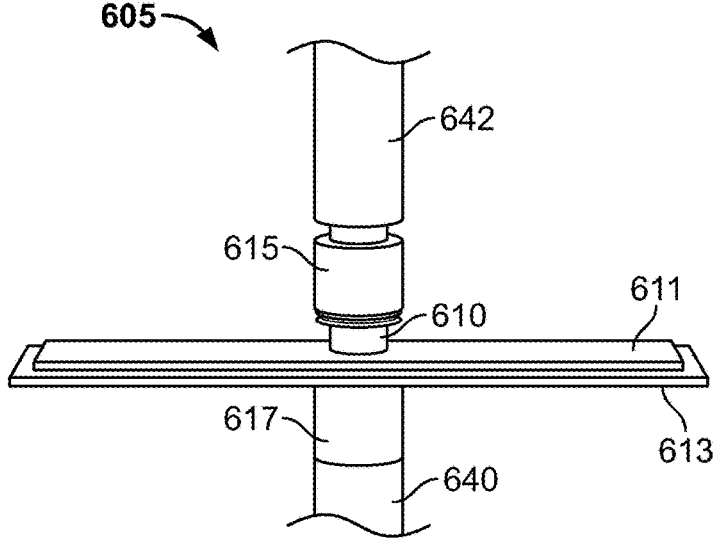
FIG. 16 is a perspective view of two metal sheets in a spot welding apparatus prior to applying a fastener in accordance with an embodiment of the present disclosure.

FIG. 16 shows welding stack-up 605 wherein a fastener 610 is positioned against first and second layers 611, 613 prior to penetration or welding. The first layer 611 may be an aluminum, magnesium or copper sheet and the second layer may be a steel, titanium or inconnel sheet. The layers 611, 613 and fastener 610 are clamped between first and second tips 615, 617 that are in electrical continuity with lower and upper electrodes 640, 642 of a commercially available electric spot welding machine, such as a 250 kVA welding station available from Centerline Welding, Ltd.

In one example of a welding operation conducted in accordance with the present disclosure, a commercially available 250 kVA AC resistance spot welding pedestal machine was employed to heat and plunge a fastener/rivet through an aluminum sheet and weld to a steel backing sheet. The upper electrode tip 615 was a commercially available electrode called a G-cap (similar to the tip 215 of FIG. 12) and the lower electrode tip 617 was a standard, flat faced (16 mm diameter, RWMA type C-Nose). A standard cap nut 610 as shown in FIGS. 13a and 13b was used for the rivet. The parts to join were 1.5 mm 7075-T6 aluminum alloy and 0.7 mm 270 MPa galvanized steel. The cap nut 610 was placed on the G-cap electrode 615 and then against the aluminum sheet 611 in the stackup as shown in FIG. 16. Current pulses about 1.5 secs. in duration at 9,000 amps were generated to cause the cap nut 610 to penetrate the aluminum sheet 611. After penetration, the cap nut 610 was welded to the steel with a current impulse around 15 kA for 0.166. A weld button, approximately 5 mm in diameter, between the steel cap nut and the 0.7 mm 270 MPa steel sheet was obtained.

Aspects of the present disclosure include low part distortion, since the layers to be fastened, e.g., 11, 13, are held in compression during the weld and the heat affected zone is primarily restricted to the footprint of the cap, e.g., 12 of the fastener 10. The fasteners, e.g., 10, 20, 110, 210, 310, 410, 610 form a volume relative to the first layer 11 to trap intermetallics or materials displaced by penetration of the fastener through the first layer 11. The fasteners, e.g., 10 . . . 610 can be used to fasten a range of layer thicknesses and number of layers of different kinds of materials, viz., by selecting a fastener of the appropriate dimensions and material composition. In addition, a given fastener 10 . . . 610 may be operable over a range of thicknesses due to the elasticity of the materials of which it is formed, as well as the shape of the fastener. For example, the cap 412 may elastically bend relative to the shaft 414 when the fastener 410 is used to accommodate various thicknesses and to resiliently press upon the layer(s), e.g., 11 when welded to layer 13. The resilient pressing of the cap 412 against a layer, e.g., 11 may contribute to establishing and maintaining a seal around the perimeter of the fastener 10 . . . 610 when it is in place.

The fastener 10 . . . 610 of the present disclosure may be applied through adhesives and/or other coatings applied between layers, e.g., 11, 13 and/or through coating applied to the top layer 11. The weld formed by use of the fastener, e.g., Pe in FIG. 4, does not penetrate the layer 13 nor disturb the surface of 13 opposite to the weld, preserving appearance, corrosion resistance and being water-tight. During fastener penetration, e.g., at stage C of FIG. 4 and the welding phase, stage D, the fastener 10c, 10d, 10e will continually collapse and expand along the weld zone Pd, Pe, pushing out intermetallics from the weld zone. The methodology and apparatus of the present disclosure is compatible with conventional RSW equipment developed for steel sheet resistance welding and the fastener, 10 . . . 610 can be made out of a variety of materials, such as, various steel grades (low carbon, high strength, ultra high strength, stainless), titanium, aluminum, magnesium, and copper. The fastener of the present disclosure may optionally be coated (galvanized, galvaneal, hot-dipped, aluminized) to improve corrosion resistance.

As noted above, the fastener 10 . . . 610 of the present disclosure may be used via single-sided or two-side access welding. The fastener 10 . . . 610 does not require a pilot hole, but can be also used with a pilot hole in the aluminum or top sheet. Pilot holes may also be used to allow electrical flow through dielectric layers such as adhesive layers or anti-corrosive coatings/layers. The weld quality resulting from use of the fastener 10 . . . 610 can be tested in accordance with quality assurance measurements applied to the cavity left by the weld, i.e., by measuring the dimensions of the cavity. Ultrasonic NDE techniques may also be utilized on the backside, e.g., of layer 13 (steel side) to monitor the weld quality.

Compared to FDS (EJOTS), SPR, and SFJ, the apparatus used to apply the fastener 10 . . . 610 of the present disclosure has a smaller footprint, allowing access to tighter spaces. The apparatus and method of the present disclosure uses lower insertion forces as compared to SPR since the first layer 11 is heated/softened during the fastener insertion phase, e.g., see stage C of FIG. 4. The methods and apparatus of the present disclosure provide the ability to join high strength aluminums (which are sensitive to cracking during SPR operations) and to join to high and ultra high strength steels, since there is no need to pierce the steel metal with the fastener but rather the fastener is welded to it.

The apparatus and method of the present disclosure does not require rotating parts and is conducive to resolving part fit-up issues since the overall process is similar to conventional resistance spot welding (RSW) with respect to how the component layers/parts are fixtured. In addition, the application of the fastener 10 . . . 610 can be conducted quickly providing fast processing speeds similar to conventional RSW. The apparatus and methods of the present disclosure can be applied to use on both wrought and cast aluminum products and may be used to produce a compatible metal joint rather than a bimetallic weld as when welding aluminum to steel, which may have low joint strength. As noted above, the apparatus and methods of the present disclosure may be used to conjoin multiple layers of different materials, e.g., two layers of aluminum, one layer of steel; one layer of aluminum, two layers of steel; or one layer of aluminum, one layer of magnesium, and one layer of steel.

Figure 17A:
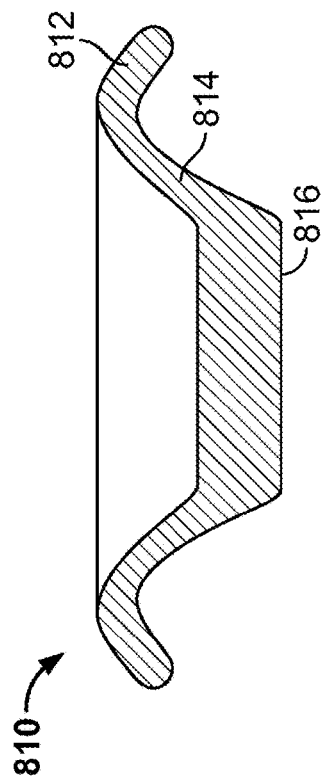
FIGS. 17a-17d are cross-sectional views of fasteners in accordance with alternative embodiment of the present disclosure.

FIG. 17a shows a cross-sectional view of a fastener 710 like fastener 410 of FIG. 14a, wherein the thickness of the cap 712, shaft 714 and end 716 are substantially of constant thickness. The end 716 is flat.

Figure 17B:
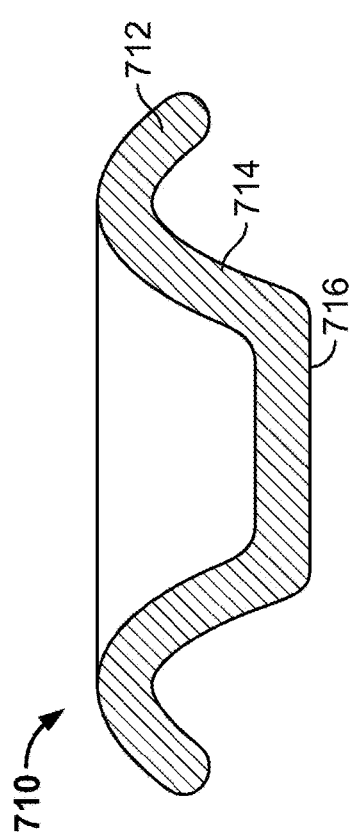

FIG. 17b shows a fastener 810 wherein the end 816 is flat and has a greater thickness than the shaft 814 of cap 812.

Figure 17C:
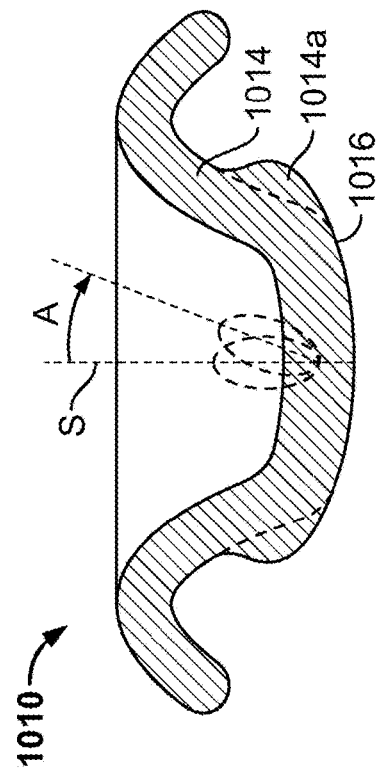

FIG. 17c shows a fastener 910 with a radiused end 916 having a constant thickness. In one example, the radius R is in the range of 1 to 6 inches.

Figure 17D:
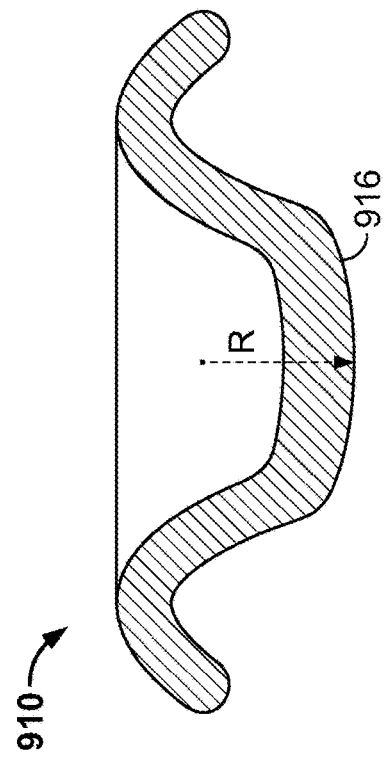

FIG. 17d shows a fastener 1010 having a radiused end 1016 and splines 1014s at the conjunction of the end 1016 and the shaft 1014. The splines 1014s may be aligned with the axis of symmetry/rotation S or disposed at an angle A relative thereto. The splines may be utilized to either guide the fastener in a particular direction, e.g., straight or in a spiral when the fastener is pressed through the layer 11 and/or may be used as an anti-rotation feature that prevent rotation of layer 11 relative to installed fastener 1010.

FIGS. 18-20 show a fastener 1110 having a length L greater than the width W thereof. In one example, the length L may be in the range 8 mm to 25 mm and the width in the range 4 mm to 8 mm.

Figure 21:
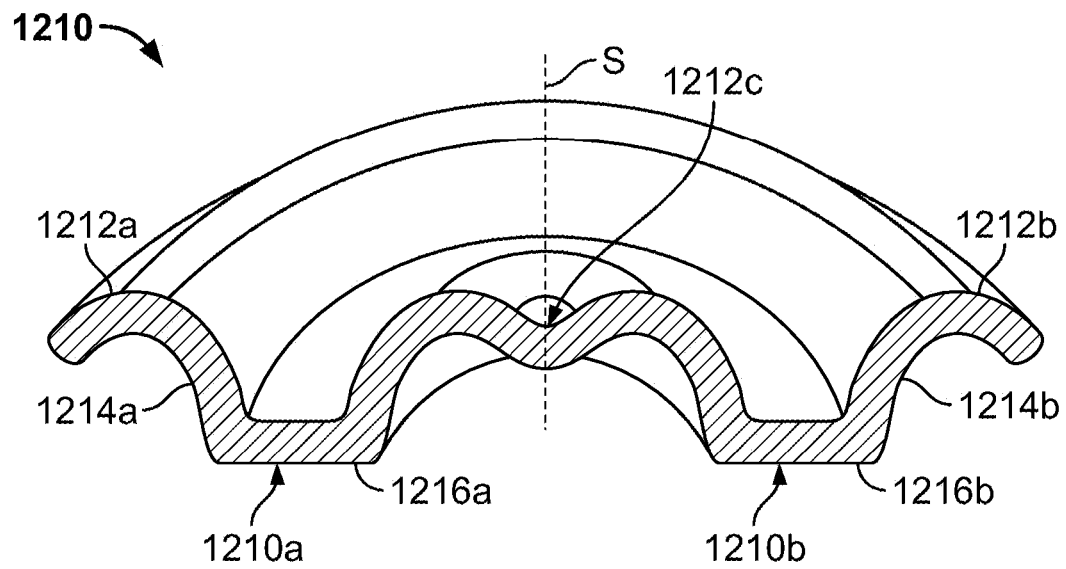
FIG. 21 is a cross-sectional view of a fastener in accordance with an alternative embodiment of the present disclosure.

FIG. 21 shows a fastener 1210 that in cross-section has left and right portions 1210a, 1210b that converge at 1212c. Fastener 1210 is a solid of rotation about line of symmetry/rotation S, such that the ends 1216a, 1216b form a continuous ring surface that may be welded to a substrate as further illustrated below.

Figure 22:
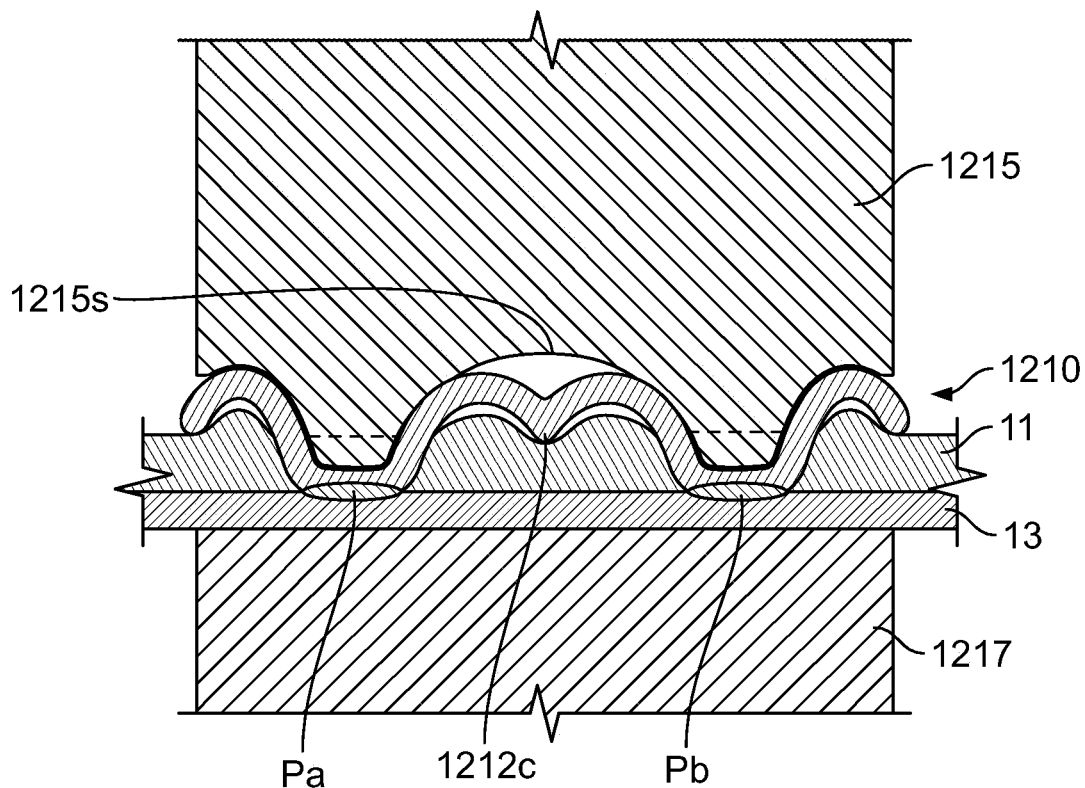
FIG. 22 is a diagrammatic, cross-sectional view of the fastener of FIG. 21 inserted through a first layer and being welded to a second layer.

FIG. 22 shows fastener 1210 inserted through first layer 11, e.g., made from aluminum and welded to layer 13, e.g., made from steel at weld zones Pa, Pb, which would have a continuous ring shape. The ring shaped weld would be distributed over a larger surface area then a disc shaped weld, as would be produced, e.g., by the use of a fastener like 410 as shown in FIG. 14a. Tip 1215 has a surface 1215s accommodating and supporting the fastener 1210 as it is heated and pressed toward tip 1217.

Figure 23:
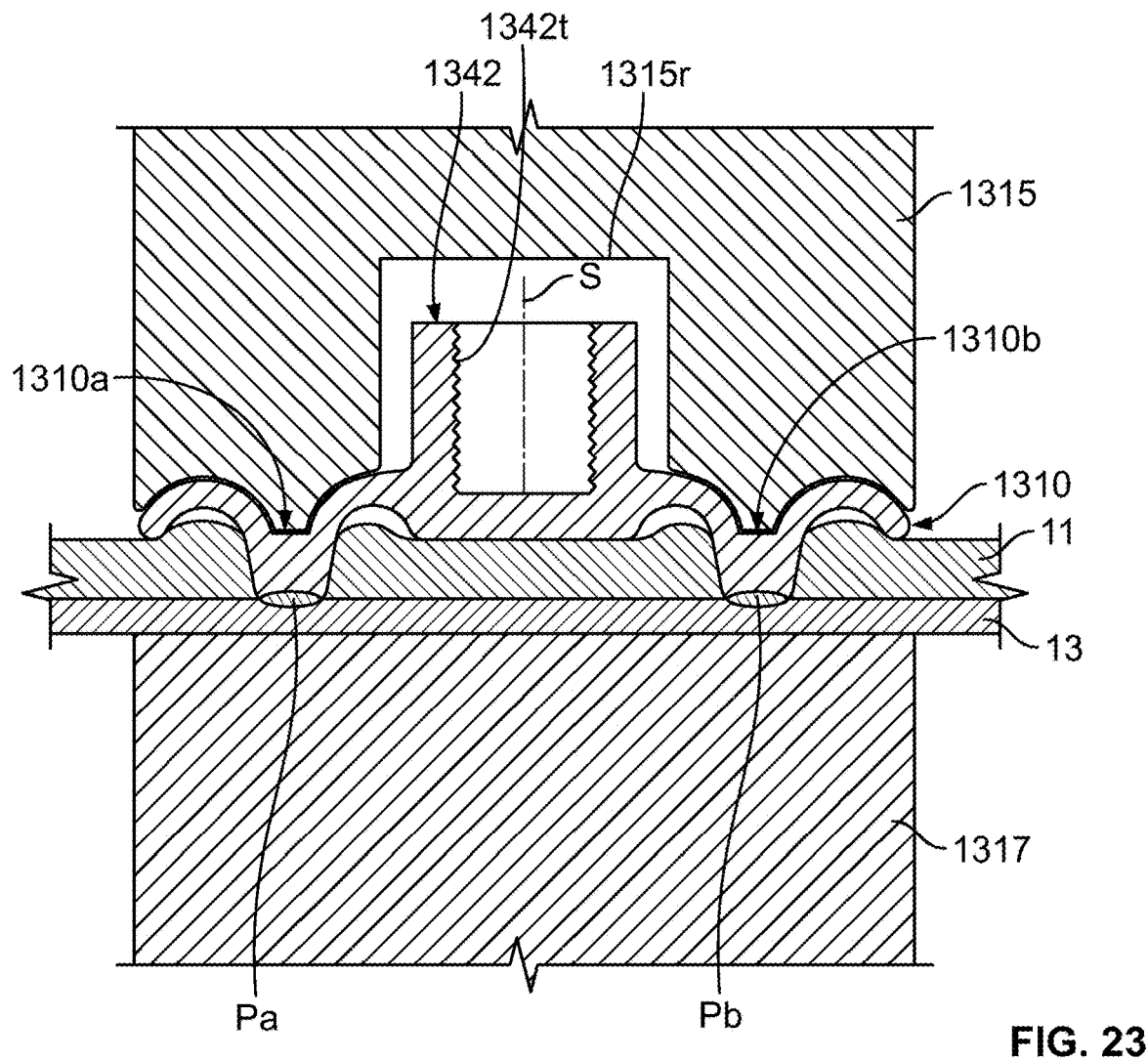
FIG. 23 is a diagrammatic, cross-sectional view of a fastener in accordance with an alternative embodiment of the present disclosure inserted through a first layer and welded to a second layer.

FIG. 23 shows a fastener 1310 in cross-section inserted through a first layer 11 and welded to a second layer 13 at weld zones Pa, Pb. As in FIG. 21, fastener 1310 is a solid of rotation about line of symmetry/rotation S, such that weld zones Pa and Pb are part of a continuous ring-shaped weld to layer 13. Fastener 1310 features a threaded, central socket 1342 having threads 1342t suitable to receive a mating threaded fastener, such as a bolt (not shown). In this manner, fastener 1310 can perform two functions, viz., retain layer 11 to 13 and provide a threaded socket permitting assembly to another member or structure (not shown) via a mating threaded fastener (not shown). Tip 1315 has a recess 1315r for accommodating the socket 1342 while welding.

Figure 24:
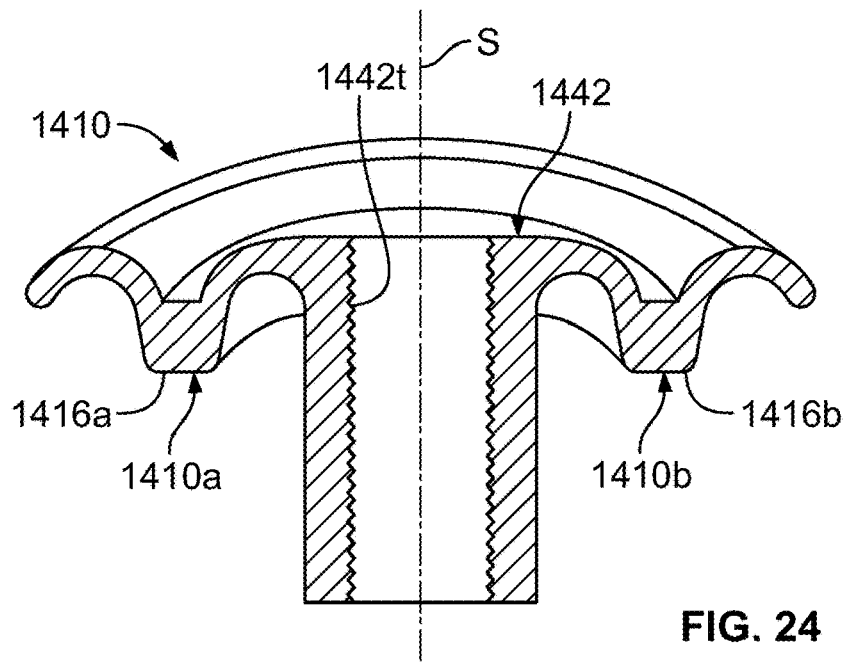
FIG. 24 is a cross-sectional view of a fastener in accordance with an alternative embodiment of the present disclosure.
Figure 25:
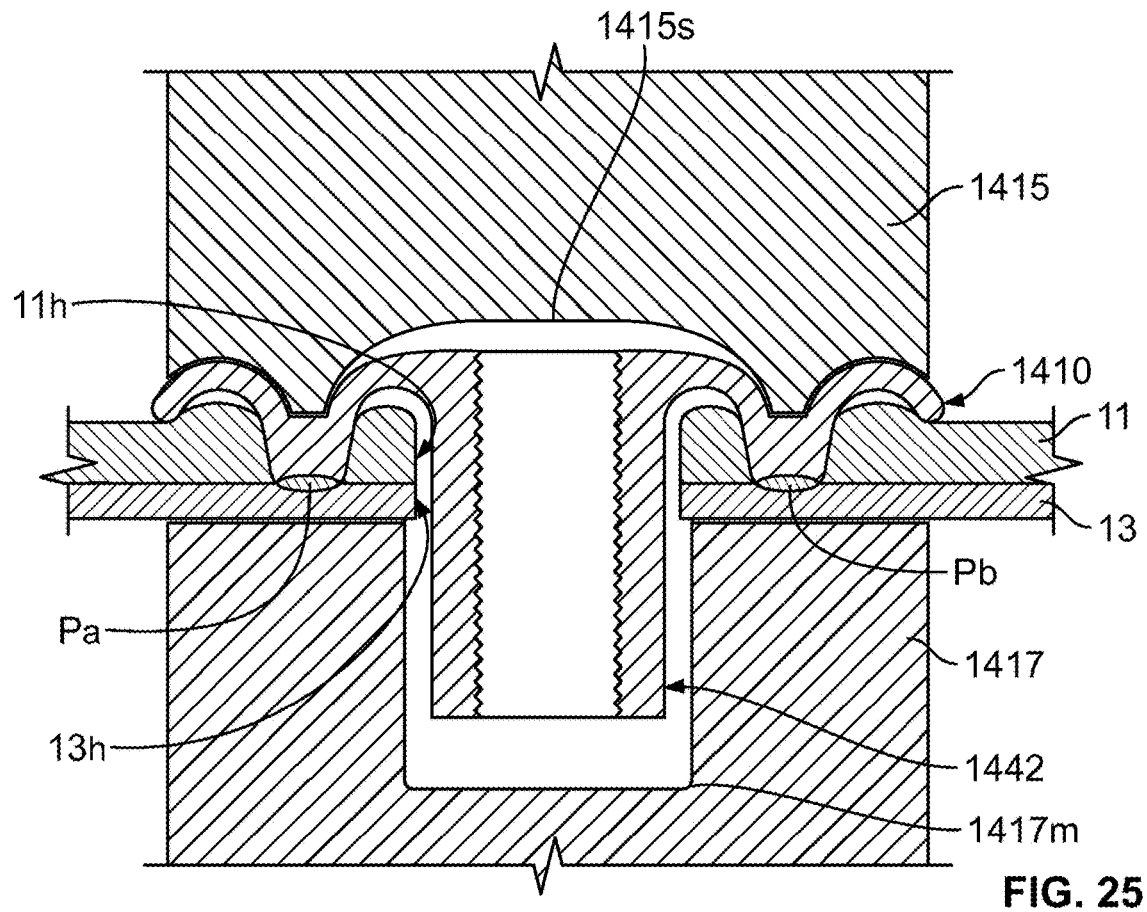
FIG. 25 is a diagrammatic, cross-sectional view of the fastener of FIG. 24 inserted through a first layer and being welded to a second layer.

FIGS. 24 and 25 show a fastener 1410 like fastener 1310, but having a socket portion 1442 with threads 1442t that is open ended, allowing a mating threaded fastener (not shown) to pass through the socket portion 1442. As shown in FIG. 25, in preparation for installation of the fastener 1410, the layers 11 and 13 are preferably drilled or otherwise provided with mating holes 11h, 13h through which the socket portion 1442 can be inserted. The penetration of the layer 11 and the welding to layer 11 can then be performed by resistance welding, as explained above. Tip 1415 has a surface 1415s for supporting the fastener 1410 as it is pressed through layer 11 and welded to layer 13. Tip 1417 has a recess 1417r accommodating the socket portion 1442 that extends through the layers 11, 13 during the welding process.

Figure 26:
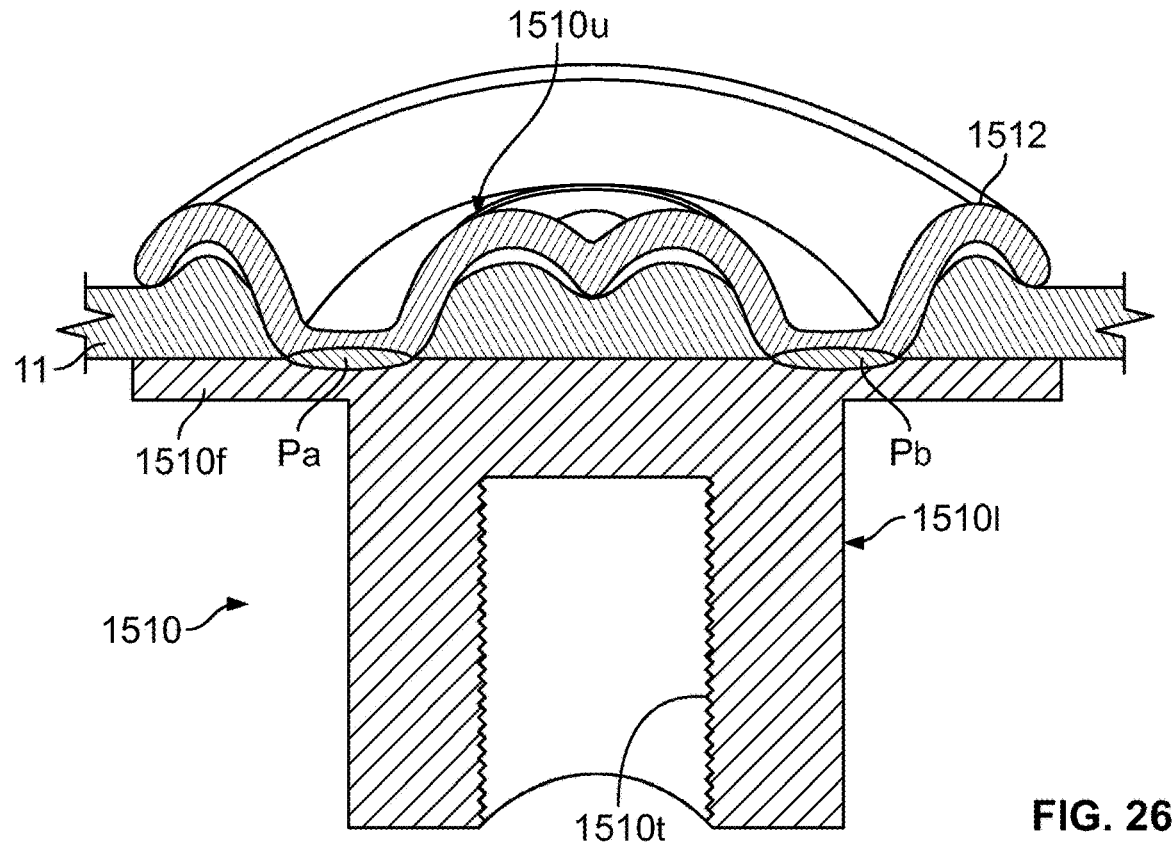
FIG. 26 is a diagrammatic, cross-sectional view of a two-part fastener in accordance with an alternative embodiment of the present disclosure, the first part inserted through a supporting layer and welded to the second part.

FIG. 26 shows a fastener 1510 having an upper part 1510u and a lower part 1510l which may be welded together to attach the fastener to a layer 11, e.g., of aluminum. The lower portion 1510l features a threaded socket 1510t. The fastener 1510 may be made from steel or titanium. The welding process is conducted as before only instead of welding to a second layer 13, the upper part 1510u is welded to the lower part 1510l after the upper part is pushed through the aluminum layer 11. As before, the weld zones Pa, Pb are a part of a ring shaped weld because the fastener 1510 is a solid of rotation. The layer 11 is captured between flange portion 1510f and cap 1512. The fastener 1510 permits a threaded socket 1510t, made from a first material, e.g., steel or titanium, to be attached to a layer 11 of dissimilar metal, e.g., aluminum or magnesium.

Figure 27:
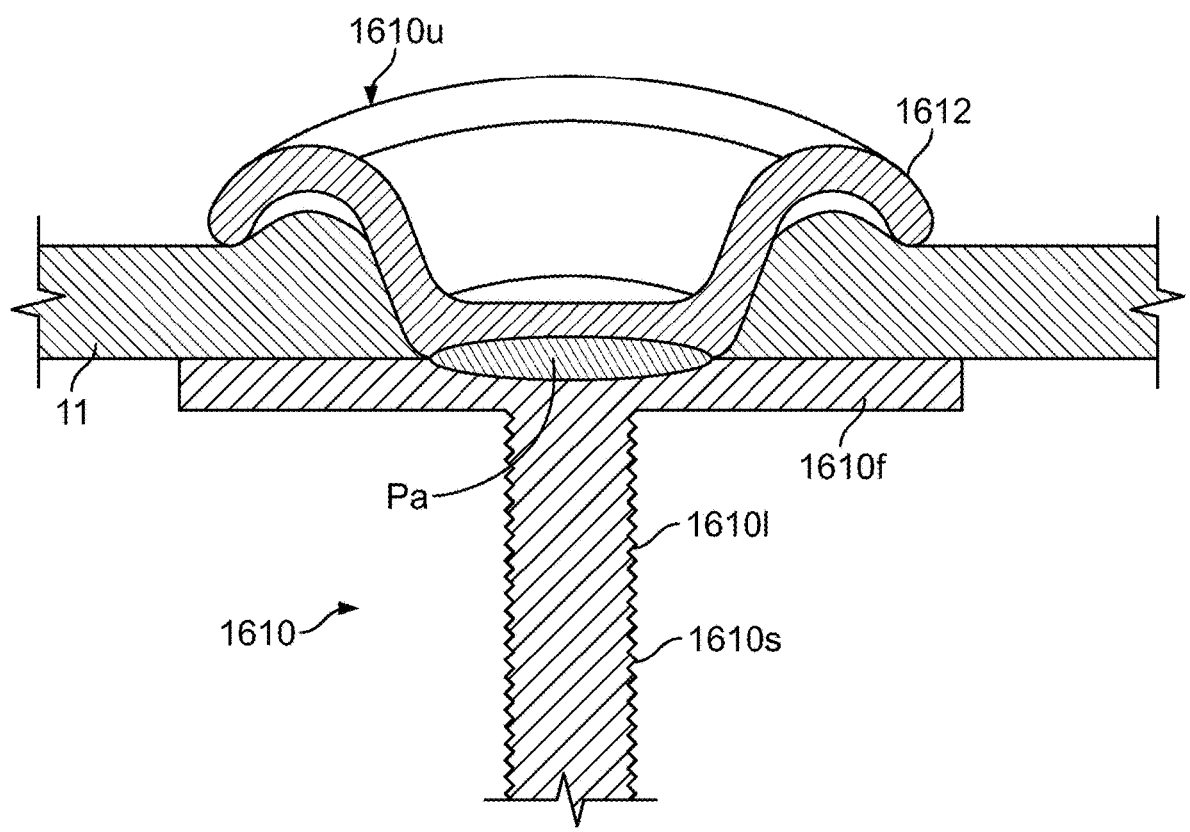
FIG. 27 is a diagrammatic, cross-sectional view of a two-part fastener in accordance with an alternative embodiment of the present disclosure, the first part inserted through a supporting layer and welded to the second part.

FIG. 27 shows a fastener 1610 having an upper part 1610u and a lower part 1610l which may be welded together to attach the fastener to a layer 11, e.g., of aluminum. The lower part 1610l features a threaded stud 1610s. The fastener 1610 may be made from steel or titanium. The welding process is conducted as before only instead of welding to a second layer 13, the upper part 1610u is welded to the lower part 1610l after the upper part is pushed through the aluminum layer 11. The weld zone Pa is approximately disk-shaped and the fastener 1610 is a solid of rotation. The layer 11 is captured between flange portion 1610f and cap 1612. The fastener 1610 permits a threaded stud 1610s, made from a first material, e.g., steel or titanium, to be attached to a layer 11 of dissimilar metal, e.g., aluminum or magnesium.

Figure 28:
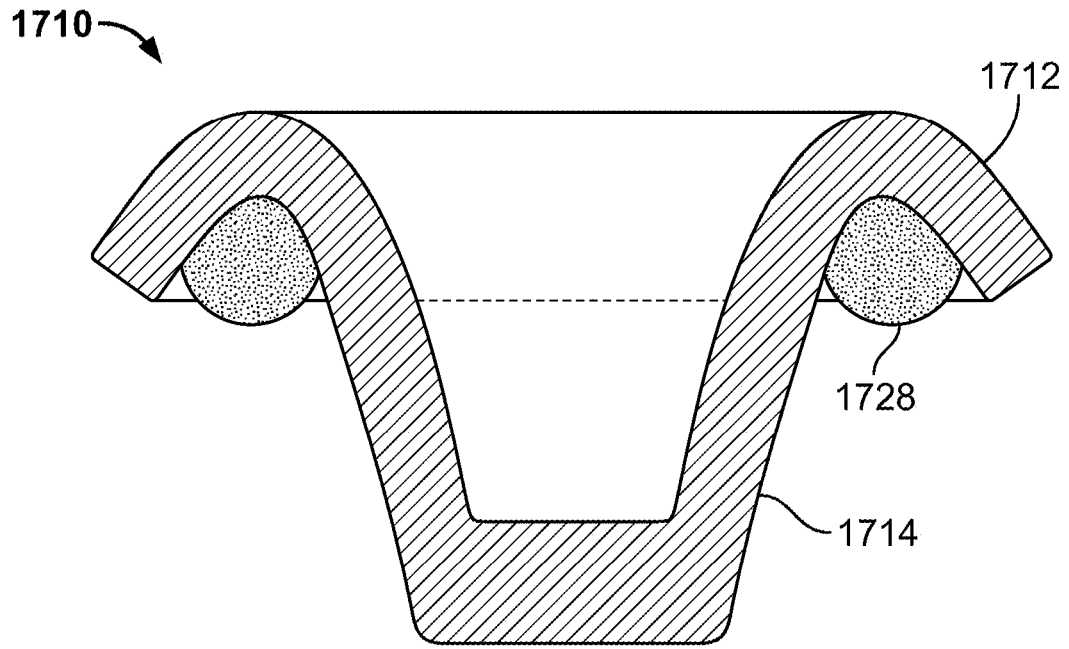
FIG. 28 is a cross-sectional view of a fastener with a sealant in accordance with an alternative embodiment of the present disclosure.
Figure 29:
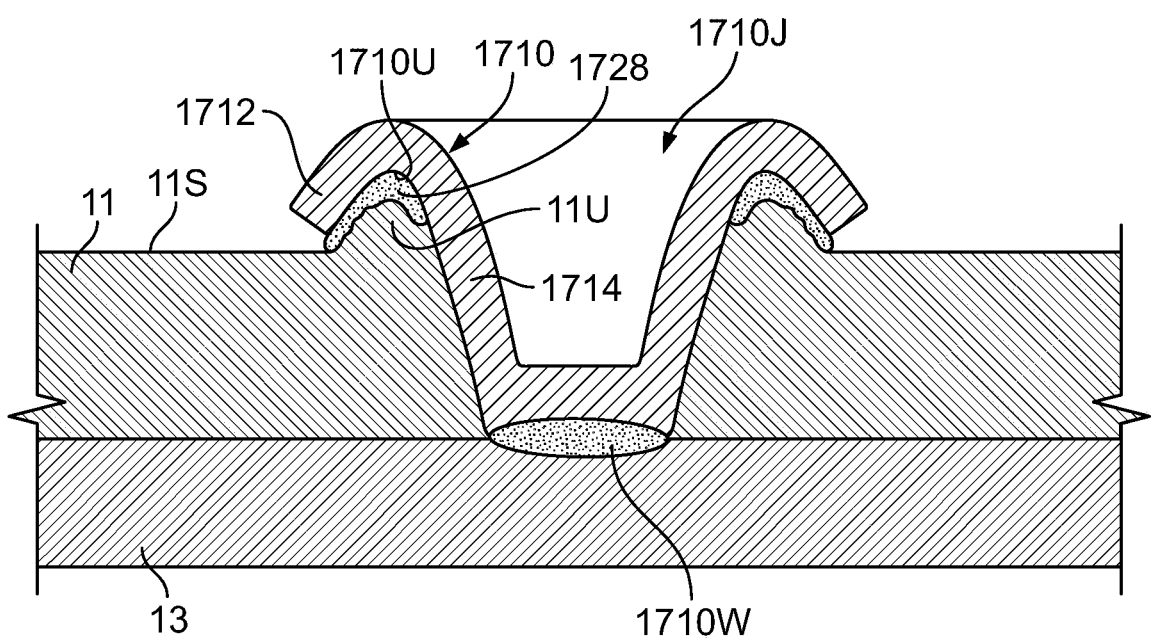
FIG. 29 is a diagrammatic, cross-sectional view of the fastener of FIG. 28 inserted through a first layer and being welded to a second layer.

FIGS. 28 and 29 show a self-sealing fastener 1710 with a bead of sealant 1728 applied to the underside proximate the conjunction of the cap 1712 and shaft 1714. The sealant may be an adhesive or polymer and may be applied as a liquid, gel or paste and may cure to a solid or semi-solid or may remain in a soft or liquid state prior to use of the fastener 1710. When the fastener 1710 is used to couple layers 11 (aluminum), 13 (steel) of material together by the welding of the fastener 1710 to the base sheet 13 or to another fastener 1710, e.g., as described above for fasteners 210 (FIG. 10), the sealant may undergo a change of state, e.g., if solid, it may melt due to the heat generated by insertion of the fastener 1710 through an intermediate layer 11 by melting from electrical resistance or during the welding phase to form weld 1710W. After the fastener 1710 and the metal to which it has welded cools, the sealant 1728 may return to a solid after conforming to the surfaces of the top layer 11 and to any upwelling therein 11U, thereby providing sealed joint 1710J, with a seal between the top layer 11 and the fastener 1710. The sealant 1728 prevents infiltration by elements present in the environment, e.g., oxygen or moisture, which can lead to corrosion of the fastener 1710, the sheets 11, 13 and/or the weld 1710W. In the alternative, the sealant 1728 may remain a semi-solid or gel after the weld 1710W is completed. The sealant 1728 may be applied in several different ways, including: (i) application to the fastener 1710 as a step in fastener manufacture; (ii) application to the fastener 1710 just prior to use in forming a welded joint; e.g., by applying: a bead (ejected by a nozzle under pressure), a ring preformed in solid or semi-solid form (and placed on the fastener 1710), or a band of sealant (provided in the form of a severable strip or painted on by a contact applicator or sprayed on under pressure) to the fastener 1710 prior to contacting the outer sheet 11. In the alternative, the sealant 1728 may be applied to the surface of the sheet 11, e.g., in the form of an adhesive dot placed on the top surface 11S where the fastener 1710 will be inserted or around the periphery of a pilot hole in the sheet 11 prior to the joining process. The sealant 1728 may be applied to the fastener 1710 through the use of 'compound liner' equipment currently used in the beverage can end lining process. The technology disclosed in U.S. Pat. No. 6,887,030, which is incorporated by reference herein in its entirety, can be utilized to stop rotation of the fastener 1710 during sealant 1728 application, reducing damage to the protective coating of sealant 1728 applied to the fastener 1710. The sealant 1728 can be utilized with any of the fasteners 10, 110, 210, etc. and layers 11, 13, 11M, etc., described above. FIG. 29 shows the sealant 1728 after the fastener 1710 has been welded to layer 13. The sealant 1728 can partially or fully fill the cavity between the underside 1710U of the fastener 1710 and upper surface 11S of the sheet 11. The sealant 1728 can provide corrosion protection, increase the joint strength between the fastener 1710 and the top surface 11S, and/or eliminate water/moisture from entering the joint J.

Figure 30:
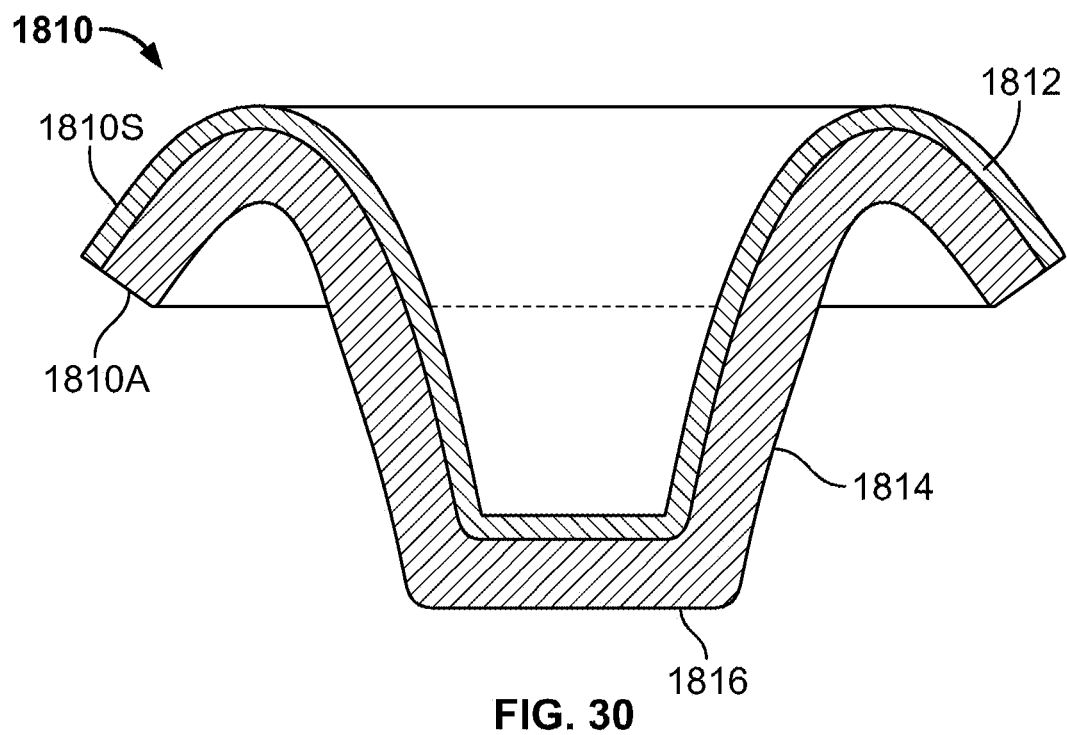
FIG. 30 is a cross-sectional view of a fastener in accordance with an alternative embodiment of the present disclosure.
Figure 31:
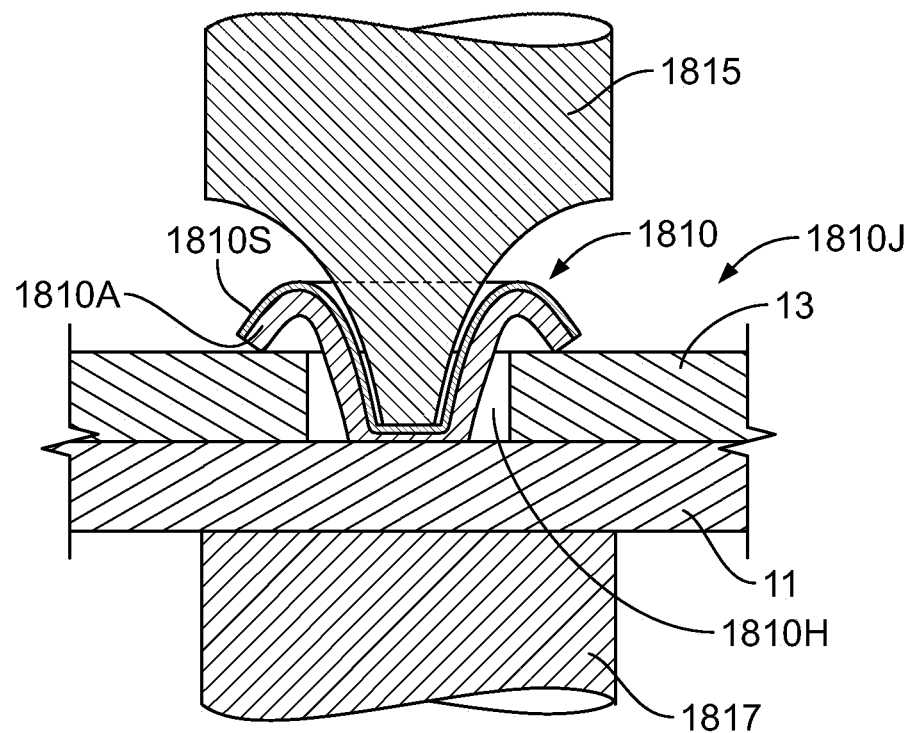
FIG. 31 is a diagrammatic, cross-sectional view of the fastener of FIG. 30 inserted through a first layer for welding to a second layer.

FIGS. 30 and 31 show a cross section of a bi-layer fastener 1810 with a first layer 1810S, e.g., made of steel, titanium, copper or a first aluminum alloy, e.g. 1xxx, and a second layer 1810A, e.g., made of aluminum or a different type of aluminum alloy, e.g., 6xxx. The fastener 1810 may be formed, e.g., stamped, from a bi-layer sheet of multi-alloy (1xxx clad on 6xxx, etc.) or multi-material (aluminum clad steel, aluminum clad copper, etc.). FIG. 31 shows the cross section of a joint 1810J formed with the bi-layer fastener 1810, a first sheet 11, e.g., of aluminum or aluminum alloy and a second sheet 13 of steel, titanium, copper, magnesium or another alloy distinct form the alloy of layer 11. The bi-layer fastener 1810 allows welding to the aluminum member 11, viz., by welding layer 1810A to sheet 11. In this instance, an aperture 1810H is formed in sheet 13, such that the fastener 1810 can be inserted through the aperture 1810H rather than melt through it by resistance heating. One aspect of this approach is that it allows joining a steel sheet or member 13 to an aluminum sheet or member 11, e.g., a tube, from a single side. The bi-layer fastener 1810 allows the welding to occur using low current levels since layer 1810S, which may be, e.g., steel, in contact with the electrode head 1815, provides enhanced heating of layer 1810A and sheet 11 during the welding. In a first approach, the layer 1810A may be made from or include a brazing alloy, allowing a braze joint to the opposing sheet 11 rather than a resistance weld. This would be beneficial to reduce the amount of weld current required. The joint 1810J could be used to join an aluminum or plastic sheet 13 to an aluminum sheet 11 where low heat inputs are required to prevent melting of the sheet 13. In another aspect of this embodiment, a fastener 1810 formed from aluminum clad steel could be used to join a plurality of aluminum sheets. A steel layer 1810S of the fastener 1810 would contact the electrode 1815, while the aluminum side 1810A would contact the aluminum sheets 11 (in this embodiment, sheet 13 would also be aluminum). As the weld heat is applied, the steel layer 1810S would provide enhanced heating, enabling the aluminum portion 1810A of the fastener 1810 to weld with the aluminum sheets 11, 13 at low currents. In another aspect of this embodiment, the layer 1810S may be formed from copper clad to an aluminum portion 1810A. The copper portion 1810S would contact the electrode 1815 and the aluminum portion 1810A would contact and weld to aluminum sheets 11, 13. In this embodiment, the copper portion 1810S of the fastener 1810 would exhibit good heat transfer and low electrode wear.

Figure 32:
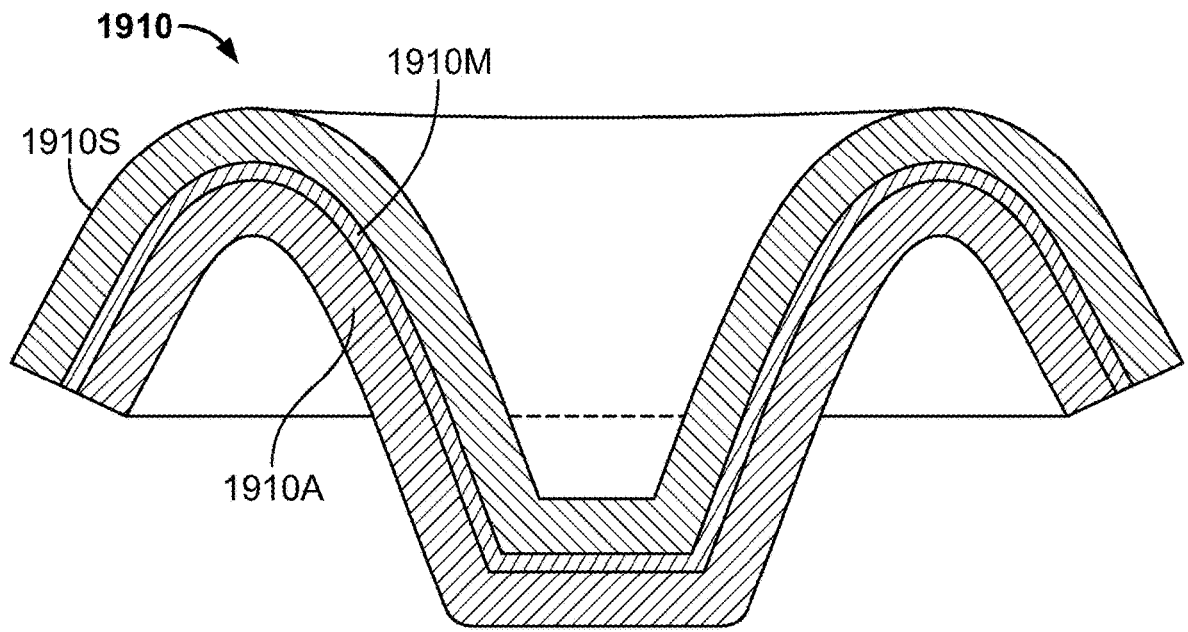
FIG. 32 is a cross-sectional view of a fastener in accordance with an alternative embodiment of the present disclosure.

FIG. 32 shows a tri-metallic fastener 1910, with layers 1910S, 1910M and 1910A. The middle layer 1910M may be selected to prevent diffusion between the outer layers 1910S, 1910A when the fastener 1910 is exposed to elevated temperatures, providing joint strength. The middle layer 1910M may be composed of a variety of materials, including but not limited to, high purity aluminum, titanium, or zinc. In one example, the outer layer 1910S is steel and the root outer layer 1910A is aluminum. The middle layer 1910M may be selected to be a thin layer of titanium, which would prevent the aluminum layer 1910A and steel layer 1910S from diffusing at high temperatures (>200 degree C.).

Figure 33:
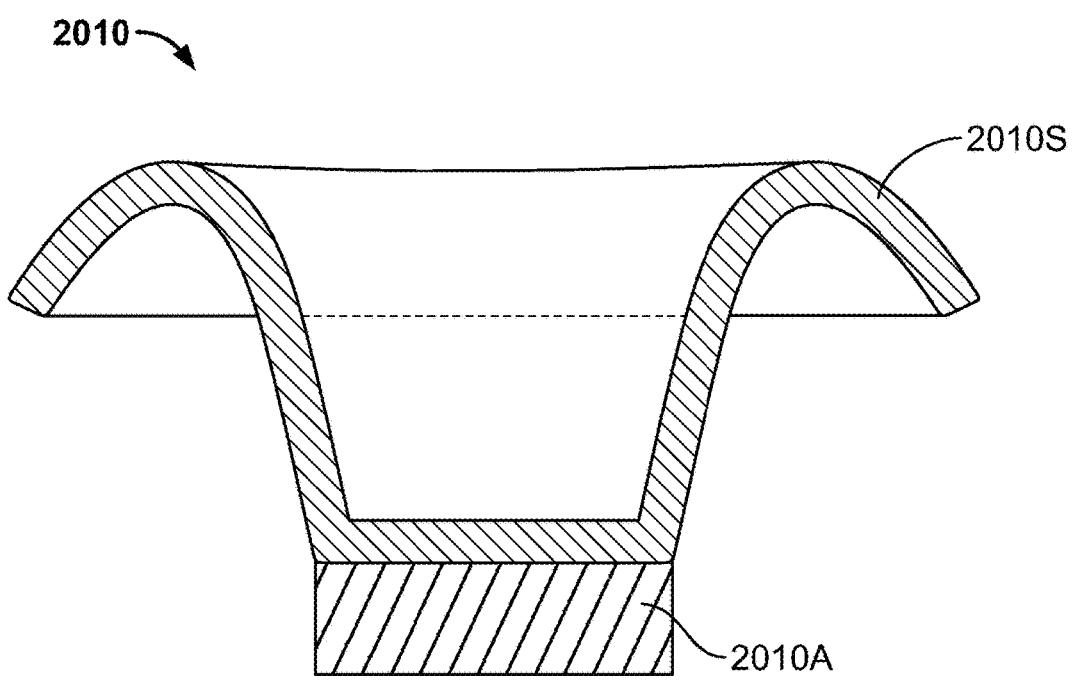
FIG. 33 is a cross-sectional view of a fastener in accordance with an alternative embodiment of the present disclosure.

FIG. 33 shows a bi-layer fastener 2010 having a disc 2010A of aluminum joined to a stamped/cold-formed steel portion 2010S. The aluminum disc 2010A can be joined to the steel portion 2010S through a number of means not limited to cold welding, ultrasonic, friction welding, upset butt welding, high pressure welding, mechanical, or brazing/ soldering. Optionally, the aluminum disc 2010A may be joined to the steel portion 2010S in wire form (cold welding, pressure welding) prior to the shaping of the steel portion 2010S into the shape shown. The fastener 2010 may be used in the same fashion as the fastener 1810 shown in FIG. 31 to fasten sheet 13 to sheet 11.

Figure 34:
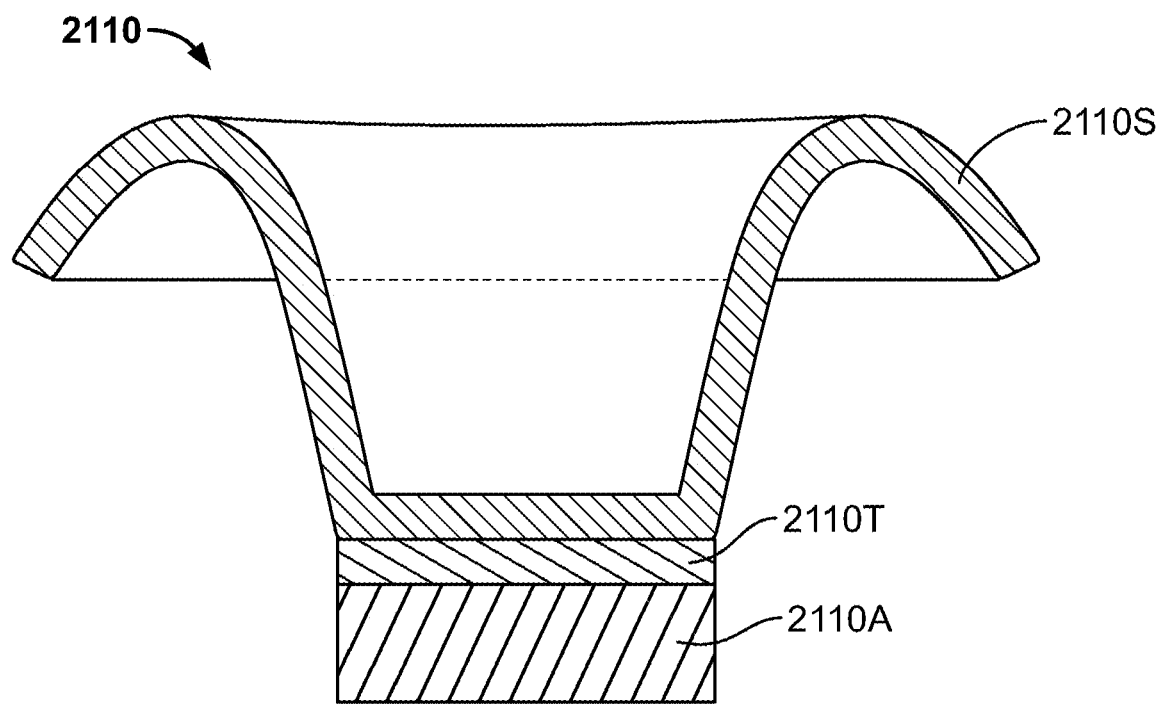
FIG. 34 is a cross-sectional view of a fastener in accordance with an alternative embodiment of the present disclosure.

FIG. 34 shows a tri-layer fastener 2110 like the fastener 2010 of FIG. 33, but having an additional layer 2110T, e.g., made from titanium interposed between layers 2110S, e.g., made from steel and 2110A, e.g., made from aluminum. The fastener 2110 may be used in a similar manner as fastener 1810 of FIG. 31 and fastener 2010 of FIG. 33, but the additional layer 2110T may be used to prevent diffusion between layers 2110A and 2110S and therefore may be useful for high temperature applications in a similar manner as the fastener 1910 with middle layer 1910M shown in FIG. 32.

Figure 35:
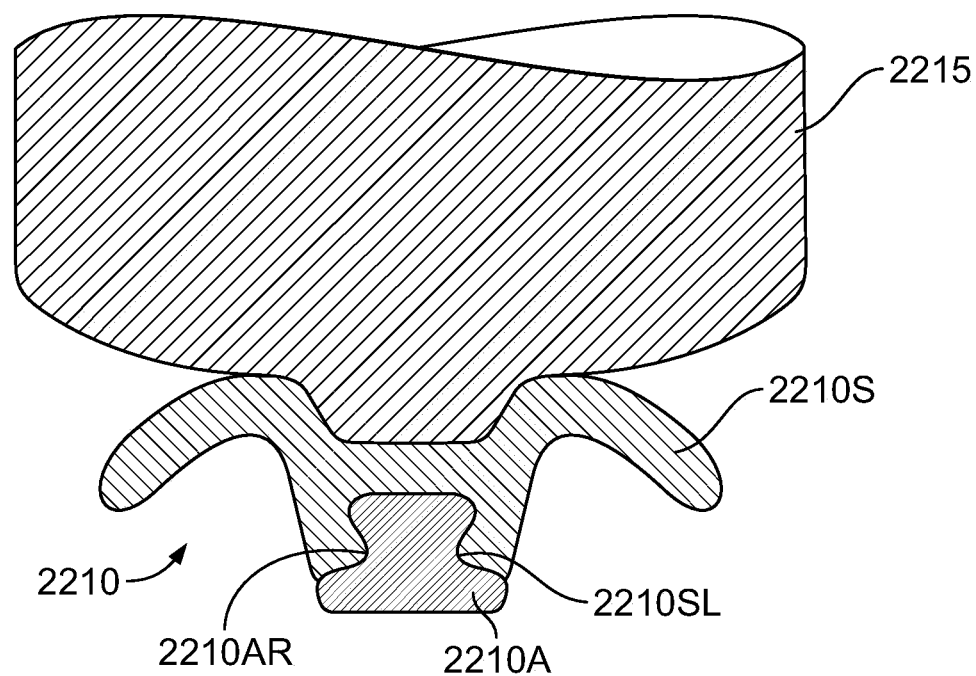
FIG. 35 is a diagrammatic, cross-sectional view of a fastener in accordance with an alternative embodiment of the present disclosure positioned adjacent to a welding electrode tip.

FIG. 35 shows a fastener 2210 having mechanically interlocked portions 2210A, 2210S. The mechanical interlocking may be accomplished by swaging, forging, upsetting or bending. For example, the portion 2210A may be formed with a peripheral recess 2210AR and the portion 2210S may be formed having an inwardly extending peripheral lip 2210SL. The portion 2210A may then be forced into portion 2210S such that the peripheral recess 2210AR and the peripheral lip 2210SL interlock. This may be also be accomplished by a forging die that collapses and compresses portion 2210S about portion 2210A to create an interlocking relationship. In a first aspect, the materials of 2210S and 2210A may be different aluminum alloys (1xxx to 6xxx, 4xxx to 6xxx, 4xxx to Al—Li) or different materials (steel and aluminum, aluminum and magnesium, aluminum and titanium, etc.). The fastener 2210 is shown positioned relative an electrode tip 2215 and may be used similarly to the fastener 1810 shown in FIG. 31.

Figure 36:
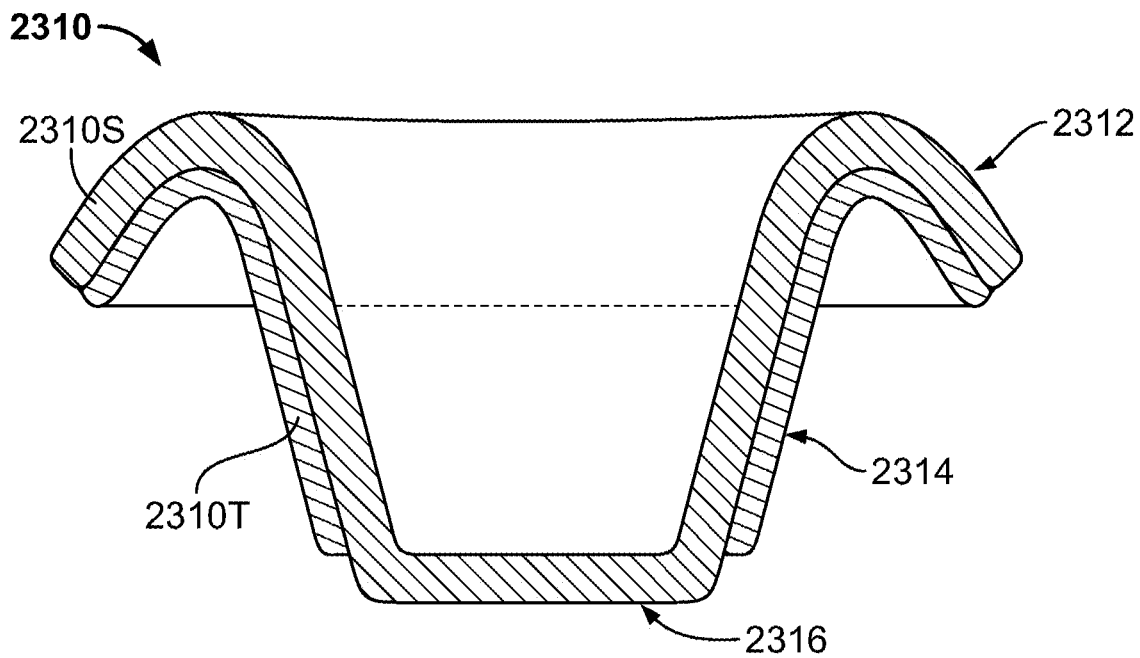
FIG. 36 is a cross-sectional view of a fastener in accordance with an alternative embodiment of the present disclosure.
Figure 37:
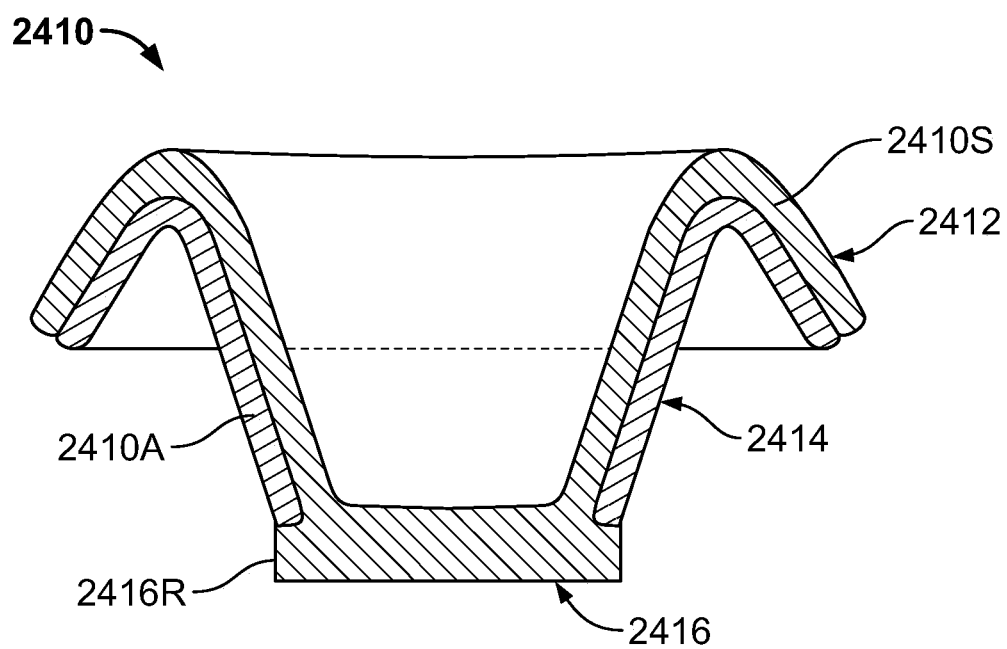
FIG. 37 is a cross-sectional view of a fastener in accordance with an alternative embodiment of the present disclosure.

FIG. 36 shows a fastener 2310 with a protective sleeve 2310T positioned about the portion 2310S proximate the cap 2312 and stem 2314 of the fastener 2310. The protective sleeve 2310T may provide corrosion protection between the fastener 2310 and sheet that is penetrated. For example, where the portion 2310S is steel and passes through an aluminum sheet 11 by resistance heating to weld to a steel sheet 13, as shown in FIGS. 6 and 7, the coating 2310T may be titanium, stainless steel or cold sprayed aluminum. The sleeve 2310T can be mechanically interlocked to the portion 2310S as shown in FIG. 37 (showing sleeve 2410A), applied by cold spray coating, plasma spray coating, etc. The protective sleeve 2310T may be made from metal or from materials having low thermal or electrical conductivity, such as ceramics. In this aspect, the low (thermally/electrically) conductive materials will focus the heat and current though the end 2316 of the fastener 2310, enabling lower current demand to accomplish welding to a layer 13 than if the protective sleeve 2310T were not present. Once welded to a layer 13, e.g., to fasten a layer 11 of aluminum to a layer 13 of steel (see FIGS. 6 and 7), the protective sleeve 2310 may function to isolate the portion 2310S, which may be made from steel, from the aluminum layer 11 through which it passes, preventing corrosion due to contact between dissimilar metals and the galvanic effect.

FIG. 37 shows a fastener 2410 having a protective sleeve 2410A disposed on the portion 2410S in a similar manner to the fastener 2310 described in FIG. 36. The protective sleeve 2410A is retained on the fastener 2410 by a rim 2416R that captures the sleeve 2410A between the rim 2416R and the cap portion 2412. The rim 2416R may be preformed and the sleeve 2410A slipped over the rim 2416R followed by compression by a die, or the sleeve 2410A may be slipped onto the shaft 2414 followed by formation of the rim 2416R, e.g., by upsetting/forging. As with the fastener 2310, the fastener 2410 may exhibit enhanced resistance to corrosion and heat transfer and may be used in a similar manner to couple a first sheet or member 11, e.g., of aluminum to a second sheet or member 13, e.g., of steel (See FIGS. 6 and 7). Since the rim 2416R is the leading element as the fastener is pushed through an intermediate layer 11 (see FIGS. 6 and 7), and may be formed from steel, it will form an aperture through the intermediate layer 11 large enough to accommodate the sleeve 2410A, such that the sleeve itself does not need to play a part in forming the aperture in the intermediate layer 11 and is therefore preserved from distortion or loosening on the shaft 2414 when the fastener 2410 is pressed through the intervening layer 11.

Figure 38:
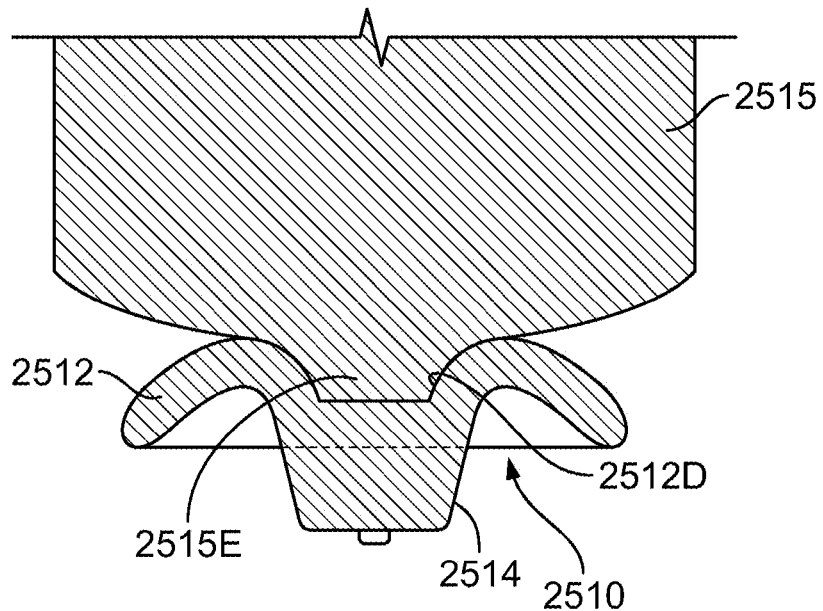
FIG. 38 is a diagrammatic, cross-sectional view of a fastener in accordance with an alternative embodiment of the present disclosure positioned adjacent to a welding electrode tip.

FIG. 38 shows a "semi-solid" fastener 2510 having a solid shaft 2514. The cap 2512 has an electrode depression 2512D matingly accommodating an electrode extension 2515E of electrode 2515. This arrangement may be used to reduce electrode 2515 wear. In one example, the electrode depression 2512D and the electrode extension 2515E each approximate 4-8 mm in diameter and have a depth of 1 to 4 mm. Since the shaft 2514 is solid, it is not as collapsable as a thin wall shaft like shaft 14 of fastener 10 shown in FIGS. 1 and 2. When penetrating an intermediate layer 11 (e.g., made from aluminum) to reach a layer 13 (e.g., made from steel) to weld to (See FIGS. 6 and 7), the shaft 2514 of the fastener 2510 is shorter and does not have to collapse. As a result, the fastener 2515 reaches the layer 13 quicker. This reduces the amount of time that current flows through the electrode 2515 and the fastener 2510, reducing electrode erosion and improving the productivity of the process. The contact area between the electrode extension 2515E and the electrode depression 2512D increases the electrical contact area over that of smooth mating surfaces, reducing electrical resistance and providing a mechanical coupling that preserves the relative position of the fastener 2510 and the electrode 2515 during placement of the fastener 2510.

Figure 39:
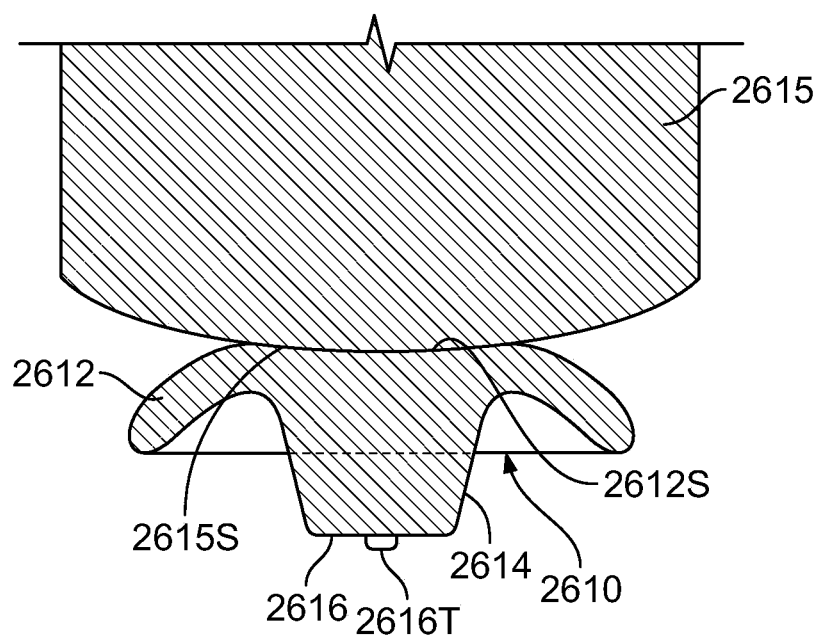
FIG. 39 is a diagrammatic, cross-sectional view of a fastener in accordance with an alternative embodiment of the present disclosure positioned adjacent to a welding electrode tip.

FIG. 39 shows a "solid" fastener 2610 with a solid shaft 2614. The cap 2612 has an upper electrode receiving surface 2612S with a constant radius, of, e.g., 1 to 6 inches, which allows the use of a conventional, radiused spot welding electrode 2615 having a similar radius. This relationship reduces the need for special electrode designs and dressing equipment and also reduces electrode wear. The cap 2612 may be proportioned to allow collapse toward the sheet 11 (see FIGS. 6 and 7) through which the shaft 2614 is pushed during the insertion process, with the cap 2612 flattening against the sheet 11 when fully inserted. A small tip element 2616T can extend from the end 2616 of the fastener 2610, which may be used to concentrate current and heating to help initiate heating/softening of a sheet 11 to be pierced and it initiate welding to a sheet 13.

Figure 40:
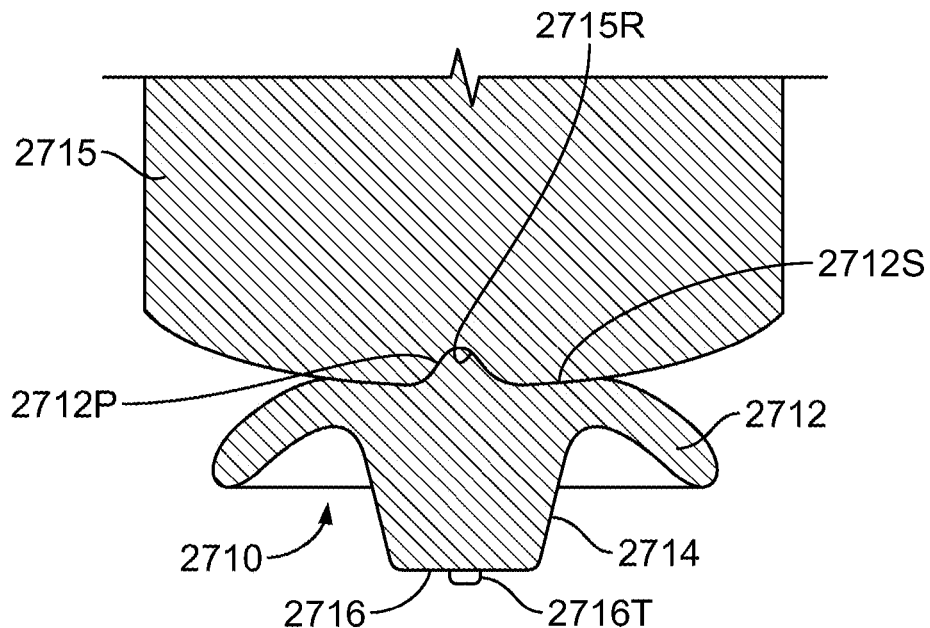
FIG. 40 is a diagrammatic, cross-sectional view of a fastener in accordance with an alternative embodiment of the present disclosure positioned adjacent to a welding electrode tip.

FIG. 40 shows a solid fastener 2710 similar to fastener 2610 but having an electrode alignment projection 2712P extending up from the radiused surface 2712S. The projection 2712P may be received in a mating recess 2715R of the electrode 2715. The mating projection 2712P and recess 2715R may help keep the fastener 2710 aligned with the electrode 2715 during the insertion and welding processes (through a sheet 11 to weld to a sheet 13, as shown in FIGS. 6 and 7). The radius of the projection 2712P may be, e.g., 3/16" to 1/4". While the recess 2715R requires s unique electrode geometry, it is compatible with conventional electrode dressing equipment.

Figure 41:
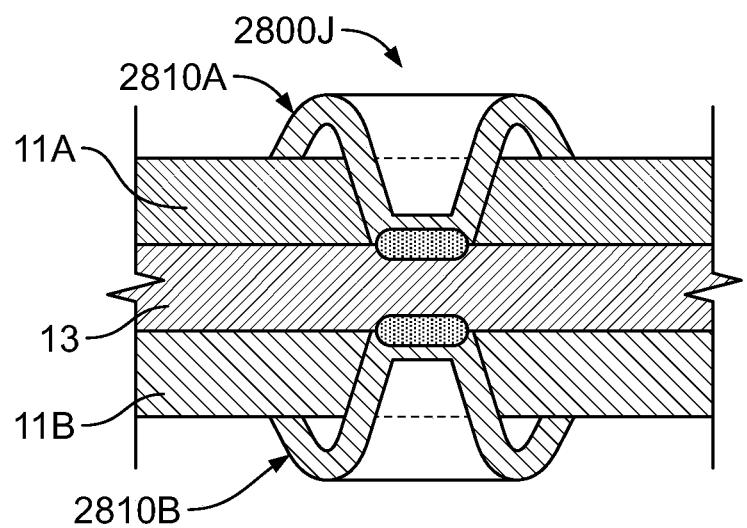
FIG. 41 is a diagrammatic, cross-sectional view of a pair of fasteners in accordance with an alternative embodiment of the present disclosure, each inserted through an associated outer layer and welded to a common central layer.

FIG. 41 shows a joint 2800J wherein a pair of opposing fasteners 2810A, 2810B penetrate through layers 11A, 11B (such as sheets of aluminum), respectively, e.g., by resistance heating and pressure, and weld to a central layer 13, e.g., made from steel. To achieve this configuration, the fasteners 2810A, 2810B may be inserted simultaneously (in a single operation) through the aluminum sheets 11A, 11B and weld to the steel layer 13. Alternatively, the fasteners 2810A, 2810B may be inserted and welded sequentially.

Figure 42:
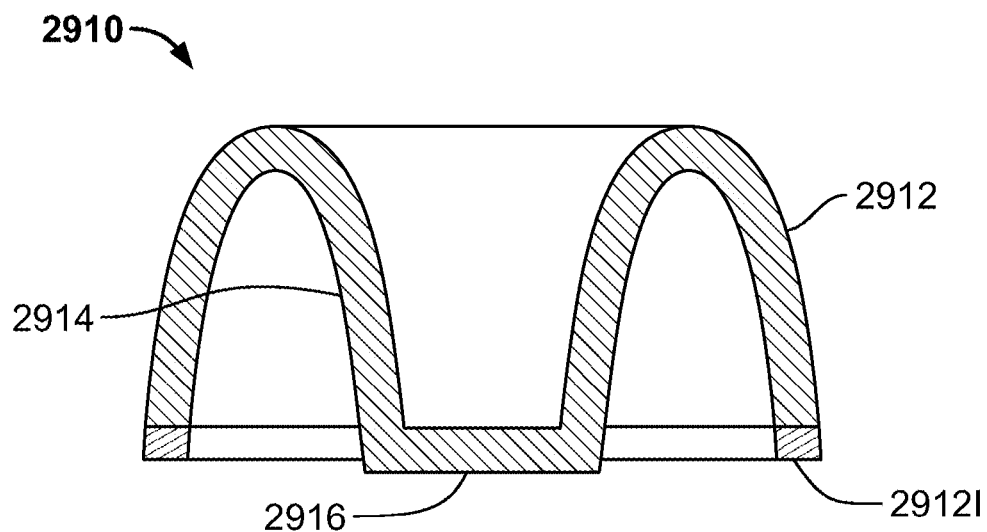
FIG. 42 is a cross-sectional view of a fastener in accordance with an alternative embodiment of the present disclosure.

FIG. 42 shows a cross section of a fastener 2910 having an extended grip range. The cap 2912 extends down to an extent comparable to the shaft 2914. A ring 2912I, of insulating material is attached to the terminal end of the cap 2912, such that the bottom edge of the ring 2912I is approximately co-extensive with the end 2916. In use, the fastener 2910 may be placed on a surface of a sheet 11, e.g., made from aluminum and then heated by electrical resistance by a resistance welder as described above, e.g., in relation to FIGS. 6 and 7, to penetrate the sheet 11 and weld to an underlying sheet 13, e.g., made from steel. Because the ring 2912I is an insulator, the electrical current passes only through the end 2916. As the end 2912 presses through the sheet 11, the ring 2912I abuts against the sheet 11 as the end 2016 passes through the sheet 11. As a consequence, the cap 2912 bends to the degree necessary to allow the end 2916 to reach and weld to sheet 13, while the ring 2912I abuts against sheet 11. As a result, the shaft 2914 can penetrate a variety of thicknesses of sheet 11 and (the ring 2912I thereof) will still press against the sheet 11 urging it into contact with sheet 13.

Figure 43:
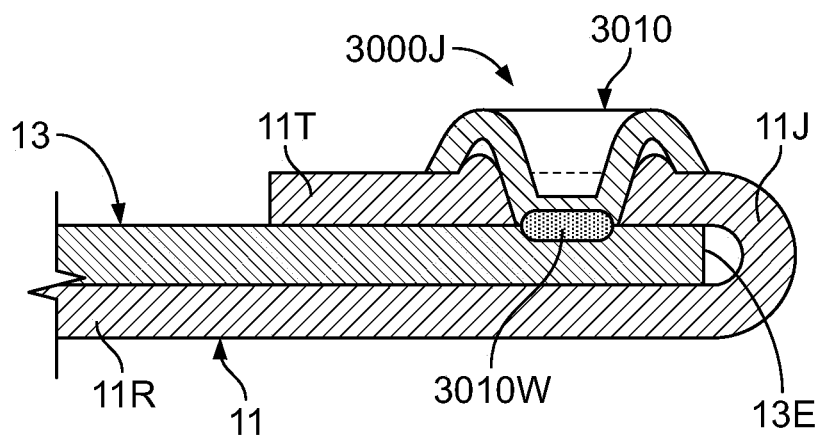
FIG. 43 is a diagrammatic, cross-sectional view of a fastener in accordance with an alternative embodiment of the present disclosure, inserted through a portion of a J-shaped layer and welded to a layer embraced by the J-shape.
Figure 44:
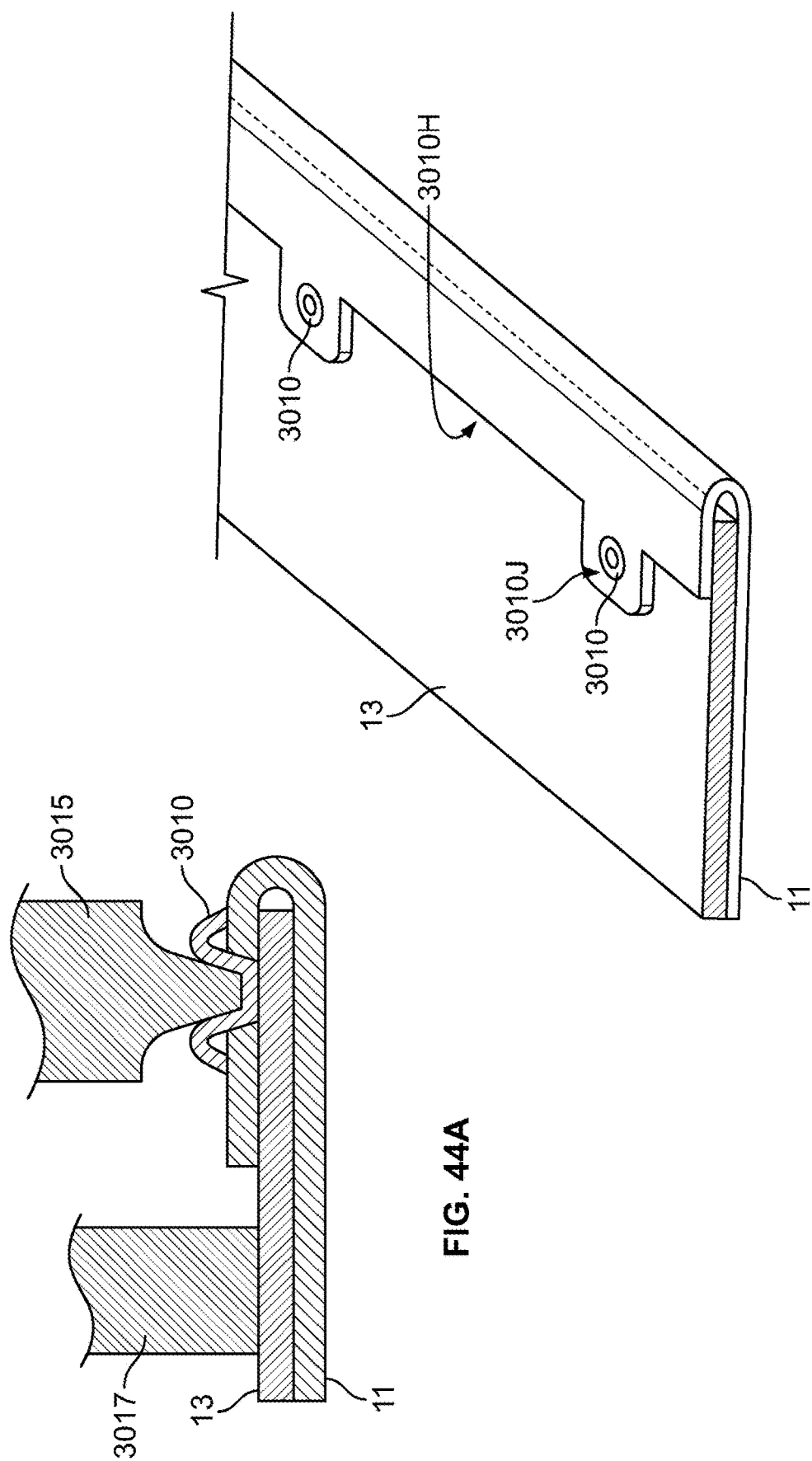
FIGS. 44A and 44B are diagrammatic, cross-sectional views of fasteners and a composite structure in accordance with an alternative embodiment of the present disclosure being applied and after application.

FIGS. 43 and 44 show a first panel 11, e.g., made from an aluminum alloy, positioned against a second panel 13, e.g., made from steel. The first panel 11 is bent to form a J-shape 11J, which embraces an edge 13E of the panel 13. The panel 11 is staked to the panel 13 proximate the J-shape 11J and edge 13E by a fastener 3010 which passes through one thickness 11T of the panel 11 and welds at 3010W to the steel panel 13, forming joint 3000J. As shown, the weld 3010W does not disturb the remainder 11R of the panel 11, such that the joint 3000J is suitable for applications, like an automobile body, requiring a smooth surface appearance on the remainder 11R of the panel. As shown in FIG. 44A, electrodes 3015 and 3017 may approach from the same direction, with 3015 pressing against the fastener 3010 and electrode 3017 contacting the steel panel 13. As resistance heating softens the sheet 11, the fastener 3010 is pressed through the sheet 11 and welds to the sheet 13. As shown in FIG. 44B, a plurality of fasteners 3010 may be used to form a "hem" 3010H along the edge 13E of the sheet 13, with the J-shape 11J wrapped around the edge 13E. The hemmed joint 3010H may employ an adhesive to aid in holding the sheets 11, 13 together.

Figure 45:
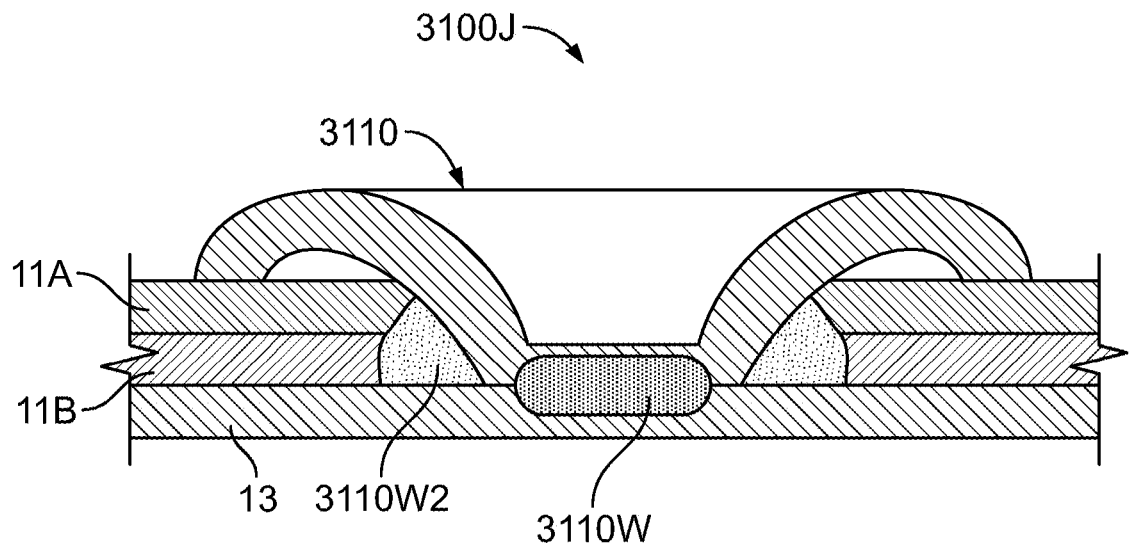
FIG. 45 is a diagrammatic, cross-sectional view of a fastener in accordance with an alternative embodiment of the present disclosure, inserted through a pair of layers and welded to a third layer.

FIG. 45 shows a pair of sheets 11A, 11B, e.g., of aluminum, coupled to a layer 13, e.g., of steel, by fastener 3110. The fastener 3110 has penetrated both aluminum sheets 11A, 11B, e.g., by electrical resistance heating, prior to contacting and subsequently welding to the steel sheet 13 at 3110W and forming joint 3100J. In joint 3100J, the heat from penetrating and welding, e.g., emitted from the fastener 3110, which may be steel, locally melts the aluminum sheets 11A and 11B adjacent to the fastener 3130, producing a weld 3110W2 between the sheets 11A and 11B that partially or completely encircles the fastener 3110. The weld 3110W2 consolidates the aluminum sheets 11A, 11B, and strengthens the joint 3100J. The aluminum sheets 11A, 11B can be of identical or dissimilar thicknesses. An adhesive may be present between one or all the sheet interfaces.

Figure 46:
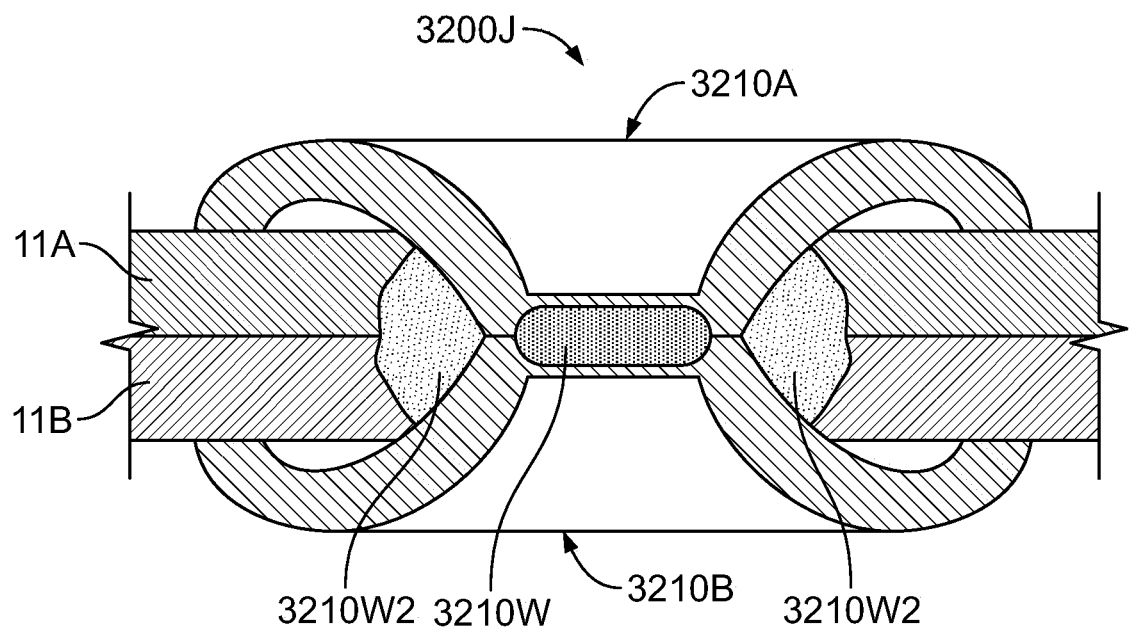
FIG. 46 is a diagrammatic, cross-sectional view of a pair of fasteners in accordance with an alternative embodiment of the present disclosure, inserted through a pair of layers of comparable thickness and welded to one another.

FIG. 46 shows a joint 3200J coupling two sheets 11A, 11B, e.g., made from aluminum, by two opposing fasteners 3210A, 3210B, e.g., made from steel. The fasteners 3210A, 3210B may be installed simultaneously from opposite sides via a pair of opposing welding electrodes in a similar manner to the embodiment shown in FIG. 10. The fasteners 3210A, 3210B are urged together and by resistance heating, penetrate the aluminum sheets 11A, 11B and then weld to each other, forming weld 3210W. As noted above with respect to the embodiment shown in FIG. 45, in passing through the sheets 11A, 11B, the steel fasteners 3210A, 3210B locally heat the aluminum sheets 11A, 11B adjacent thereto and create a weld 3210W2 that partially or completely encompasses the weld 3210W between the fasteners 3210A, 3210B. FIG. 46 shows sheets 11A, 11B of equal thickness, resulting in a symmetric joint 3200J, but as shown below, the process will work for sheets 11A, 11B of different gauges. In another alternative, two different fasteners 3210A, 3210B, with different operational reaches (shaft lengths) may be employed, the greater length being applied to the sheet with the greater thickness and vice-versa.

Figure 47:
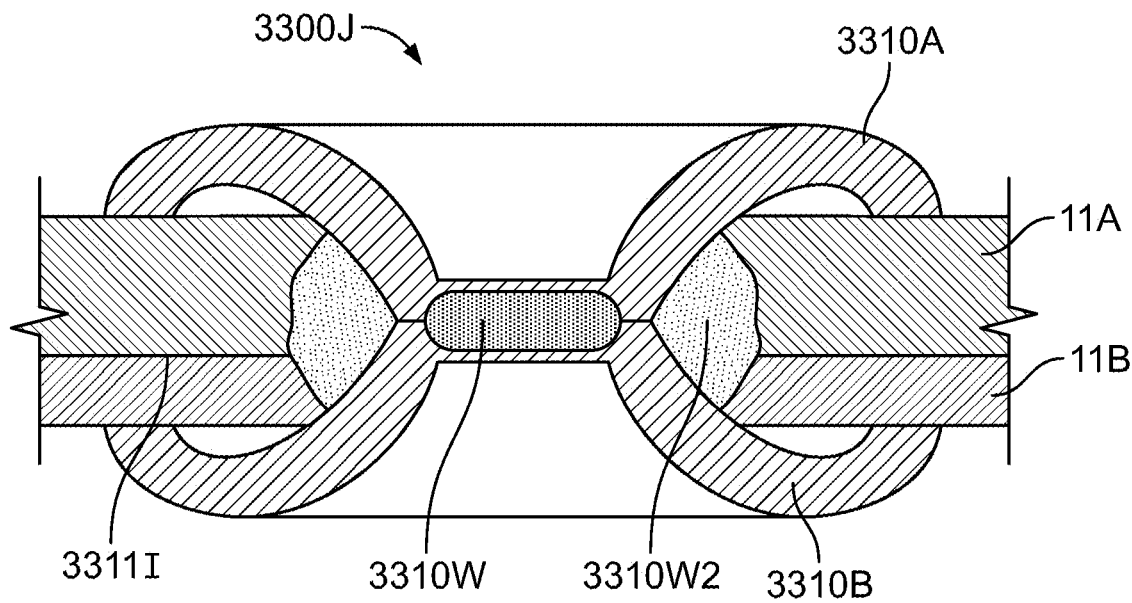
FIG. 47 is a diagrammatic, cross-sectional view of a pair of fasteners in accordance with an alternative embodiment of the present disclosure, inserted through a pair of layers with different thicknesses and welded to one another.

FIG. 47 shows a joint 3300J coupling two sheets 11A, 11B, e.g., made from aluminum, by two opposing fasteners 3310A, 3310B, e.g., made from steel. The fasteners 3310A, 3310B may be installed simultaneously from opposite sides via a pair of opposing welding electrodes in a similar manner to the embodiment shown in FIG. 10. The fasteners 3310A, 3310B are urged together and by resistance heating, penetrate the aluminum sheets 11A, 11B and then weld to each other, forming weld 3310W. As noted above with respect to the embodiment shown in FIGS. 45 and 46, in passing through the sheets 11A, 11B, the steel fasteners 3310A, 3310B locally heat the aluminum sheets 11A, 11B adjacent thereto and create a weld 3310W2 that partially or completely encompasses the weld 3310W between the fasteners 3310A, 3310B. FIG. 47 shows sheets 11A, 11B of unequal thickness, resulting in an asymmetric joint 3300J. As shown the fasteners 3310A, 3310B, have equal operational reaches (shaft lengths) resulting in a weld 3310W that is not at the interface 3311I between the sheets 11A, 11B. An aspect of the joint 3300J is that the load path through the joint 3300J follows several directions (not on the same axis) so it will have enhanced mechanical performance. As noted above, joint 3300J can be employed with or without adhesives, e.g., applied at the interface 3311I. The weld zone 3310W2 between the aluminum sheets 11A, 11B can be selectively made larger or smaller by selecting the weld schedule employed during the welding process. Additional heat cycles can be added to extend the aluminum weld zone 3310W2, and increase the overall performance of the joint 3300J.

Figure 48:
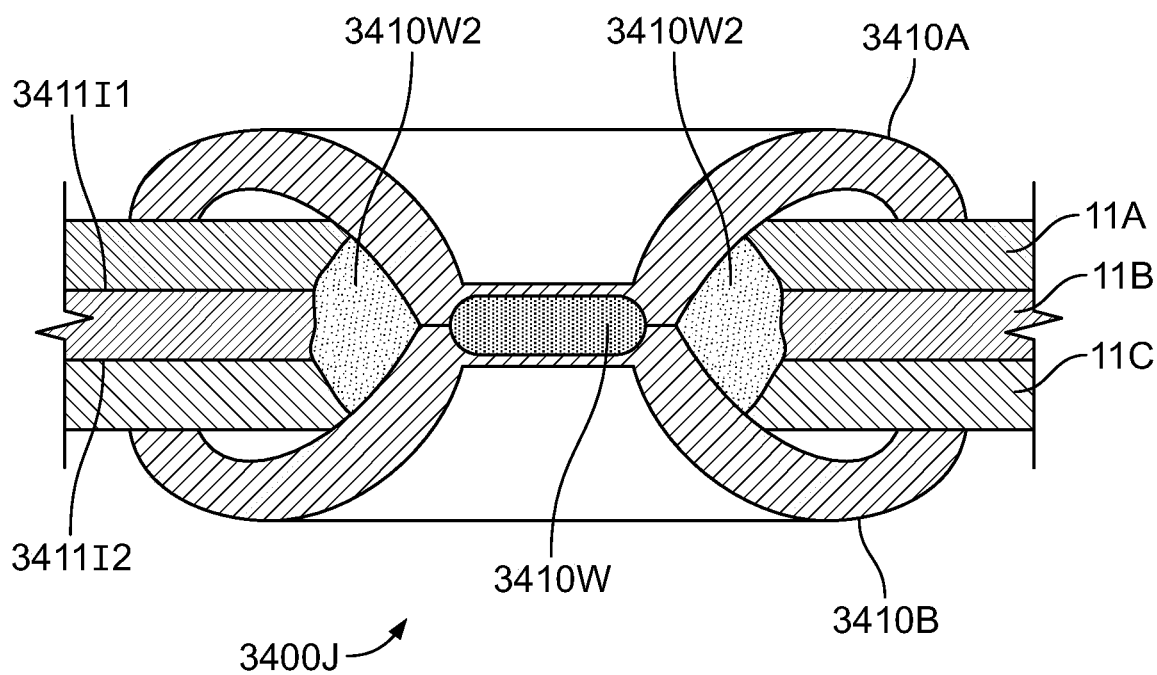
FIG. 48 is a diagrammatic, cross-sectional view of a pair of fasteners in accordance with an alternative embodiment of the present disclosure, inserted through a set of three layers and welded to one another.

FIG. 48 shows a joint 3400J coupling three sheets 11A, 11B, 11C e.g., made from aluminum, by two opposing fasteners 3410A, 3410B, e.g., made from steel. The fasteners 3410A, 3410B may be installed simultaneously from opposite sides via a pair of opposing welding electrodes in a similar manner to the embodiment shown in FIG. 10. The fasteners 3410A, 3410B are urged together and by resistance heating, penetrate the aluminum sheets 11A, 11B, 11C and then weld to each other, forming weld 3410W. As noted above with respect to the embodiments shown in FIGS. 45-47, in passing through the sheets 11A, 11B, 11C, the steel fasteners 3410A, 3410B locally heat the aluminum sheets 11A, 11B, 11C adjacent thereto and create a weld 3410W2 that partially or completely encompasses the weld 3410W between the fasteners 3410A, 3410B. FIG. 48 shows sheets 11A, 11B, 11C of approximately equal thickness, resulting in a symmetric joint 3400J. As shown, the fasteners 3410A, 3410B, have equal operational reaches (shaft lengths), such that when they join to form weld 3410W, they are roughly in the middle of sheet 11B, resulting in a weld 3410W that is not at the interfaces 3411I1, 3411I2 between the sheets 11A, 11B, 11C and therefore has enhanced mechanical performance. As noted above, this joint 3400J can be employed with or without adhesives, e.g., applied at the interfaces 3411I1, 3411I2. The weld zone 3410W2 between the aluminum sheets 11A, 11B, 11C can be selectively made larger or smaller by selecting the weld schedule employed during the welding process. Additional heat cycles can be added to extend the aluminum weld zone 3410W2, and increase the overall performance of the joint 3400J. The sheets 11A, 11B, 11C can be of the same or varying thicknesses and alloy types. The fasteners 3410A, 3410B can be designed to meet in the center of the aluminum sheet 11A, 11B, 11C stackups or at another location which will maximize joint performance and extend the load path.

Figure 49:
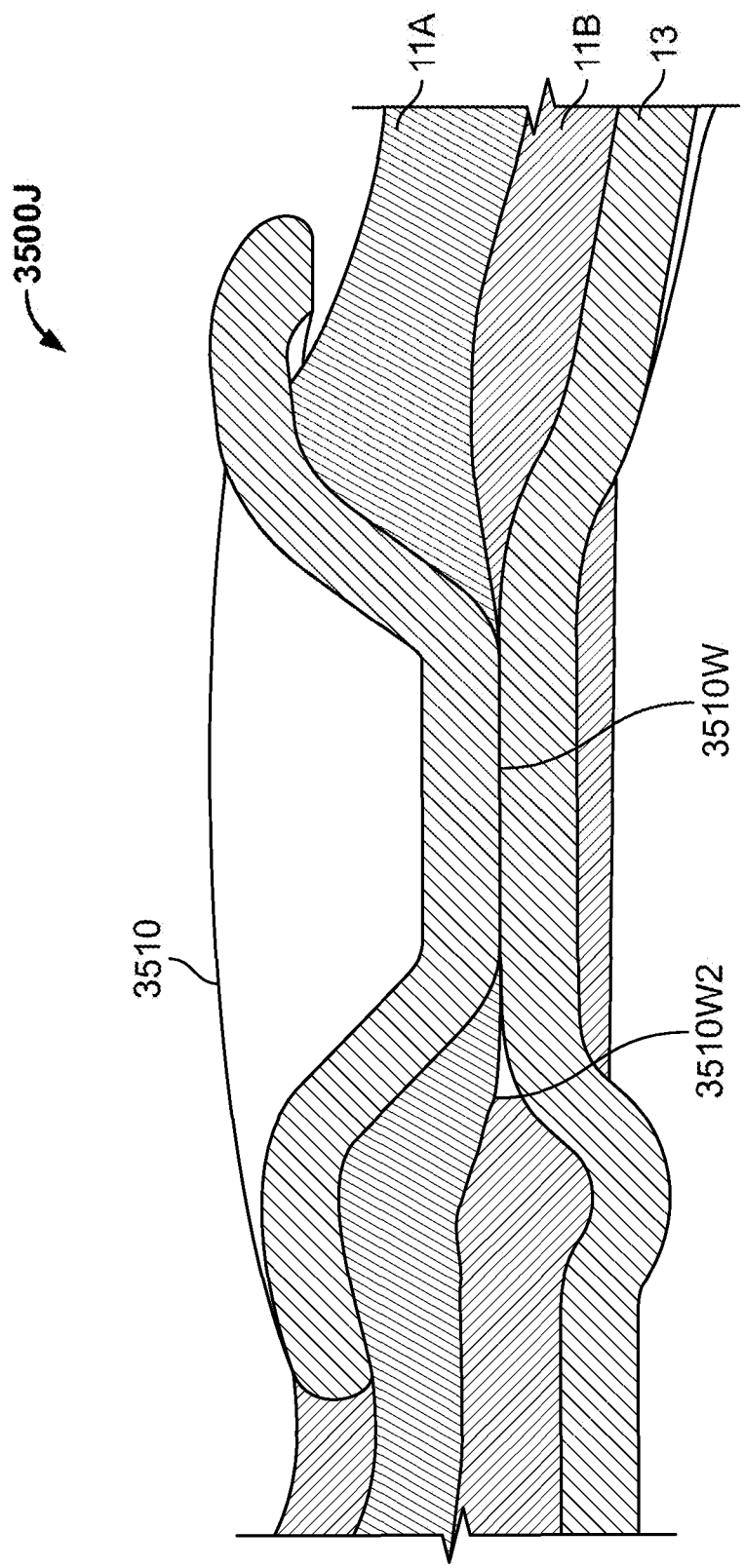
FIG. 49 is a photograph of a cross-section of a fastener in accordance with an alternative embodiment of the present disclosure, inserted through a pair of layers and welded to a third layer.

FIG. 49 is a photograph of a joint 3500J cut to show a cross section thereof. The joint 3500J couples two aluminum sheets 11A, 11B of 1.0 mm C710-T4 aluminum alloy between a fastener 3510 and a steel sheet 13 of 0.9 mm galvanized steel. The fastener 3510 is a G1A rivet. The weld zone 3510W2 shows the merging of the sheets 11A, 11B proximate the fastener 3510. The welding was conducted on the sheets 11A, 11B without a pilot hole. The joint 3500J was created with a weld input of 8 kA @ 400 msec preheat plus 16 kA @ 100 msec weld pulse, 800 lbs. The sample was distorted somewhat while it was being cut for the cross section.

Figure 50:
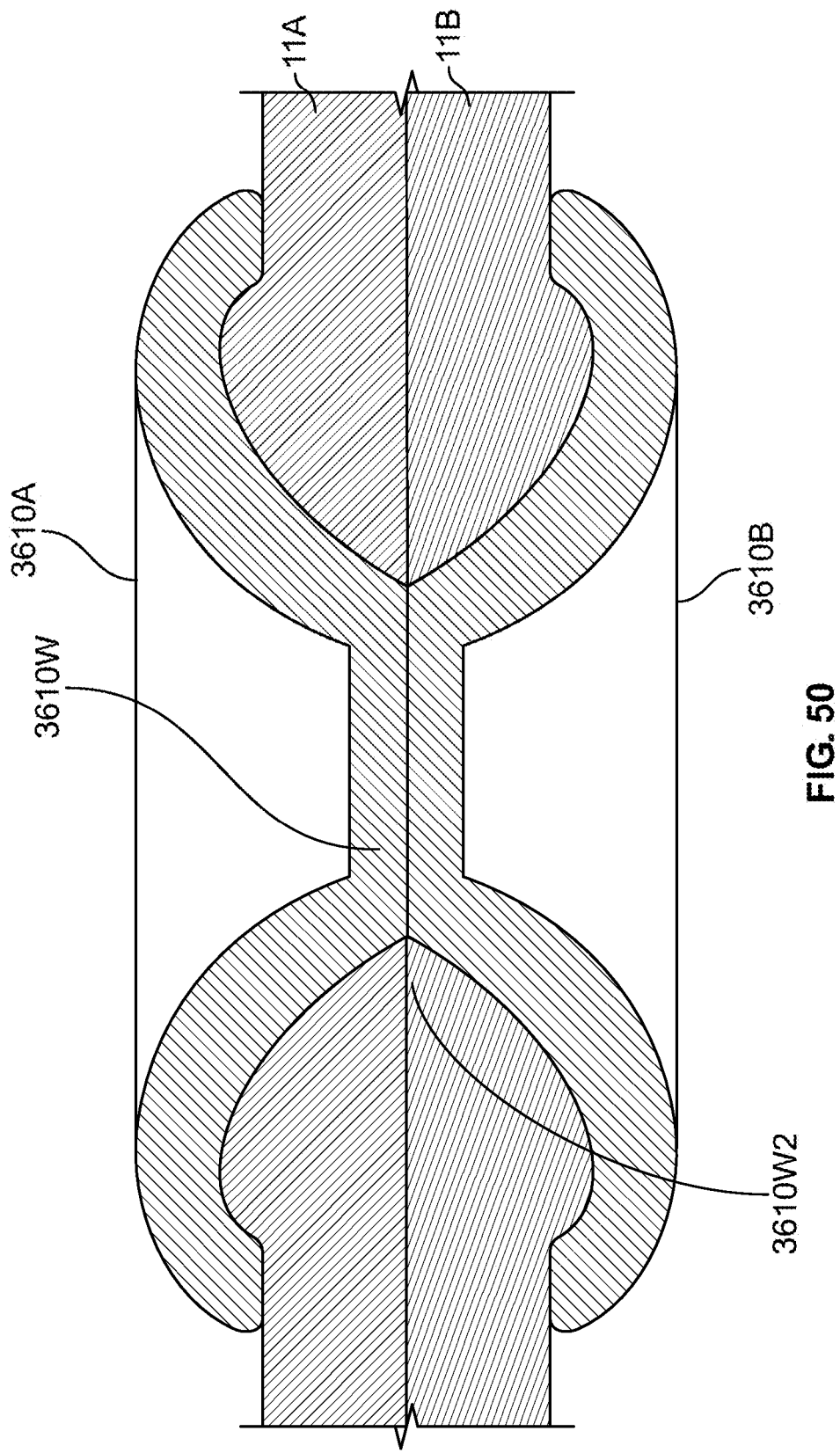
FIG. 50 is a photograph of a cross-section of a pair of fasteners in accordance with an alternative embodiment of the present disclosure, inserted through a pair of layers and welded to one another.

FIG. 50 is a photograph of a joint 3600J cut to show a cross section thereof. The joint 3600J couples two aluminum sheets 11A, 11B of 1.6 mm 7075-T6 aluminum alloy between two fasteners 3610A, 3610B. The fasteners 3610A, 3610B are G1A rivets. The weld zone 3610W2 shows the merging of the sheets 11A, 11B proximate the fasteners 3610A, 3610B. The welding was conducted on the sheets 11A, 11B without a pilot hole. The joint 3500J was created with a weld input of 8 kA @ 400 msec preheat plus 12 kA @ 300 msec weld pulse, 800 lb.

FIG. 51 shows an electrode 3715 with a tip 3715T having a standard geometry. The electrode tip 3715T inserts into and is retained in electrode shaft 3715S via mating tapered surfaces 3715TS1, 3715TS2. The tip 3715T has a riveting surface 3715RS having a radius R of about 8 mm. The electrode 3715 is shown in contact with a fastener 3710 with a short, solid shaft 3714 and a wide cap 3712 having a concave surface 3712CS, which may have a radius R1 of curvature approximating that of the riveting surface 371RS of the tip 3715T. The fastener 3710 is in place on stacked sheets 11, e.g., made from aluminum and 13, e.g., made from steel. The "semi-solid" fastener 3710 accommodates a standard electrode radius. The electrode 3715 is in common use in industry and provides excellent electrode wear and dressing capability. Deviations of electrode orientation from perpendicular frequently occur, particularly in high volume production. The radiused contact surface 3712CS allows the electrode to have a small amount of angularity relative to the perpendicular and still function for driving and welding the fastener 3710. For very thick penetration needs (4 mm or greater) the shaft 3714 the fastener 3710 would be very thick as compared to other fastener designs, e.g., shown in FIGS. 1-11, where the electrode, e.g., 15, 115, 215 penetrates relatively deeply into the fastener, e.g., 10, 110, 210. The fastener 3710 may be fed to the welding electrode 3715 via a carrier web or tape or some other means to hold it in place prior to electrode contact, which presses it against the workpiece(s) to be joined.

FIG. 52 shows an electrode tip 3815T having a "bottlenose" geometry. As in FIG. 51, the electrode tip 3815T would insert into and be retained in an electrode shaft like 3715S. The tip 3815T has a riveting surface 3815RS having a radius R of about 4 mm. The electrode tip 3815T is shown in contact with a fastener 3810 with a short, solid shaft 3814, e.g., having a length greater then 1.5 mm. The fastener 3810 has a wide cap 3812 having a concave surface 3812CS, which may have a radius of curvature approximating that of the riveting surface 3815RS of the tip 3815T. The height of the fastener is about 4 to 5 mm overall. The fastener 3810 is positioned on sheet 11, e.g., made from aluminum and 13, e.g., made from steel. The "semi-solid" fastener 3810 accommodates the "bottlenose" tip 3815T. As noted above, deviations of electrode orientation from perpendicular frequently occur and the radiused contact surface 3812CS allows the electrode to have a small amount of angularity relative to the perpendicular and still function for driving and welding the fastener 3810. The smaller radius of surface 3815RS provides increased flexibility to function at an angular offset from the welding electrode and greater electrode penetration inside the fastener 3810, which more closely resembles sheet-to-sheet spot welding. Additionally this type of tip geometry will work with a wider range of fastener shaft lengths since a very thick base is not required when welding sheets 11, 13 having a thickness 4 mm or greater. The smaller radius "nose" of the electrode tip 3815T will have a surface 3815RS that closely matches the radius on the contact surface 3812CS. The transition from surface 3815RS to the outer wall 3815OW of the electrode tip 3815T can be done using a variety of shapes, including: a larger radius, a straight wall at an angle or a double curve, as shown in FIGS. 52-55 (FIG. 52 showing a double curve). The electrode tip 3815T retains advantages of the standard electrode shown in FIG. 51, such as excellent electrode wear and electrode dressing.

Figure 53:
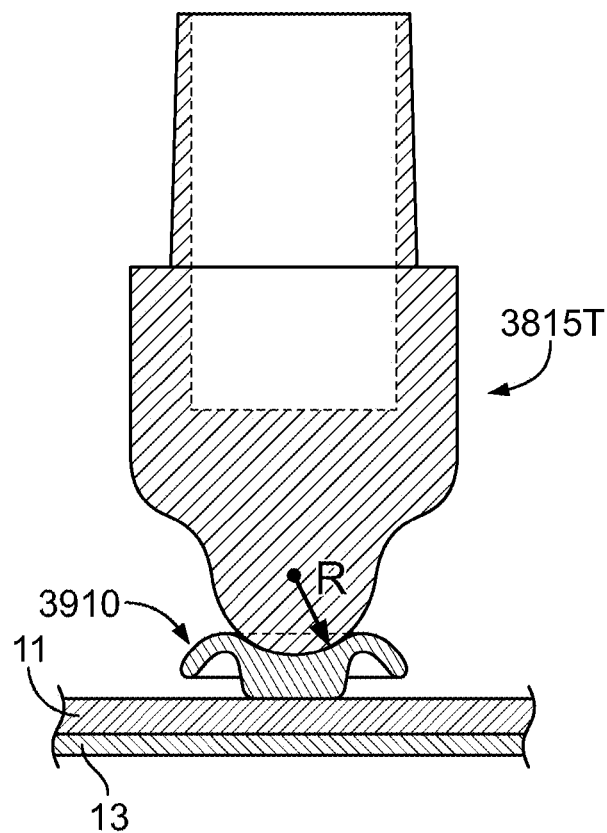
FIG. 53 is a diagrammatic, cross-sectional view of a welding electrode tip and a fastener in accordance with an alternative embodiment of the present disclosure, positioned on a pair of layers.

FIG. 53 illustrates that the bottlenose shape of the tip 3815T can accommodate a variety of fasteners, e.g., 3910 and stack-up thicknesses, making the electrode tip 3815T capable of processing a wide range of stack-up thicknesses with the same electrode tooling.

Figure 54:
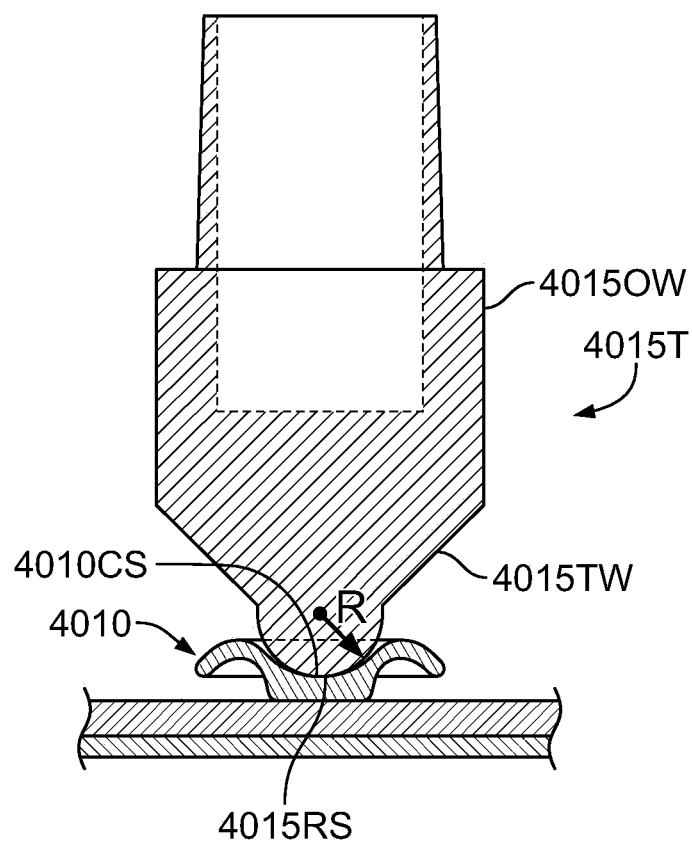
FIG. 54 is a diagrammatic, cross-sectional view of a welding electrode tip and a fastener in accordance with an alternative embodiment of the present disclosure, positioned on a pair of layers.

FIG. 54 shows another type of the bottlenose electrode tip 4015T that may reduce electrode wear. The radius R of the riveting surface 4015RS has a smaller radius than that shown in FIGS. and 53, viz., 3 mm versus 4 mm. In general, the radius of the riveting surface 4015RS should be greater than 2 mm but less than 8 mm, preferably 3 to 6 mm. In FIG. 54, the fastener contact surface 4010CS has a radius of 4 mm, slightly larger than the riveting surface 4015RS. The riveting surface 4015RS transitions to outer wall 4015OW via a straight wall 4015TW disposed at an angle of e.g., 45 degrees relative to the outer wall 4015OW. The electrode tip 4015T exhibits operability despite angular and x, y offsets in orientation and position of the electrode tip 4015T relative to that of the fastener 4010. In some applications, it is preferred that the radius of the contact surface 4010CS be slightly larger than that of the riveting surface 4015RS and in one embodiment, the contact surface 4010CS may be from 3 to 12 mm or 4 to 8 mm.

Figure 55:
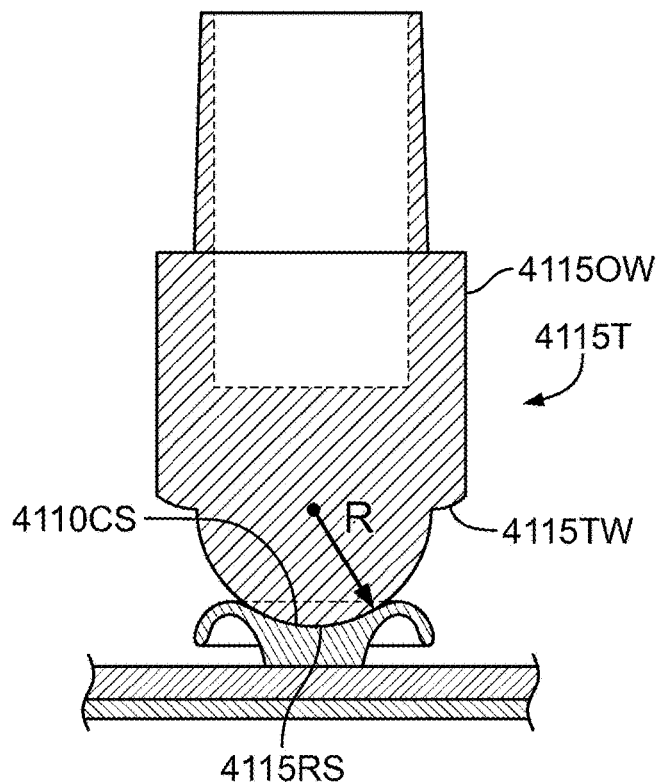
FIG. 55 is a diagrammatic, cross-sectional view of a welding electrode tip and a fastener in accordance with an alternative embodiment of the present disclosure, positioned on a pair of layers.

FIG. 55 shows an electrode tip 4115T that may reduce electrode wear. The radius R of the riveting surface 4115RS may be from 3 to 8 mm. The riveting surface 4115RS transitions to outer wall 4115OW via a curved wall 4115TW with a large radius, e.g., between 50 to 150 mm. This geometry provides enhanced heat transfer and cooling.

Figure 56:
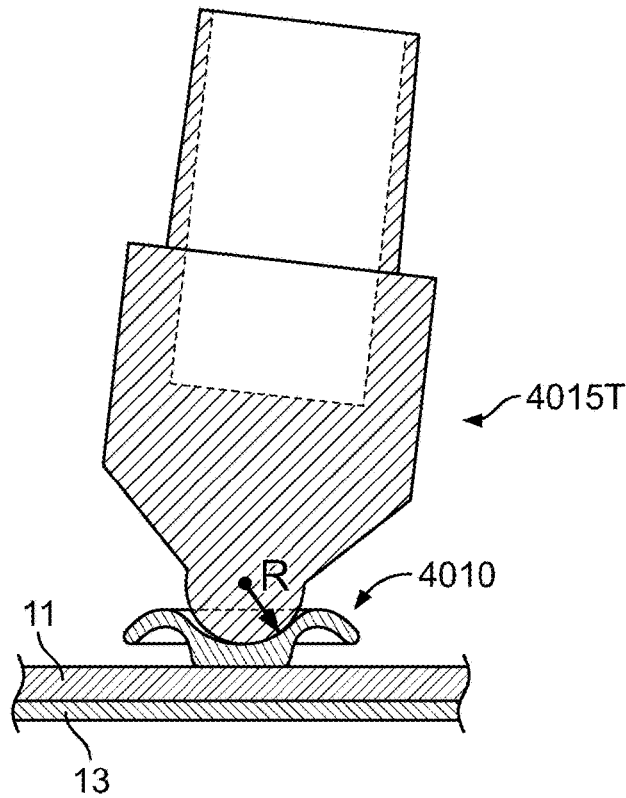
FIG. 56 is a diagrammatic, cross-sectional view of a welding electrode tip and a fastener in accordance with an alternative embodiment of the present disclosure, positioned on a pair of layers.

FIG. 56 shows the bottlenose electrode tip 4015T described above in relation to FIG. 54 at an orientation misaligned with the fastener 4010, e.g., at an angular offset α of up to 30 degrees from an orientation perpendicular to sheets 11, 13. The bottlenose tip 4015T will accommodate angular misalignments up to 30 degrees or more and still provide workable electrical and mechanical contact. If the fastener 4010 has a slightly larger radius R it will enhance the ability of spot welding apparatus with electrode tip 4015T to push the fastener 4010 through the sheet 11 and otherwise accommodate variations from ideal production fit-up. The ability to adjust to angular misalignments is new to projection type welding processes which typically employ large, flat faced electrodes and represents another significant departure of the presently disclosed technology from traditional electrical resistance welding.

Figure 57A:
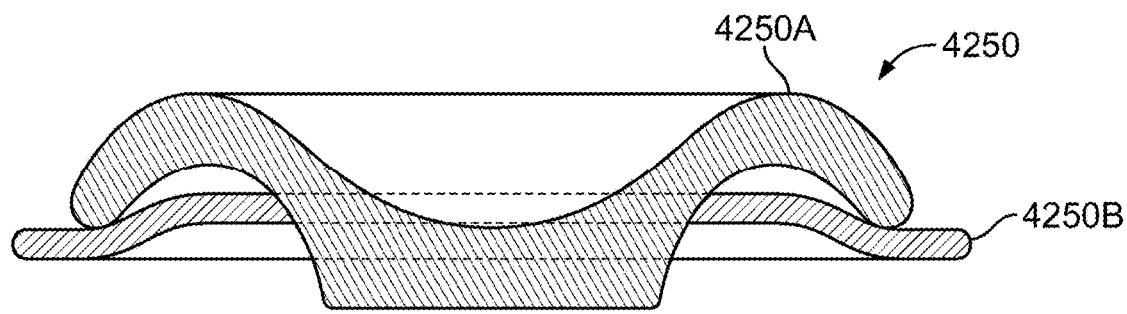
FIG. 57 is a diagrammatic, cross-sectional view of fasteners and an associated material layer in accordance with an alternative embodiment of the present disclosure.
Figure 57B:
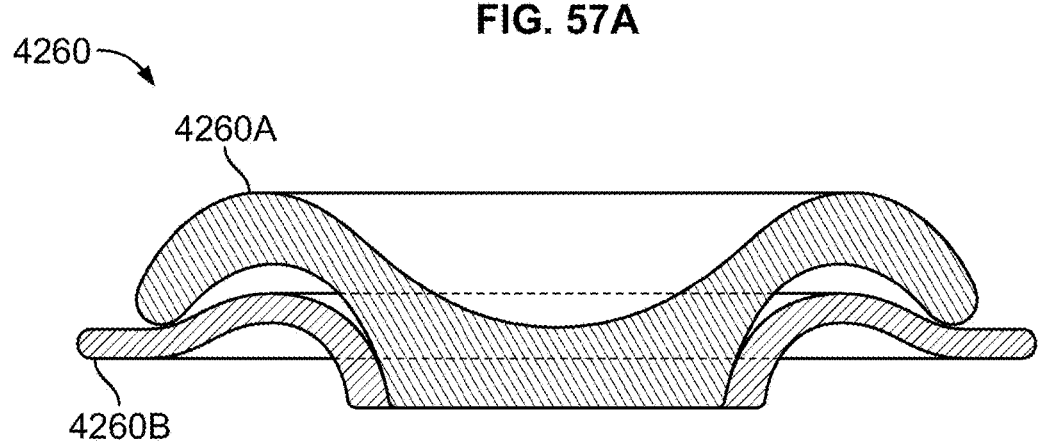
Figure 57C:
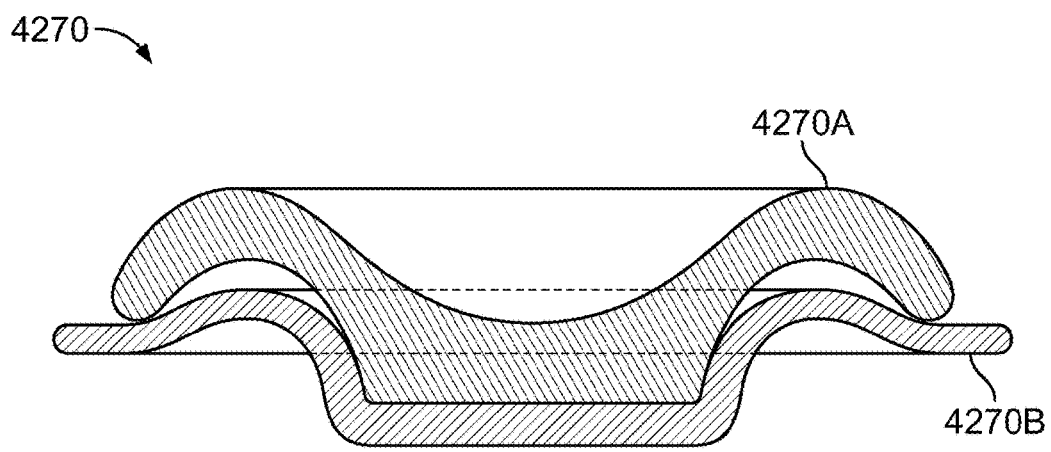

FIG. 57 shows components 4250A, 4250B, 4260A, 4260B and 4270A, 4270B, respectively. As shown, the components 4250A, 4260A and 4270A may be a fastener like any of the fasteners 10, 110, 210, 310, etc. disclosed above. Components 4250B, 4260B and 4270B may be in the form of a sheet of material that is press fitted or adhered to the fastener component 4250A, 4260A and 4270A. The sheet member 4250B, 4260B and 4270B may be composed of materials including: polymer, resin, adhesive (a and b above) or a metal (a, b, and c). The sheet member 4250B, 4260B and 4270B may be integral with and severable from a larger web that serves as a transport or holding mechanism for positioning fasteners 4250, etc. relative to materials to be fastened, e.g., sheets 11, 13 of FIGS. 4-7, during the process of applying the fasteners 4250, 4260, etc. via electrical resistance heating and welding as described above. Components 4250B, 4260B, 4270B may be selected to remain captured in the joint formed by the fasteners 4250A, 4260A, 4270A. For example, the sheet members 4250B, 4260B and 4270B may be a plastic/polymer sealant for sealing and protecting a joint formed by the fastener from corrosion.

If the sheet members 4250B, 4260B and 4270B are metallic and are integral with a larger structure, e.g., a tape or web employed as a transport/positioning mechanism, the attachment to the tape or web may be by a perforated or an otherwise frangible connection, permitting the sheet members 4250B, 4260B and 4270B to be disconnected from the greater structure when the associated fastener 4250A, 4260A, 4270A is used. The sheet members 4250B, 4260B and 4270B can be made from a variety of materials, e.g., stainless steel, aluminum brazing alloys, high purity aluminum, etc., in order to reduce the galvanic corrosion potential and/or extend joint bond between the fastener 4250A, 4260A, 4270A and all surfaces, e.g., sheets, 11, 13, it may come into contact with. If a brazing alloy is employed, it may be prefluxed to offer improved wetting along the contact surfaces and improved bonding performance. The sheet members 4250B, 4260B and 4270B may be associated with the corresponding fasteners 4250A, 4260A, 4270A mechanically, e.g., an interference fit, or other means, such as adhesion via surface attraction or use of an adhesive. The composition and function of the sheet members 4250B, 4260B and 4270B may be similar or the same of the sleeves 2310T and or 2410A of FIGS. 36 and 37. The fasteners 4250A, 4260A, 4270A and sheet members 4250B, 4260B and 4270B may be assembled prior to performing a fastening operation and different combinations of fasteners 4250A, 4260A, 4270A and sheet members 4250B, 4260B and 4270B may be selected based upon the requirements and objectives of the fastening task.

Figure 58:
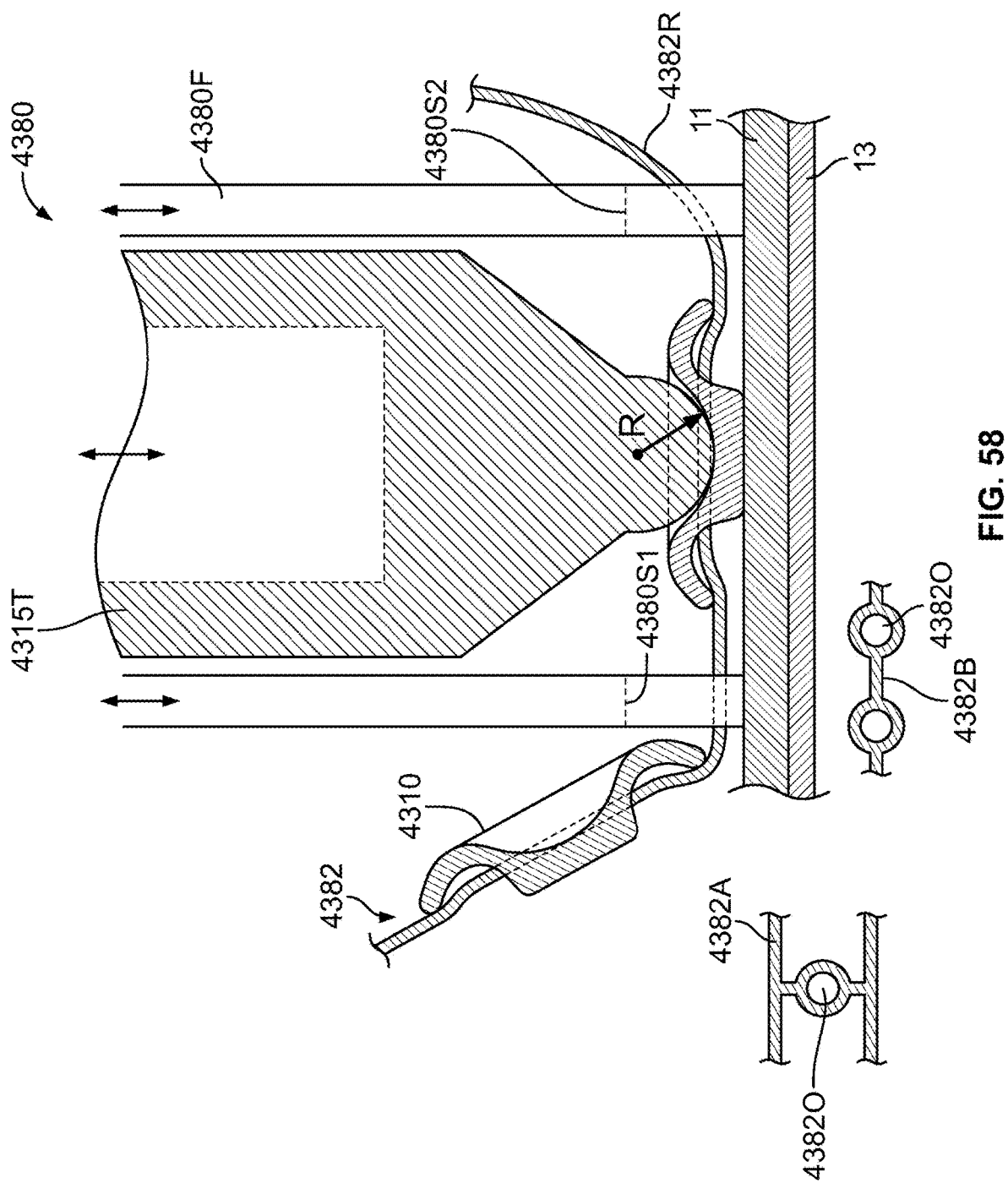
FIG. 58 is a diagrammatic, cross-sectional view of fasteners and an associated carrier for positioning the fasteners relative to an electrical resistance welding tip and material layers to be fastened.

FIG. 58 shows a feeding mechanism 4380 and media 4382 for loading fasteners 4310 between the tip 4315T of a welding electrode and a workpiece, e.g., sheets 11, 13 to be fastened together by resistance welding with fasteners 4310, in accordance with an embodiment of the present disclosure. The fasteners 4310 are mounted and carried by the media 4382, which may be in the form of a belt or tape that runs between coils on the left L and right R of the feeding mechanism 4380. The media may be guided by guide rolls or another form of guide, such as a chute or guide surfaces 4380S1, 4380S2 through frame 4380F, such that the fasteners 4310 carried by the media are presented periodically between the electrode tip 4315T and the sheet 11. The electrode tip is periodically moved up and down to perform a penetration/welding operation as described above in this disclosure by electrical resistance heating and welding. The feeding mechanism 4380 may also move up and down relative to the sheet 11. The media 4382 may be partially or fully consumed when the fastener 4310 is applied to the sheets 11, 13. In the alternative, a remnant portion 4382R of the media 4382 may pass beyond the applied fastener 4310 and be taken up by a wind-up roll or other take-up mechanism, for disposal or reuse. As described above in relation to FIG. 57, the media 4382 may be selected to provide a beneficial attribute to the joint formed by the fastener 4310, e.g., the media 4382 may be a sealant or corrosion reducing film, an adhesive or brazing media. Two forms of media 4382A and 4382B with openings 4382O for receiving the fastener 4310.

Aspects of the fasteners 10, 110, 210, etc. and fastening methods of the present disclosure include the following. The process for applying the fasteners is associated with low part distortion since the layers of material, e.g., 11, 13 and the fastener 10, 110, etc. are held in compression during the weld and the heat affected zone is captured below the cap, e.g., 12. The cap 12 may have a pre-formed recess or bend to form a recess to accommodate and trap melted metals, intermetallics etc. displaced by the welding operation. Because a given fastener, e.g., 10, 110, etc., can deform, e.g., melt and collapse during the penetration and welding phases, it can handle a range of thicknesses of sheets, e.g., 11, 13 to be fastened. During the fastener penetration and welding, as the fastener 10, 110, etc., collapses and expands along the weld zone, intermetallics are displaced from the weld zone. When the fastener 10, 110, etc. (i.e., the cap 12 thereof), compresses against the top sheet, e.g., 11, under the influence of the electrode 15, 115, 215, etc., it will come to a stop with the cap 12 sealing against the top sheet 11. The fastener 10, 110, etc., can be applied through adhesives applied between the sheets, 11, 13. Since the fastener 10, 110, 210, etc., is welded or brazed to one side of the second sheet 13, the other side of the sheet 13 is not pierced and remains water-tight. The welding process of the present disclosure is compatible with conventional RSW equipment developed for steel sheet resistance welding, e.g., as used in automobile manufacture.

The fastener 10, 110, 210, etc., may be made from a variety of materials such as different steel grades (low carbon, high strength, ultra high strength, stainless), titanium, aluminum, magnesium, and copper and may be coated (galvanized, galvaneal, hot-dipped, aluminized) to improve corrosion resistance. The fastener 10, 110, 210, etc., may be applied via single-sided or two-side access welding techniques. In one approach, no pilot hole is used and the fastener pierces through a first layer 11 softened by resistance heating. In another approach, a pilot hole may be provided in the top sheet 11, which may be aluminum, plastic, or in the instance of a fastener having an aluminum shaft end 16, the first sheet may be steel, titanium, or copper and the second sheet aluminum. In the instance where the fastener is inserted through a pilot hole in the first sheet, the first sheet need not be electrically conductive and need not have a lower melting temperature than the second sheet (since the fastener does not penetrate the first sheet by electric resistance heating. Quality assurance measurements may be conducted on the cavity left from destructive disassembly of the weld securing a fastener to a second sheet, e.g., to inspect the dimensions, e.g., depth, volume, etc. of the weld. Ultrasonic NDE techniques may be utilized on the opposite side of the sheet to which the fastener is welded to monitor the weld quality.

The equipment used to apply the fastener of the present disclosure 10, 110, 210, etc., has a much smaller footprint than FDS (EJOTS), SPR, and SFJ, allowing access to tighter spaces. The insertion forces used to drive the fastener of the present disclosure are lower compared to those used in SPR, since the aluminum sheet 11 is either heated or apertured, facilitating fastener insertion, enhancing the ability to join high strength aluminums which are sensitive to cracking during SPR operations. The approaches of the present disclosure also facilitate joining to high and ultra-high strength steels since there is no need to pierce the steel metal with a fastener, instead, the fastener is welded to the sheet metal.

The methods of the present disclosure do not require rotation of the fastener or the workpiece facilitate parts fit-up, since the process is similar to conventional RSW in terms of how the parts to be joined are fixture. The fasteners 10, 110 may be applied at processing speeds approximating those of conventional RSW and the process can be used on both wrought and cast aluminum. Since welding of aluminum to steel is avoided, the low joint strength associated with bimetallic welds is also avoided. The process of the present disclosure permits multiple sheets of aluminum and steel and other metals, e.g., 2 layers of aluminum and 1 layer of steel; 1 layer of aluminum and 2 layers of steel; or 1 layer of aluminum, 1 layer of magnesium and 1 layer of steel to be fastened.

During the application of the fastener 10, 110, 210, etc., the first sheet 11 or sheets 11A, 11B that are penetrated by the fastener may also be melted and welded together, increasing the weld zone and overall joint strength. The fastener may be fabricated from a variety of materials for welding to compatible sheets 13 and may be multi-layered, such that the fastener may have mechanical and galvanic properties that are a combination suitable for welding and for the avoidance of corrosion. For example, a fastener may be fabricated having an end that is aluminum and compatible to weld to an aluminum second sheet 13, but have a layer of steel, titanium or copper to improve its mechanical properties. Multi-layer fasteners may be useful in high temperature applications and may include a layer or layers of material to prevent diffusion across multi-material interfaces.

A film, adhesive, or coating may be applied to the fastener or introduced between the fastener and the first sheet 11 to improve the sealing of the cap 12 to the sheet 11. The process of the present disclosure may be used to join a wide range of sheet thicknesses by incorporating a retrograde cap that curls back toward the end of the shaft, which may be coated with an insulator to avoid conducting electricity through the cap/sheet 11 interface, the cap bending during the heating penetrating phase to accommodate different thicknesses in stack-ups. The present disclosure contemplates fasteners made from a variety of materials including aluminum, steels, stainless steel, copper, and titanium. The fastener can be made up of two or more different types of aluminum to enable both resistance welding and lower heat processes such as resistance brazing or soldering. Joints made with the fasteners and methods of the present disclosure can exhibit improved fatigue performance due to parts being held in compression during the welding process.

It will be understood that the embodiments described herein are merely exemplary and that a person skilled in the art may make many variations and modifications without departing from the spirit and scope of the claimed subject matter. All such variations and modifications are intended to be included within the scope of the claims.

What is claimed is:

1. A tip for a welding electrode, comprising:
a first end;
a second end opposite the first end;
a first portion extending from the first end to a first location between the first end and the second end, wherein the first portion includes a first diameter;
a second portion extending from the second end to a second location between the first end and the second end,
wherein the second portion includes a second diameter,
wherein the first diameter is larger than the second portion, and
wherein the second end is a radiused end; and
a transition portion from the first location to the second location,
wherein the transition portion includes
a first curved wall portion extending from the first location to a third location between the first location and the second location, wherein the first curved wall portion is convex, and
a second curved portion extending from the second location to the third location, wherein the second curved portion is concave.

2. The tip of claim 1, wherein the tip includes a bottle nose shape.

3. The tip of claim 1, the tip is configured to apply a resistance welding fastener to a structure.

4. The tip of claim 3, wherein the second end is configured to contact the resistance welding fastener.

5. The tip of claim 1, wherein the transition portion includes a conical wall, wherein the first portion includes an outer wall, and wherein the conical wall is disposed at an angle relative to the outer wall.

6. The tip of claim 5, wherein the conical wall is 45 degrees relative to the outer wall.

7. The tip of claim 1, wherein the radiused end has a radius of 2 mm to 8 mm.

8. The tip of claim 7, wherein the radiused end has a radius of 3 mm to 6 mm.

9. The tip of claim 1, wherein the radiused end has a radius of 50 mm to 150 mm.

10. The tip of claim 4, wherein the tip is configured to weld the resistance welding fastener when the tip is at an angular offset relative to the structure.

11. The tip of claim 10, wherein the angular offset is up to and including 30 degrees.

12. The tip of claim 1, wherein the tip is configured to be removably attached to the welding electrode.

13. A tip for a welding electrode, comprising:
a first end;
a second end opposite the first end;
a first portion extending from the first end to a first location between the first end and the second end, wherein the first portion includes a first diameter;
a second portion extending from the second end to a second location between the first end and the second end,
wherein the second portion includes a second diameter,
wherein the first diameter is larger than the second portion, and
wherein the second end is a radiused end; and
a transition portion from the first location to the second location,
wherein the transition portion includes
a first curved wall portion extending from the first location to a third location between the first location and the second location, wherein the first curved wall portion is concave, and
a second curved portion extending from the second location to the third location, wherein the second curved portion is convex.

14. The tip of claim 13, wherein the radiused end has a radius of 2 mm to 8 mm.

15. The tip of claim 14, wherein the radiused end has a radius of 3 mm to 6 mm.

16. The tip of claim 13, wherein the radiused end has a radius of 50 mm to 150 mm.

17. A tip for a welding electrode, comprising:
a first end;
a second end opposite the first end;

a first portion extending from the first end to a first location between the first end and the second end, wherein the first portion includes a first diameter;

a second portion extending from the second end to a second location between the first end and the second end,
wherein the second portion includes a second diameter,
wherein the first diameter is larger than the second portion, and
wherein the second end is a radiused end; and a transition portion from the first location to the second location,
wherein the transition portion includes an outer surface having a radius, and
wherein the radius of the outer surface is at least two times the radius of the radiused end.

18. The tip of claim 17, wherein the radiused end has a radius of 2 mm to 8 mm.

19. The tip of claim 18, wherein the radiused end has a radius of 3 mm to 6 mm.

20. The tip of claim 17, wherein the radiused end has a radius of 50 mm to 150 mm.

\* \* \* \* \*